(12) United States Patent
Ellis et al.

(10) Patent No.: US 12,299,557 B1
(45) Date of Patent: May 13, 2025

(54) RESPONSE PLAN MODIFICATION THROUGH ARTIFICIAL INTELLIGENCE APPLIED TO AMBIENT DATA COMMUNICATED TO AN INCIDENT COMMANDER

(71) Applicants: Todd Ellis, Ben Lomond, CA (US); Michael Stahl, El Dorado Hills, CA (US); Goktug Duman, Miami, FL (US); Raj Abhyanker, Mountain View, CA (US)

(72) Inventors: Todd Ellis, Ben Lomond, CA (US); Michael Stahl, El Dorado Hills, CA (US); Goktug Duman, Miami, FL (US); Raj Abhyanker, Mountain View, CA (US)

(73) Assignee: GovernmentGPT Inc., Mountain View, CA (US)

(*) Notice: Subject to any disclaimer, the term of this patent is extended or adjusted under 35 U.S.C. 154(b) by 0 days.

(21) Appl. No.: 18/437,200

(22) Filed: Feb. 8, 2024

Related U.S. Application Data

(60) Provisional application No. 63/614,022, filed on Dec. 22, 2023, provisional application No. 63/616,817, filed on Jan. 1, 2024, provisional application No. 63/626,075, filed on Jan. 29, 2024.

(51) Int. Cl.
*G06N 3/0475* (2023.01)
(52) U.S. Cl.
CPC .................. *G06N 3/0475* (2023.01)
(58) Field of Classification Search
CPC .................................................. G06N 3/0475
USPC ....................................................... 340/573.1
See application file for complete search history.

(56) References Cited

U.S. PATENT DOCUMENTS

| | | | |
|---|---|---|---|
| 1,337,920 | A | 4/1920 | Ernest |
| 4,008,456 | A | 2/1977 | Ewart |
| 4,231,311 | A | 11/1980 | Longerich |
| 4,358,984 | A | 11/1982 | Winblad |
| 4,367,752 | A | 1/1983 | Jimenez et al. |
| 5,005,213 | A | 4/1991 | Hanson et al. |

(Continued)

FOREIGN PATENT DOCUMENTS

| | | |
|---|---|---|
| AU | 2012201637 B2 | 9/2013 |
| CA | 2903640 A1 | 3/2017 |

(Continued)

OTHER PUBLICATIONS

"IAP Software", by The Response Group, Published in [2003] https://www.responsegroupinc.com/iap.

(Continued)

*Primary Examiner* — Juan A Torres
(74) *Attorney, Agent, or Firm* — LEGALFORCE RAPC WORLDWIDE

(57) ABSTRACT

Disclosed are a method, system, and apparatus of response plan modification through artificial intelligence applied to ambient data communicated to an incident commander. According to one embodiment, the method includes analyzing a description of a fire in progress, automatically generating an incident action plan through an Incident Action Artificial-Intelligence Model ("IAAIM") based on the description of the fire in progress, and modifying the incident action plan based on a trusted radio communication to an incident commander.

20 Claims, 16 Drawing Sheets

(56) References Cited

U.S. PATENT DOCUMENTS

| | | | |
|---|---|---|---|
| 5,219,290 A | 6/1993 | Lapp et al. |
| 5,416,903 A | 5/1995 | Malcolm |
| 5,594,498 A | 1/1997 | Fraley |
| 5,677,979 A | 10/1997 | Squicciarini et al. |
| 5,815,093 A | 9/1998 | Kikinis |
| 5,864,481 A | 1/1999 | Gross et al. |
| 5,942,716 A | 8/1999 | Miller |
| 6,029,558 A | 2/2000 | Stevens et al. |
| 6,128,999 A | 10/2000 | Sepp et al. |
| 6,198,394 B1 | 3/2001 | Jacobsen et al. |
| 6,215,498 B1 | 4/2001 | Filo et al. |
| 6,219,646 B1 | 4/2001 | Cherny |
| 6,349,201 B1 | 2/2002 | Ford |
| 6,388,422 B1 | 5/2002 | Lew |
| 6,481,782 B2 | 11/2002 | Bond |
| 6,513,003 B1 | 1/2003 | Angell et al. |
| 6,522,531 B1 | 2/2003 | Quintana et al. |
| 6,567,503 B2 | 5/2003 | Engelke et al. |
| 6,595,102 B2 | 7/2003 | Stevens et al. |
| 6,613,001 B1 | 9/2003 | Dworkin |
| 6,690,932 B1 | 2/2004 | Barnier et al. |
| 6,784,833 B1 | 8/2004 | Evans |
| 6,820,055 B2 | 11/2004 | Saindon et al. |
| 6,831,556 B1 | 12/2004 | Boykin |
| 6,980,953 B1 | 12/2005 | Kanevsky et al. |
| 7,035,804 B2 | 4/2006 | Saindon et al. |
| 7,046,214 B2 | 5/2006 | Ebersole, Jr. et al. |
| 7,058,710 B2 | 6/2006 | McCall et al. |
| 7,091,852 B2 | 8/2006 | Mason et al. |
| 7,132,928 B2 | 11/2006 | Perricone |
| 7,173,437 B2 | 2/2007 | Hervieux et al. |
| 7,245,216 B2 | 7/2007 | Burkley et al. |
| 7,342,648 B2 | 3/2008 | Solomon et al. |
| 7,389,221 B1 | 6/2008 | Pearson et al. |
| 7,456,875 B2 | 11/2008 | Kashiwa |
| 7,538,666 B2 | 5/2009 | Campman |
| 7,539,086 B2 | 5/2009 | Jaroker |
| 7,570,301 B2 | 8/2009 | Gilor |
| 7,696,919 B2 | 4/2010 | Moraites |
| 7,719,428 B2 | 5/2010 | Fisher et al. |
| 7,747,434 B2 | 6/2010 | Flanagan et al. |
| 7,768,548 B2 | 8/2010 | Silvernail et al. |
| 7,827,900 B2 | 11/2010 | Beach et al. |
| 7,845,018 B1 | 12/2010 | Greer |
| 7,898,410 B2 | 3/2011 | Schurter |
| 7,900,548 B2 | 3/2011 | Hoadley et al. |
| 7,930,181 B1 | 4/2011 | Goffin et al. |
| 7,996,465 B2 | 8/2011 | Cromp et al. |
| 7,999,741 B2 | 8/2011 | Graves et al. |
| 8,018,320 B2 | 9/2011 | Najanguaq Søvsø Andreasen Struijk |
| 8,051,762 B2 | 11/2011 | Beach et al. |
| 8,078,551 B2 | 12/2011 | Bar |
| 8,141,470 B1 | 3/2012 | Farinella et al. |
| 8,154,844 B2 | 4/2012 | Brown |
| 8,205,537 B1 | 6/2012 | Dupont |
| 8,239,207 B2 | 8/2012 | Seligman et al. |
| 8,242,880 B2 | 8/2012 | Ghovanloo et al. |
| 8,274,377 B2 | 9/2012 | Smith et al. |
| 8,281,702 B2 | 10/2012 | Hoadley et al. |
| 8,316,753 B2 | 11/2012 | Beach et al. |
| 8,362,945 B2 | 1/2013 | Wootan et al. |
| 8,370,142 B2 | 2/2013 | Frankel et al. |
| 8,386,233 B2 | 2/2013 | Khuda |
| 8,464,949 B2 | 6/2013 | Namey et al. |
| 8,487,755 B2 | 7/2013 | Gudgel et al. |
| 8,526,934 B2 | 9/2013 | Sennett et al. |
| 8,593,286 B2 | 11/2013 | Razoumov et al. |
| 8,599,010 B2 | 12/2013 | Bose et al. |
| 8,639,396 B1 | 1/2014 | Hirsch et al. |
| 8,674,806 B1 | 3/2014 | Malik et al. |
| 8,676,234 B2 | 3/2014 | Conner et al. |
| 8,698,634 B2 | 4/2014 | Guedes Lopes Da Fonseca et al. |
| 8,755,839 B2 | 6/2014 | Parkulo et al. |
| 8,776,662 B1 | 7/2014 | Hoenes |
| 8,791,836 B2 | 7/2014 | Herman |
| 8,812,096 B2 | 8/2014 | Flaherty et al. |
| 8,838,459 B2 | 9/2014 | Uszkoreit et al. |
| 8,853,891 B2 | 10/2014 | Soar |
| 8,857,309 B2 | 10/2014 | Wentzel |
| 8,872,655 B2 | 10/2014 | Buller et al. |
| 8,896,696 B2 | 11/2014 | Ellsworth et al. |
| 8,945,328 B2 | 2/2015 | Longinotti-Buitoni et al. |
| 8,949,289 B2 | 2/2015 | Lasensky et al. |
| 8,965,129 B2 | 2/2015 | Rogowski et al. |
| 9,042,971 B2 | 5/2015 | Brumback et al. |
| 9,063,931 B2 | 6/2015 | Wu |
| 9,076,448 B2 | 7/2015 | Bennett et al. |
| 9,085,362 B1 | 7/2015 | Kilian et al. |
| 9,195,652 B2 | 11/2015 | Custer et al. |
| 9,229,535 B2 | 1/2016 | Vice et al. |
| 9,245,278 B2 | 1/2016 | Orsini et al. |
| 9,246,898 B2 | 1/2016 | McKeeman et al. |
| 9,282,893 B2 | 3/2016 | Aliverti et al. |
| 9,338,622 B2 | 5/2016 | Bjontegard |
| 9,342,976 B2 | 5/2016 | Pfeffer |
| 9,354,703 B2 | 5/2016 | Maggiali et al. |
| 9,466,187 B2 | 10/2016 | Grant et al. |
| 9,501,472 B2 | 11/2016 | Manuselis et al. |
| 9,507,772 B2 | 11/2016 | Parkinson et al. |
| 9,560,324 B2 | 1/2017 | Monaghan, Sr. et al. |
| 9,569,431 B2 | 2/2017 | Uszkoreit et al. |
| 9,582,035 B2 | 2/2017 | Connor |
| 9,589,448 B1 | 3/2017 | Schneider et al. |
| 9,602,993 B2 | 3/2017 | Vilrokx et al. |
| 9,614,969 B2 | 4/2017 | Aue et al. |
| 9,619,996 B1 | 4/2017 | Smith |
| 9,695,981 B2 | 7/2017 | Au et al. |
| 9,697,720 B1 | 7/2017 | Lassiter |
| 9,704,209 B2 | 7/2017 | Proud et al. |
| 9,710,819 B2 | 7/2017 | Cloran et al. |
| 9,712,730 B2 | 7/2017 | Phillips et al. |
| 9,720,737 B2 | 8/2017 | Ashtiani et al. |
| 9,734,820 B2 | 8/2017 | Rangarajan Sridhar et al. |
| 9,737,261 B2 | 8/2017 | Coza et al. |
| 9,740,686 B2 | 8/2017 | Johansson |
| 9,741,215 B2 | 8/2017 | Brav et al. |
| 9,804,946 B2 | 10/2017 | Conlon et al. |
| 9,805,273 B1 | 10/2017 | Seeber et al. |
| 9,826,557 B2 | 11/2017 | Smith |
| 9,881,477 B2 | 1/2018 | Hyde et al. |
| 9,886,833 B2 | 2/2018 | Noland et al. |
| 9,922,518 B2 | 3/2018 | Hannigan et al. |
| 9,922,537 B2 | 3/2018 | Shah et al. |
| 9,980,102 B2 | 5/2018 | Bohlander et al. |
| 9,996,168 B2 | 6/2018 | Menon et al. |
| 10,013,858 B2 | 7/2018 | Zerick et al. |
| 10,020,909 B2 | 7/2018 | Stamm et al. |
| 10,021,672 B2 | 7/2018 | Cole et al. |
| 10,025,991 B2 | 7/2018 | Seeber et al. |
| 10,025,993 B2 | 7/2018 | Seeber et al. |
| 10,043,033 B1 | 8/2018 | Hadsall |
| 10,043,354 B2 | 8/2018 | Man et al. |
| 10,070,260 B1 | 9/2018 | Miyazawa et al. |
| 10,084,500 B2 | 9/2018 | Davis et al. |
| 10,102,732 B2 | 10/2018 | Gersten |
| 10,103,835 B2 | 10/2018 | Morrow et al. |
| 10,105,101 B2 | 10/2018 | Fougere et al. |
| 10,108,306 B2 | 10/2018 | Khoo et al. |
| 10,129,704 B1 | 11/2018 | Huseth et al. |
| 10,137,363 B2 | 11/2018 | Parshionikar |
| 10,154,391 B2 | 12/2018 | Yoakum et al. |
| 10,178,973 B2 | 1/2019 | Venkatraman et al. |
| 10,204,520 B2 | 2/2019 | Demetriades et al. |
| 10,209,365 B2 | 2/2019 | Venkatraman et al. |
| 10,229,329 B2 | 3/2019 | Seeber et al. |
| 10,230,919 B2 | 3/2019 | Davis et al. |
| 10,234,938 B2 | 3/2019 | Moffat et al. |
| 10,237,012 B2 | 3/2019 | Morrow et al. |
| 10,257,434 B2 | 4/2019 | Arnold |
| 10,258,534 B1 | 4/2019 | Sills et al. |
| 10,271,591 B2 | 4/2019 | Bangera et al. |
| 10,306,094 B2 | 5/2019 | Miklautsch et al. |
| 10,317,506 B2 | 6/2019 | Seeber et al. |

(56) References Cited

U.S. PATENT DOCUMENTS

| | | |
|---|---|---|
| 10,327,674 B2 | 6/2019 | Hong et al. |
| 10,349,227 B2 | 7/2019 | Saxena et al. |
| 10,351,237 B2 | 7/2019 | Baruch |
| 10,370,102 B2 | 8/2019 | Boykin et al. |
| 10,370,122 B2 | 8/2019 | Fisher et al. |
| 10,455,187 B2 | 10/2019 | Callis, Jr. et al. |
| 10,539,787 B2 | 1/2020 | Haddick et al. |
| 10,542,222 B2 | 1/2020 | Arnold |
| 10,542,929 B2 | 1/2020 | Kimmel |
| 10,560,668 B2 | 2/2020 | Araya et al. |
| 10,567,107 B2 | 2/2020 | Morrow et al. |
| 10,573,164 B2 | 2/2020 | Singh et al. |
| 10,574,384 B2 | 2/2020 | Morrow et al. |
| 10,599,106 B2 | 3/2020 | Zeier |
| 10,599,929 B2 | 3/2020 | Cuban et al. |
| 10,600,295 B2 | 3/2020 | Asher et al. |
| 10,600,417 B2 | 3/2020 | Tormasov et al. |
| 10,613,248 B2 | 4/2020 | Benke et al. |
| 10,614,171 B2 | 4/2020 | Orsini et al. |
| 10,621,443 B2 | 4/2020 | Seeber et al. |
| 10,653,202 B2 | 5/2020 | Destrian et al. |
| 10,657,362 B2 | 5/2020 | Ranganath et al. |
| 10,668,356 B2 | 6/2020 | Bangera et al. |
| 10,701,520 B2 | 6/2020 | Singh et al. |
| 10,805,576 B2 | 10/2020 | Hanchett et al. |
| 10,812,755 B2 | 10/2020 | Davis et al. |
| 10,814,894 B2 | 10/2020 | Preston et al. |
| 10,854,098 B1 | 12/2020 | Welch et al. |
| 10,861,308 B1 | 12/2020 | Simpson et al. |
| 10,861,317 B2 | 12/2020 | Wengrovitz et al. |
| 10,861,320 B2 | 12/2020 | Martin et al. |
| 10,866,597 B1 | 12/2020 | Reinhold et al. |
| 10,896,598 B1 | 1/2021 | Boss et al. |
| 10,901,373 B2 | 1/2021 | Locke et al. |
| 10,970,934 B2 | 4/2021 | Rogers et al. |
| 10,977,452 B2 | 4/2021 | Wang et al. |
| 11,025,723 B2 | 6/2021 | Fortna et al. |
| 11,032,515 B2 | 6/2021 | Mazzarella et al. |
| 11,057,584 B2 | 7/2021 | Davis et al. |
| 11,062,584 B1 | 7/2021 | Magaletta |
| 11,076,134 B2 | 7/2021 | Govezensky et al. |
| 11,087,613 B2 | 8/2021 | Barber |
| 11,096,590 B2 | 8/2021 | Tang et al. |
| 11,122,237 B2 | 9/2021 | Nguyen et al. |
| 11,126,204 B2 | 9/2021 | Abramov et al. |
| 11,158,343 B2 | 10/2021 | Hershfield et al. |
| 11,160,504 B2 | 11/2021 | Yun et al. |
| 11,170,782 B2 | 11/2021 | Stoker et al. |
| 11,188,854 B2 | 11/2021 | Dimino et al. |
| 11,197,773 B2 | 12/2021 | Sakuma et al. |
| 11,216,954 B2 | 1/2022 | Peled et al. |
| 11,232,702 B2 | 1/2022 | Huseth et al. |
| 11,272,779 B2 | 3/2022 | Grinnell |
| 11,288,973 B2 | 3/2022 | Vacek |
| 11,297,164 B2 | 4/2022 | McCormack et al. |
| 11,304,778 B2 | 4/2022 | Shanjani et al. |
| 11,308,792 B2 | 4/2022 | Rao |
| 11,315,396 B2 | 4/2022 | Kaindl |
| 11,375,161 B2 | 6/2022 | Shimada et al. |
| 11,385,022 B2 | 7/2022 | Hatcher et al. |
| 11,388,546 B2 | 7/2022 | Williams |
| 11,425,653 B2 | 8/2022 | Hanchett et al. |
| 11,436,900 B2 | 9/2022 | Baron et al. |
| 11,521,128 B2 | 12/2022 | Moro et al. |
| 11,521,285 B2 | 12/2022 | Schuler et al. |
| 11,622,138 B2 | 4/2023 | MacDonald |
| 11,632,539 B2 | 4/2023 | Smith et al. |
| 11,645,904 B2 | 5/2023 | Trundle et al. |
| 11,702,204 B1 * | 7/2023 | Flick ............... G05D 1/102 701/3 |
| 11,706,391 B1 | 7/2023 | Heywood et al. |
| 11,717,185 B2 | 8/2023 | Cusey et al. |
| 11,741,820 B1 | 8/2023 | Bacco et al. |
| 11,749,074 B2 | 9/2023 | Attariani et al. |
| 11,790,741 B2 | 10/2023 | Williams |
| 11,819,324 B2 | 11/2023 | Cusey et al. |
| 11,877,614 B2 | 1/2024 | Berzowska et al. |
| 11,879,705 B2 | 1/2024 | Taveniku |
| 11,893,101 B2 | 2/2024 | Haraguchi et al. |
| 11,900,915 B2 | 2/2024 | Chen et al. |
| 11,902,871 B2 | 2/2024 | Pellegrini et al. |
| 11,920,901 B2 | 3/2024 | Basche et al. |
| 11,942,093 B2 | 3/2024 | Dubinsky et al. |
| 2001/0029455 A1 | 10/2001 | Chin et al. |
| 2002/0026431 A1 | 2/2002 | Pedersen et al. |
| 2002/0145849 A1 | 10/2002 | Peterson |
| 2002/0149510 A1 | 10/2002 | Salzeder |
| 2002/0196202 A1 | 12/2002 | Bastian et al. |
| 2003/0065503 A1 | 4/2003 | Agnihotri et al. |
| 2003/0115059 A1 | 6/2003 | Jayaratne |
| 2003/0125998 A1 | 7/2003 | McKenney et al. |
| 2004/0219491 A1 | 11/2004 | Shlomo |
| 2005/0054940 A1 | 3/2005 | Almen |
| 2005/0264412 A1 | 12/2005 | Levesque et al. |
| 2006/0028556 A1 | 2/2006 | Bunn et al. |
| 2006/0077253 A1 | 4/2006 | VanRiper et al. |
| 2006/0107829 A1 | 5/2006 | Shumov et al. |
| 2006/0190250 A1 | 8/2006 | Saindon et al. |
| 2006/0211404 A1 | 9/2006 | Cromp et al. |
| 2006/0225566 A1 | 10/2006 | Lloyd |
| 2007/0213088 A1 | 9/2007 | Sink |
| 2007/0229356 A1 | 10/2007 | Kodrin |
| 2007/0268368 A1 | 11/2007 | Bradford |
| 2008/0001764 A1 | 1/2008 | Douglas et al. |
| 2008/0114220 A1 | 5/2008 | Banet et al. |
| 2008/0133299 A1 | 6/2008 | Sitarski |
| 2008/0165047 A1 | 7/2008 | Fisher et al. |
| 2008/0219100 A1 | 9/2008 | Fisher et al. |
| 2008/0258063 A1 | 10/2008 | Rapanotti |
| 2008/0291075 A1 | 11/2008 | Rapanotti |
| 2009/0031467 A1 | 2/2009 | Swindells et al. |
| 2009/0055347 A1 | 2/2009 | Hollman et al. |
| 2009/0174547 A1 | 7/2009 | Greene et al. |
| 2009/0257603 A1 | 10/2009 | Chan et al. |
| 2009/0311928 A1 | 12/2009 | McClintock et al. |
| 2010/0057435 A1 | 3/2010 | Kent et al. |
| 2010/0246328 A1 | 9/2010 | Gudgel et al. |
| 2010/0315228 A1 | 12/2010 | Grilliot et al. |
| 2010/0319524 A1 | 12/2010 | Farinella et al. |
| 2011/0077933 A1 | 3/2011 | Miyamoto et al. |
| 2011/0113952 A1 | 5/2011 | Rosenwasser et al. |
| 2011/0187524 A1 | 8/2011 | Cochran, III |
| 2011/0279270 A1 | 11/2011 | Marckwald et al. |
| 2012/0011994 A1 | 1/2012 | Hoadley et al. |
| 2012/0126960 A1 | 5/2012 | Steger et al. |
| 2012/0174299 A1 | 7/2012 | Balzano |
| 2012/0198593 A1 | 8/2012 | Beck et al. |
| 2012/0259554 A1 | 10/2012 | Chen et al. |
| 2012/0271121 A1 | 10/2012 | Della Torre et al. |
| 2012/0275272 A1 | 11/2012 | Mullen et al. |
| 2012/0286933 A1 | 11/2012 | Hsiao |
| 2012/0299751 A1 | 11/2012 | Verna et al. |
| 2012/0299826 A1 | 11/2012 | Moeller |
| 2012/0330643 A1 | 12/2012 | Frei et al. |
| 2013/0057693 A1 | 3/2013 | Baranek |
| 2013/0090931 A1 | 4/2013 | Ghovanloo et al. |
| 2013/0200118 A1 | 8/2013 | Johnson |
| 2013/0300535 A1 | 11/2013 | Gorman |
| 2014/0030982 A1 | 1/2014 | Cardona |
| 2014/0081091 A1 | 3/2014 | Abolfathi et al. |
| 2014/0102288 A1 | 4/2014 | Yeshurun et al. |
| 2014/0118554 A1 | 5/2014 | Bucknor |
| 2014/0135593 A1 | 5/2014 | Jayalth et al. |
| 2014/0266705 A1 | 9/2014 | McKinley et al. |
| 2014/0349597 A1 | 11/2014 | Abolfathi et al. |
| 2014/0358516 A1 | 12/2014 | Lin et al. |
| 2014/0368814 A1 | 12/2014 | Krupkin et al. |
| 2015/0172520 A1 | 6/2015 | Lindman et al. |
| 2015/0189133 A1 | 7/2015 | Sandy |
| 2015/0241153 A1 | 8/2015 | Mardirossian |
| 2015/0290453 A1 | 10/2015 | Tyler et al. |
| 2015/0301619 A1 | 10/2015 | Menon |
| 2015/0346840 A1 | 12/2015 | Alonaizi |
| 2016/0000548 A1 | 1/2016 | Aiden et al. |

(56) References Cited

U.S. PATENT DOCUMENTS

| | | | |
|---|---|---|---|
| 2016/0036899 A1* | 2/2016 | Moody | H04L 67/141 709/217 |
| 2016/0038083 A1 | 2/2016 | Ding et al. | |
| 2016/0073025 A1 | 3/2016 | Cilia | |
| 2016/0078020 A1 | 3/2016 | Sumita et al. | |
| 2016/0088498 A1 | 3/2016 | Sharawi | |
| 2016/0117940 A1 | 4/2016 | Gomory et al. | |
| 2016/0125705 A1 | 5/2016 | Hurtig et al. | |
| 2016/0154468 A1 | 6/2016 | Kimmel | |
| 2016/0178326 A1 | 6/2016 | Strauss et al. | |
| 2016/0182850 A1 | 6/2016 | Thompson | |
| 2016/0310022 A1 | 10/2016 | Stivoric et al. | |
| 2016/0360146 A1 | 12/2016 | Smith | |
| 2016/0367188 A1 | 12/2016 | Malik et al. | |
| 2017/0061784 A1 | 3/2017 | Clough | |
| 2017/0092138 A1 | 3/2017 | Trundle et al. | |
| 2017/0102460 A1 | 4/2017 | Harris | |
| 2017/0127257 A1 | 5/2017 | Saxena et al. | |
| 2017/0135633 A1 | 5/2017 | Connor | |
| 2017/0154521 A1 | 6/2017 | Zamorano-Larrate | |
| 2017/0163956 A1 | 6/2017 | Lorenzetti | |
| 2017/0187876 A1 | 6/2017 | Hayes et al. | |
| 2017/0193308 A1 | 7/2017 | Buyse et al. | |
| 2017/0238129 A1 | 8/2017 | Maier et al. | |
| 2017/0253330 A1 | 9/2017 | Saigh et al. | |
| 2017/0272707 A1 | 9/2017 | Davis et al. | |
| 2017/0277700 A1 | 9/2017 | Davis et al. | |
| 2017/0337791 A1 | 11/2017 | Gordon-Carroll | |
| 2017/0339741 A1 | 11/2017 | K et al. | |
| 2017/0364349 A1 | 12/2017 | Conant et al. | |
| 2018/0047387 A1 | 2/2018 | Nir | |
| 2018/0050800 A1 | 2/2018 | Boykin et al. | |
| 2018/0059660 A1 | 3/2018 | Heatzig et al. | |
| 2018/0122205 A1 | 5/2018 | Mujeeb | |
| 2018/0233019 A1 | 8/2018 | Werronen et al. | |
| 2018/0292542 A1 | 10/2018 | Anand | |
| 2018/0300008 A1 | 10/2018 | Rasanen | |
| 2018/0325187 A1 | 11/2018 | Coalson, Jr. | |
| 2018/0327091 A1 | 11/2018 | Burks et al. | |
| 2018/0341262 A1 | 11/2018 | Yeshurun | |
| 2018/0367237 A1 | 12/2018 | Morrow et al. | |
| 2019/0004596 A1 | 1/2019 | Postcard et al. | |
| 2019/0037934 A1 | 2/2019 | Swank et al. | |
| 2019/0041975 A1 | 2/2019 | Anderson et al. | |
| 2019/0122516 A1 | 4/2019 | Lorenzetti et al. | |
| 2019/0130913 A1 | 5/2019 | Li | |
| 2019/0248391 A1 | 8/2019 | Preston et al. | |
| 2019/0283247 A1 | 9/2019 | Chang et al. | |
| 2019/0302894 A1 | 10/2019 | Alvarado et al. | |
| 2019/0369939 A1 | 12/2019 | Levesque et al. | |
| 2020/0020356 A1 | 1/2020 | Smith et al. | |
| 2020/0106818 A1 | 4/2020 | Luong | |
| 2020/0225684 A1 | 7/2020 | Anderson et al. | |
| 2020/0229739 A1 | 7/2020 | Reddy | |
| 2020/0286353 A1* | 9/2020 | Jafri | G08B 21/02 |
| 2020/0288089 A1 | 9/2020 | Thiel et al. | |
| 2020/0371227 A1 | 11/2020 | Malhi | |
| 2020/0375528 A1 | 12/2020 | Flanagan | |
| 2020/0380959 A1 | 12/2020 | Chen | |
| 2021/0071972 A1 | 3/2021 | Deng et al. | |
| 2021/0085247 A1 | 3/2021 | Meirav | |
| 2021/0137382 A1 | 5/2021 | Koster | |
| 2021/0145450 A1 | 5/2021 | Gruentzig | |
| 2021/0148679 A1 | 5/2021 | Basche et al. | |
| 2021/0152788 A1 | 5/2021 | Ross | |
| 2021/0192918 A1 | 6/2021 | Samadani et al. | |
| 2021/0216072 A1* | 7/2021 | Lacaze | B60R 11/04 |
| 2021/0256246 A1 | 8/2021 | Dagdeviren et al. | |
| 2021/0312143 A1 | 10/2021 | Trehan | |
| 2021/0326563 A1 | 10/2021 | Kossor | |
| 2021/0345118 A1 | 11/2021 | Guzik | |
| 2021/0346738 A1 | 11/2021 | Howland | |
| 2021/0364256 A1 | 11/2021 | Piro et al. | |
| 2021/0401075 A1 | 12/2021 | Gruentzig | |
| 2022/0004251 A1 | 1/2022 | Vega Gálvez et al. | |
| 2022/0067394 A1 | 3/2022 | Suksi et al. | |
| 2022/0096207 A1 | 3/2022 | Shanjani et al. | |
| 2022/0148320 A1 | 5/2022 | Alakarhu et al. | |
| 2022/0172585 A1 | 6/2022 | Wedig et al. | |
| 2022/0198597 A1 | 6/2022 | Hanchett et al. | |
| 2022/0223247 A1 | 7/2022 | Davidson et al. | |
| 2022/0231873 A1 | 7/2022 | Werfelli et al. | |
| 2022/0270610 A1 | 8/2022 | Spitzer-Williams et al. | |
| 2022/0288390 A1 | 9/2022 | Papay et al. | |
| 2022/0300719 A1 | 9/2022 | Raina | |
| 2022/0303449 A1 | 9/2022 | Bohlander et al. | |
| 2022/0311979 A1 | 9/2022 | Wexler et al. | |
| 2022/0353478 A1 | 11/2022 | Alakarhu et al. | |
| 2022/0364829 A1 | 11/2022 | Wallack et al. | |
| 2023/0009588 A1 | 1/2023 | Alphonse et al. | |
| 2023/0021300 A9 | 1/2023 | Rathnam et al. | |
| 2023/0049184 A1 | 2/2023 | Alakarhu | |
| 2023/0073359 A1 | 3/2023 | Kukuk | |
| 2023/0073517 A1 | 3/2023 | Jones et al. | |
| 2023/0074279 A1 | 3/2023 | Spitzer-Williams et al. | |
| 2023/0097676 A1 | 3/2023 | Liew et al. | |
| 2023/0102182 A1* | 3/2023 | Lee | G06Q 50/265 705/325 |
| 2023/0102363 A1 | 3/2023 | Mehring | |
| 2023/0149143 A1 | 5/2023 | Shanjani et al. | |
| 2023/0157564 A1 | 5/2023 | Zuckerman-Stark et al. | |
| 2023/0169881 A1 | 6/2023 | Evans et al. | |
| 2023/0188243 A1 | 6/2023 | Reynolds et al. | |
| 2023/0209156 A1 | 6/2023 | Lambert et al. | |
| 2023/0209440 A1 | 6/2023 | Frusina et al. | |
| 2023/0223038 A1 | 7/2023 | Shastry et al. | |
| 2023/0260070 A1 | 8/2023 | Smith et al. | |
| 2023/0262426 A1 | 8/2023 | Bohlander et al. | |
| 2023/0280125 A1 | 9/2023 | Prodzenko | |
| 2023/0284004 A1 | 9/2023 | Pellegrini et al. | |
| 2023/0300591 A1 | 9/2023 | Hamre et al. | |
| 2023/0336958 A1 | 10/2023 | Mehta et al. | |
| 2023/0349667 A1 | 11/2023 | Wagner et al. | |
| 2023/0368321 A1* | 11/2023 | Bringsjord | G06Q 50/26 |
| 2023/0388416 A1 | 11/2023 | Srivastava et al. | |
| 2023/0400551 A1 | 12/2023 | Parker et al. | |
| 2023/0417919 A1 | 12/2023 | Goldstein et al. | |
| 2024/0022343 A1* | 1/2024 | Graham | G01C 21/206 |
| 2024/0031522 A1 | 1/2024 | Davis et al. | |
| 2024/0046952 A1 | 2/2024 | Davis et al. | |
| 2024/0048673 A1 | 2/2024 | Thiel | |
| 2024/0053819 A1 | 2/2024 | Browy | |
| 2024/0099934 A1 | 3/2024 | Kozin et al. | |
| 2024/0127542 A1* | 4/2024 | Soryal | H04W 4/029 |
| 2024/0319839 A1* | 9/2024 | Lin | G08B 17/00 |

FOREIGN PATENT DOCUMENTS

| | | |
|---|---|---|
| CA | 2997443 C | 2/2021 |
| CN | 100577095 C | 1/2010 |
| CN | 101849713 A | 10/2010 |
| CN | 102120070 A | 7/2011 |
| CN | 102783193 A | 11/2012 |
| CN | 102903361 A | 1/2013 |
| CN | 103576691 A | 2/2014 |
| CN | 104635243 A | 5/2015 |
| CN | 104207761 B | 5/2016 |
| CN | 106127123 A | 11/2016 |
| CN | 206026321 U | 3/2017 |
| CN | 106652625 A | 5/2017 |
| CN | 103533129 B | 6/2017 |
| CN | 207039772 U | 2/2018 |
| CN | 105741514 B | 3/2018 |
| CN | 108806356 A | 11/2018 |
| CN | 105632049 A | 6/2019 |
| CN | 110177334 A | 8/2019 |
| CN | 111199668 A | 5/2020 |
| CN | 112419661 A | 2/2021 |
| CN | 213238622 U | 5/2021 |
| CN | 214906815 U | 11/2021 |
| CN | 114580980 A | 6/2022 |
| CN | 111124125 B | 6/2023 |
| CN | 116308944 B | 9/2023 |
| CN | 116943088 A | 10/2023 |

(56) References Cited

FOREIGN PATENT DOCUMENTS

| | | |
|---|---|---|
| DE | 102015003323 B4 | 2/2020 |
| EP | 3789966 A1 | 3/2021 |
| ES | 2343398 B1 | 6/2011 |
| IT | 202100017246 A1 | 12/2022 |
| JP | 2002230238 A | 8/2002 |
| JP | 2008529354 A | 7/2008 |
| JP | 2013171476 A | 9/2013 |
| JP | 2016131604 A | 7/2016 |
| JP | 2021027408 A | 2/2021 |
| JP | 7369507 B2 | 10/2023 |
| KR | 200453024 Y1 | 3/2011 |
| KR | 101197435 B1 | 11/2012 |
| KR | 101245165 B1 | 3/2013 |
| KR | 101440362 B1 | 9/2014 |
| KR | 101480302 B1 | 1/2015 |
| KR | 101613022 B1 | 4/2016 |
| KR | 20200104759 A | 9/2020 |
| KR | 102298763 B1 | 9/2021 |
| KR | 102442179 B1 | 9/2022 |
| KR | 102495287 81 | 2/2023 |
| KR | 20230128744 A | 9/2023 |
| TW | 201545132 A | 12/2015 |
| TW | I825793 B | 12/2023 |
| WO | 2001035044 A1 | 5/2001 |
| WO | 2006090371 A2 | 8/2006 |
| WO | 2008018947 A2 | 2/2008 |
| WO | 2011092553 A1 | 8/2011 |
| WO | 2011119673 A2 | 9/2011 |
| WO | 2012075292 A2 | 6/2012 |
| WO | 2012079791 A1 | 6/2012 |
| WO | 2014176485 A1 | 10/2014 |
| WO | 2014197463 A2 | 12/2014 |
| WO | 2015019360 A1 | 2/2015 |
| WO | 2015034149 A1 | 3/2015 |
| WO | 2016069052 A1 | 5/2016 |
| WO | 2017053693 A1 | 3/2017 |
| WO | 2018190748 A1 | 10/2018 |
| WO | 2018195704 A1 | 11/2018 |
| WO | 2020036643 A2 | 2/2020 |
| WO | 2020069512 A1 | 4/2020 |
| WO | 2020112245 A2 | 6/2020 |
| WO | 2020256906 A1 | 12/2020 |
| WO | 2021064490 A1 | 4/2021 |
| WO | 2022251371 A2 | 12/2022 |
| WO | 2022256698 A1 | 12/2022 |
| WO | 2023043965 A1 | 3/2023 |
| WO | 2023086851 A1 | 5/2023 |
| WO | 2023247811 A1 | 12/2023 |

OTHER PUBLICATIONS

"Next-Generation Incident Command System (NICS)", by Kontur, Found Online On [Mar. 12, 2024] https://www.kontur.io/portfolio/nics/.
"Next-Generation Incident Command System", by MIT Lincoln Laboratory, Found Online On [Mar. 12, 2024] https://www.ll.mit.edu/r-d/projects/next-generation-incident-command-system.
"Next-Generation Incident Command System Fact Sheet", by U.S. Department of Homeland Security, Published Online On [Jun. 5, 2024] https://www.dhs.gov/sites/default/files/publications/Next%20Generation%20Incident%20Command%20System-NICS_0.pdf.
"Response Tools", by NJ Resources, Found Online On [Mar. 12, 2024] https://njr.net/response-tools/.
"Axon Body 4", by Patrick W. Smith et al., Published In [1993] https://www.axon.com/products/axon-body-4.
"Digital Evidence Management, In-Car Video, and Advanced Body Cameras.", by Utility, Found Online On [Mar. 12, 2024] https://www.utility.com/.
"DisasterTech", by Roger Coleman et al., Published in [2019] https://www.disastertech.com/.
"Using Unmanned Aerial Vehicles (UAVs) as Mobile Sensing Platforms (MSPs) for Disaster Response, Civil Security and Public Safety", Published at Fundamental and Applied Research in Unmanned Aircraft Systems Technology, by Hanno Hildmann et al, Published Online On [Jul. 29, 2019] https://www.mdpi.com/2504-446X/3/3/59.
"Toward UAV-Based Airborne Computing", Published at IEEE Wireless Communications, by Kejie Lu et al., Published Online on [Aug. 5, 2019] https://par.nsf.gov/servlets/purl/10110848.
"Unmanned Aerial Vehicles for Wildland Fires: Sensing, Perception, Cooperation and Assistance", Published at Feature Papers of Drones, by Moulay A. Akhloufi et al., Published Online On [Feb. 22, 2021] https://www.mdpi.com/2504-446X/5/1/15.
"UAV-Enabled Disaster Management: Applications, Open Issues, And Challenges", Published at Journal of Field Robotics, by Amina Khan et al., Published Online On [Nov. 15, 2022] https://gmsarnjournal.com/home/wp-content/uploads/2023/06/vol18no1-6.pdf.
"Drone Swarms in Fire Suppression Activities: A Conceptual Framework", Published at UAV Application for Wildfire Detection, Prevention and Management, by Elena Ausonio et al., Published Online On [Mar. 7, 2021] https://www.mdpi.com/2504-446X/5/1/17.
"An Exploratory Study of the Use of Drones for Assisting Firefighters During Emergency Situations", Published at Conference on Human Factors in Computing Systems Proceedings, by Md. Nafiz Hasan Khan et al., Published Online On [May 2, 2019] http://clab.iat.sfu.ca/pubs/Khan-DronesFirefighters-CHI2019.pdf.
"The Good, the Bad and the Indispensable—Insights into the Practical Potential of Emergency Response Information Systems and Drones for Firefighters", Published at Hawaii International Conference on System Sciences, by Julian Weidinger, Published Online In [2018] https://core.ac.uk/download/pdf/143480849.pdf.
"Autonomous First Response Drone-Based Smart Rescue System for Critical Situation Management in Future Wireless Networks", Published at Journal on Innovative Communication Technologies, by Joel P. Lemayian et al., Published Online On [May 23, 2020] https://assets.pubpub.org/ybmy2nbl/71604609477880.pdf.
"Tactile Feedback in Defence & Security: The Next Frontier", by Haptic, Published Online on [May 13, 2023] https://www.haptic.ro/tactile-feedback-in-defence-security-the-next-frontier/.
"Wearable Technologies for Law Enforcement", Published at National Istitute of Justice, by Richard Silberglitt et al., Published Online on [Sep. 8, 2017] https://www.rand.org/content/dam/rand/pubs/research_reports/RR2000/RR2012/RAND_RR2012.pdf.
"IoT based Smart Vest and Helmet for Defence Sector", Published at IEEE International Conference on Communication Information and Computing Technology, by Ninad V. Joshi, Published Online On [Jun. 25, 2021] https://shorturl.at/inKQ8.
Utilizing Glove-Based Gestures and a Tactile Vest Display for Covert Communications and Robot Control, Published at Army Research Laboratory, by Linda R. Elliott et al., Published Online in [2014] https://apps.dtic.mil/sti/pdfs/ADA607637.pdf.
"Wearable Technologies Can Help Soldiers Survive in Adverse Environment", Published at Chakraview, by Dr. Jayakrishnan N. Nair, Published Online On [Dec. 18, 2020] https://defence.capital/2020/12/18/wearable-technologies-can-help-soldiers-survive-in-adverse-environment/.
"IOT Based Soldier E-Jacket Using GPS", Published at Journal of Interdisciplinary Cycle Research, by Prof.Swapnil Chaudhari et al., Published Online In [Mar. 2020] https://shorturl.at/euRZ7.
"Police Body-Worn Cameras and Privacy: Views and Concerns of Officers and Citizens", Published at International Journal of Police Science & Management, by Brigitte Poirier et al., Published Online On [Nov. 21, 2023] https://journals.sagepub.com/doi/pdf/10.1177/14613557231214383.
"LORA Based Soldier Tracking and Health Monitoring Device", Published at International Research Journal of Engineering and Technology, by Kruthikaran et al., Published Online in [Mar. 2023] https://www.irjet.net/archives/V10/i3/IRJET-V10I367.pdf.
"A Literature Review on IOT-Based Soldier Health Monitoring E-Jacket", Published at International Research Journal of Modernization in Engineering Technology and Science, by Ms. Dnyanada Meshram et al., Published Online in [Feb. 2023] https://www.irjmets.com/uploadedfiles/paper/issue_2_february_2023/33517/final/fin_irjmets1676464912.pdf.

(56) References Cited

OTHER PUBLICATIONS

"Body-Worn Cameras' Effects On Police Officers and Citizen Behavior: A Systematic Review", Published at Campbell Systematic Reviews, by Cynthia Lum et al., Published Online On [Sep. 9, 2020] https://onlinelibrary.wiley.com/doi/epdf/10.1002/cl2.1112.
"Enhancing Response Capabilities with Smartwatches in Public Safety", Published at The Public Safety Network, Found Online On [Mar. 12, 2024] https://www.publicsafety.network/wp-content/uploads/2021/01/Smartwatches-in-Public-Safety-White-Paper_FINAL.pdf.
"Police Tactical Vest: IoT and AI to Enhance Safety on Operations", Published at Mechatronics Canada, Published Online On [Mar. 1, 2024] https://www.mechatronicscanada.ca/product-news/police-tactical-vest-iot-ai/.
"Body-Worn Video Cameras for Law Enforcement Market Survey Report", Published at Homeland Security, Published Online In [Jun. 2015] https://www.dhs.gov/sites/default/files/publications/Body-Worn-Cams-MSR_0615-508_1.pdf.
"Police Body-Worn Cameras: Perceptions of Law Enforcement Leadership", Published at Springerlink, by John Ortiz Smykla, Oublished Online on [Dec. 4, 2015] https://link.springer.com/content/pdf/10.1007/s12103-015-9316-4.pdf.
"Geolocation Wearables for Enhanced Law Enforcement", Published at Utilities One, Published Online On [Nov. 15, 2023] https://utilitiesone.com/geolocation-wearables-for-enhanced-law-enforcement#anchor-0.
"Want to control your electronics with your tongue?", Published at ZDNET, by Jada Jones, Published Online On [May 13, 2023] https://www.zdnet.com/article/want-to-control-your-electronics-with-your-tongue-this-company-is-making-that-happen/.
"A Magnetic Wireless Tongue-Computer Interface", Published at IEEE Xplore, by Xueliang Huo et al., Published Online On [Jun. 11, 2007] https://www.researchgate.net/publication/4252014_A_Magnetic_Wireless_Tongue-Computer_Interface.
"A Hands-Free, Mouth Operated Joystick Computer Mouse Designed Specifically for Individuals With Disabled Hand Movement", by Quadlife, Published Online On [Sep. 17, 2020] https://quad.life/product.
"MouthPad Turns Your Tongue into a Mouse For Your Phone", Published at Engadget, by Cherlynn Low, Published Online On [Jan. 12, 2024] https://www.engadget.com/the-mouthpad-turns-your-tongue-into-a-mouse-for-your-phone-184541021.html?_fsig=dqmn468RiJE_pgKZXmIOHw--%7EA.
"Evaluation of the Tongue Drive System by Individuals with High-Level Spinal Cord Injury", Published at Conf Proc IEEE Eng Med Biol Soc, by Xueliang Huo et al., Published Online On [Mar. 12, 2024] https://www.ncbi.nlm.nih.gov/pmc/articles/PMC4467691/pdf/nihms698831.pdf.
"An Arch-Shaped Intraoral Tongue Drive System with Built-in Tongue-Computer Interfacing SoC", Published at Miniaturized Wireless Biosensors, by Hangue Park et al., Published Online On [Nov. 14, 2014] https://www.mdpi.com/1424-8220/14/11/21565.
"Body-Worn Camera Activation In Prisons: Understanding Correctional Officers' Decision-Making and Use of Discretion", Published at Security Journal, Published by Shannon Dodd et al., Published Online On [May 26, 2023] https://link.springer.com/article/10.1057/s41284-023-00380-7.
"Airfence", by Sensofusion, Found Online On [Jul. 19, 2024] https://sensofusion.com/airfence/.
"A Real-Time End-to-End Multilingual Speech Recognition Architecture", Published at IEEE Journal of Selected Topics in Signal Processing, Published by Javier Gonzalez-Dominguez et al., Published Online On [Oct. 23, 2014] https://ieeexplore.ieee.org/stamp/stamp.jsp?tp=&arnumber=6935076.
"Real-Time Multilingual Speech Recognition and Speaker Diarization System Based On Whisper Segmentation"; Published at PeerJ Computer Science, Published by Ke-Ming Lyu et al., Published Online On [Mar. 29, 2024] https://peerj.com/articles/cs-1973.pdf.
"Simultaneous Speech-To-Speech Translation System With Neural Incremental ASR, MT, And TTS", Published at Nara Institute of Science and Technology, Published by Katsuhito Sudoh et al., Published Online On [Nov. 10, 2020] https://arxiv.org/pdf/2011.04845.
"Simple, Lexicalized Choice of Translation Timing for Simultaneous Speech Translation", Published at Nara Institute of Science and Technology, Published by Tomoki Fujita, Published Online in [Jan. 2013] https://www.isca-archive.org/interspeech_2013/fujita13_interspeech.pdf.
"Real Time Speech Translator", Published at Czech Technical University (CTU), Published by Xavier Garcia Cabrera, Published Online On [Jun. 25, 2008] https://upcommons.upc.edu/bitstream/handle/2099.1/6128/memoria.pdf?sequence=1&isAllowed=y.
"An Empirical Simulation-based Study of Real-Time Speech Translation for Multilingual Global Project Teams", Published at International Symposium on Empirical Software Engineering and Measurement, Published by Fabio Calefato et al., Published Online On [Sep. 18, 2014] https://collab.di.uniba.it/fabio/wp-content/uploads/sites/5/2014/05/ESEM2014_camera-ready.pdf.
"Turning Whisper into Real-Time Transcription System", Published at International Joint Conference on Natural Language Processing (IJCNLP) and the 3rd Conference of the Asia-Pacific Chapter of the Association for Computational Linguistics (AACL), Published by Dominik Macháček et al., Published Online in [Nov. 2023] https://aclanthology.org/2023.ijcnlp-demo.3.pdf.
"Precision Payload Delivery System", by Corvo, Found Online On [Jul. 19, 2024] https://corvouas.com.au/wp-content/uploads/CORVO-PPDS-web-version-23082023-compressed.pdf.
"RQ-20 Puma", by AeroVironment, Inc., Published Online On [Aug. 4, 2020] https://english.iswnews.com/14555/military-knowledge-rq-20-puma-drone/.
"Counter Drone Systems", by Adani Defence and Aerospace, Found Online On [Jul. 19, 2024] https://www.adanidefence.com/en/counter-drone-systems.
"Dragon Eye Miniature UAV", by Defence Update, Published Online On [Aug. 23, 2005] https://defense-update.com/20050823_dragon-eye.html#google_vignette.
"Countering the UAS Threat", by Defence Update, Published by Tamir Eshel, Published Online On [Jun. 27, 2024] https://defense-update.com/20240627_c-uas-2.html#google_vignette.
"Multilingual Speech Transcription and Translation System", Published at International Journal of Advanced Research in Science, Communication and Technology (IJARSCT), Published by Dheeraj K N et al., Published Online in [Jun. 2024] https://ijarsct.co.in/Paper18843.pdf.
"Real Time Direct Speech-to-Speech Translation", Published at International Research Journal of Engineering and Technology (IRJET), Published by Sanchit Chaudhari et al., Published Online in [Jan. 2022] https://www.irjet.net/archives/V9/i1/IRJET-V9I1104.pdf.
"Methods and algorithms of correction of propagation factor influence on errors of measurement coordinates receivers GNSS", Published at International Crimean Conference Microwave & Telecommunication Technology, Published by V. I. Lutsenko et al., Published Online On [Oct. 22, 2012] https://ieeexplore.ieee.org/document/6335995/authors#authors.
"Elimination of abnormally high errors of determining the coordinates of global navigation satellite system receivers", Published at International Crimean Conference Microwave & Telecommunication Technology, Published by V.I. Lutsenko et al., Published Online On [Nov. 4, 2013] https://ieeexplore.ieee.org/document/6652840/authors#authors.
"Interpolation method of introducing differential corrections into measurements of coordinate and pseudoranges in global navigation systems", Published at International Crimean Conference Microwave & Telecommunication Technology, Published by V.I. Lutsenko et al., Published Online On [Nov. 4, 2013] https://ieeexplore.ieee.org/document/6652837/authors#authors.
"Fixed-Wing UAV Systems: Modular VTOL, Long-Range Maritime UAV, Tactical ISR UAS", by Tekever, Found Online On [Jul. 19, 2024] https://www.unmannedsystemstechnology.com/company/tekever/.

(56) References Cited

OTHER PUBLICATIONS

"Introducing Generative AI for Law Enforcement", by C3 AI, Published at Youtube, Published Online On [Aug. 10, 2023] https://www.youtube.com/watch?v=eO4cQjnwqgo.
"Vanderbilt Engineering Students Create "Smart Vest" to Save Police Officers", by Vanderbilt University, Published at Youtube, Published Online On [Apr. 27, 2017] https://www.youtube.com/watch?v=jq5DO3717E8.
"Smart Vest", by Harley-Davidson, Published at Youtube, Published Online On [Apr. 9, 2024] https://www.youtube.com/watch?v=C42bk5h4y-E.
"This Vest Can Save Lives", by Virginia Tech, Published at Youtube, Published online on [Sep. 1, 2015] https://www.youtube.com/watch?v=79x7_N6mTYo&t=6s.
"Vanderbilt Students Create Smart Police Vest", by Sarah McCarthy, Published at Newschannel 5, Published online On [Apr. 27, 2017] https://www.newschannel5.com/news/vanderbilt-students-create-smart-police-vest.
"Vanderbilt Students Develop Smart Police Vest That Calls For Backup", by Ariana Maia Sawyer, Published at The Tennessee, Published Online On [Apr. 25, 2017] https://www.tennessean.com/story/news/crime/2017/04/24/vanderbilt-students-develop-smart-police-vest-calls-backup/100854078/.
"Prototype "Smart Vest" Could Greatly Reduce Highway Worker Deaths and Injuries ByTalking to Traffic", by Tom Jackson, Published at EquipmentWorld, Published Online on [Sep. 22, 2015] https://www.equipmentworld.com/roadbuilding/video/14963694/prototype-smart-vest-could-greatly-reduce-highway-worker-deaths-and-injuries-by-talking-to-traffic.
"Smart Vest: Wearable Multi-Parameter Remote Physiological Monitoring System", by P.S. Pandian, Published at Medical Engineering & Physics, Published Online On [Sep. 14, 2007] https://www.sciencedirect.com/science/article/abs/pii/S1350453307000975?via%3Dihub.
"Robust Speech Recognition via Large-Scale Weak Supervision", by Alec Radford et al., Published at Cornell University, Published Online On [Dec. 6, 2022] https://arxiv.org/pdf/2212.04356.
"Faster-whisper", Published at Github, Found Online On [May 1, 2024] https://github.com/SYSTRAN/faster-whisper.
"Insanely Fast Whisper", Published at Github, Found Online On [May 1, 2024] https://github.com/Vaibhavs10/insanely-fast-whisper.
"WhisperLive", Published at Github, Found Online On [May 1, 2024] https://github.com/collabora/WhisperLive.
"Whisper.cpp", Published at Github, Found Online On [May 1, 2024] https://github.com/ggerganov/whisper.cpp/tree/master.
"Exploration of Alerting Methods on Vest-Worn System", by Kristen P. Hines, Published at Virginia Polytechnic Institute and State University, Published online On [May 4, 2016] https://vtechworks.lib.vt.edu/server/api/core/bitstreams/af47ee5d-2b50-462d-9da7-bd7982a1ecf3/content.
"Artificial Intelligence and Face Recognition for Body Cams", by Hernan Cafiel, Published at Ebenezer Technologies, Published Online on [Dec. 9, 2022] https://ebenezertechs.com/face-recognition-body-cams/.
"Integrating Body-Worn Cameras, Drones, And AI: A Framework Or Enhancing Police Readiness And Response", by Amanda Davies et al., Published at Oxford University Press, Published Online On [Dec. 13, 2023] https://academic.oup.com/policing/article/doi/10.1093/police/paad083/7471863.
"Security Analysis of First Responder Mobile and Wearable Devices", by Joshua M. Franklin, Published at National Institute of Standards and Technology Interagency, Published Online In [May 2020] https://nvlpubs.nist.gov/nistpubs/ir/2020/NIST.IR.8196.pdf.
"Body Worn Cameras With Facial Recognition Technology: When It Constitutes a Search", by Kelly Blount, Published at American University Washington College of Law, Published Online In [2017] https://core.ac.uk/download/pdf/327253044.pdf.

"Towards On-Device Face Recognition in Body-worn Cameras", by Ali Almadan, Published at IEEE International Workshop on Biometrics and Forensics, Published Online On [Apr. 7, 2021] https://arxiv.org/pdf/2104.03419.
"Law Enforcement's Pairing of Facial Recognition Technology with Body-Worn Cameras Escalates Privacy Concerns", by Katelyn Ringrose, Published at Virginia Law Review, Published Online On [Feb. 18, 2019] https://virginialawreview.org/wp-content/uploads/2020/12/04.%20Final%20Ringrose.pdf.
"Police use of facial recognition technology: The potential for engaging the public through co-constructed policy-making", by Dallas Hill, Published at International Journal of Police Science & Management, Published Online On [Apr. 4, 2022] https://journals.sagepub.com/doi/epub/10.1177/14613557221089558.
"Information Technology on the Beat: The Impacts of Body-Worn Camera and Facial Recognition Technology on Public Safety", by Jiyong Park, Published at University of North Carolina, Published Online On [Jul. 24, 2019] https://shorturl.at/bfqL.4.
"Chilling: The Constitutional Implications of Body-Worn Cameras and Facial Recognition Technology at Public Protests", by Julian R. Murphy, Published at Washington and Lee University, Published Online on [Aug. 30, 2018] https://scholarlycommons.law.wlu.edu/cgi/viewcontent.cgi?article=1104&context=wlulr-online.
"Recent Advances in Wearable Sensors for Health Monitoring", by Mary M. Rodgers, Published at IEEE Sensors Journal, Published online On [Sep. 16, 2014] https://shorturl.at/nwxY2.
"Dress for Success: Embedded Health Sensors In The Future Soldier", by Paul Dhillon, Published at Journal of Military, Veteran and Family Health, Published Online In [2022] https://jmvfh.utpjournals.press/doi/pdf/10.3138/jmvfh-2021-0095.
"How Biometric Monitoring Will Save Law Enforcement Lives", by Lt. Grant Bedford, Published at Police1, Published Online On [Dec. 18, 2019] https://www.police1.com/health-fitness/articles/how-biometric-monitoring-will-save-law-enforcement-lives-91PHTP83yHZNAOdw/#:~:text=These%20devices%20could%20be%20placed,monitoring%20program%20to%20other%20departments.
"Biometrics and Policing: A Protocol for Multichannel Sensor Data Collection and Exploratory Analysis of Contextualized Psychophysiological Response During Law Enforcement Operations", by Robert D Furberg et al., Published at JMIR Research Protocols, Published Online on [Mar. 17, 2017] https://pdfs.semanticscholar.org/e725/3d89aa98ffc8036163acdea18137db13464d.pdf.
"Real-Time Remote Health Monitoring Systems Using Body Sensor Information and Finger Vein Biometric Verification: A Multi-Layer Systematic Review", by A. H. Mohsin et al., Published at Journal of Medical Systems, Published Online On [Oct. 16, 2018] https://shorturl.at/IJPQ5.
"Warfighter Physiological and Environmental Monitoring", by G.A. Shaw et al., Published at Massachusetts Institute of Technology, Published Online On [Nov. 1, 2024] https://apps.dtic.mil/sti/tr/pdf/ADA428022.pdf.
"Wearable Health Devices—Vital Sign Monitoring, Systems and Technologies", by Duarte Diaset al., Published at Wearable Smart Devices, Published Online On [Jul. 25, 2018] https://www.mdpi.com/1424-8220/18/8/2414.
"On The Real-Time Prevention and Monitoring of Exertional Heat Illness in Military Personnel", by M.J. Buller, Published at Journal of Science and Medicine in Sport, Published Online On [Apr. 26, 2021] https://www.jsams.org/action/showPdf?pii=S1440-2440%2821%2900104-3.
"The Power of Biometrics: A Game-Changer for Officer Wellness", by Deputy Chief Aaron Johnson, Published at Police1, Published online on [Mar. 2, 2024] https://www.police1.com/wellness-week/the-power-of-biometrics-a-game-changer-for-officer-wellness.
"Wearable Tech for Law Enforcement", Published at inTime, Found Online on [May 3, 2024] https://intime.com/industries/police/wearable-tech-for-law-enforcement/.
"Can Body Cameras Reduce Altercations in a Correctional Facility?", by Dawn Lenzmeier, published at NEWCOM, Published Online On [Nov. 30, 2022] https://newcomglobal.com/wp-content/uploads/2022/11/NEWCOM-Body-Cameras-Reduce-Altercations-in-a-Correctional-Facility.pdf.

(56) References Cited

OTHER PUBLICATIONS

"Body Cameras in Corrections? Get ready For Game-Changing Benefits", Published at Utility, Published online on [Feb. 29, 2024] https://www.utility.com/blog/body-cameras-in-corrections-get-ready-for-game-changing-benefits/.
"Body-Worn Camera Activation in Prisons: Understanding Correctional Officers' Decision-Making and Use of Discretion", by Dodd, Published at Security Journal, Published Online on [May 26, 2023] https://research-repository.griffith.edu.au/server/api/core/bitstreams/b534906f-5064-4e5e-94a7-e0f8cf1c99a8/content.
"A Randomized Controlled Trial of the Impact of Body-Worn Cameras in the Loudoun County, VA, Adult Detention Center", by Brittany C. Cunningham et al., Published at CNA, Published Online In [Jun. 2023] https://www.ojp.gov/pdffiles1/nij/grants/307338.pdf.
"Body-Worn Camera Activation In Prisons: Understanding Correctional Officers' Decision-Making And Use Of Discretion", by Shanon Dodd et al., Published at Security Journal, Published On [May 26 2023] https://hizligecisodemesi.net/body-worn-camera-scholarly-articles-7cf3.
"Policing Universities: Exploring the use of body-worn cameras (BWCs) by private campus security officers", by Francesca Menichelli, Published at Policing and Society, Published Online on [Feb. 17, 2024] https://www.tandfonline.com/doi/epdf/10.1080/10439463.2024.2315583?needAccess=true.
"Transition of Body-Worn Cameras from Policing to Corrections", by Jasmine Kaur, Published at EBP Society, Published online On [Mar. 24, 2023] https://www.ebpsociety.org/blog/education/547-transition-of-body-worn-cameras-from-policing-to-corrections.
"Life-Saving Suits for Law Enforcement: Looking Ahead at Wearable Technology", by Thomas B. Cashion et al., Published at International Association of Chiefs of Police, Published Online on [Jun. 27, 2018] https://www.policechiefmagazine.org/life-saving-wearable-technology/.
"Policing Faces: The Present And Future of Intelligent Facial Surveillance", by Lachlan Urquhart et al., Published at Information & Communication Technology Law, Published online On [Oct. 28, 2021] https://www.pure.ed.ac.uk/ws/portalfiles/portal/239314767/UrquhartLMirandaD2021ICTLPolicingFaces.pdf.
"Hardware to Protect Against Drones", by Dedrone, Found Online On [May 3, 2024] https://www.dedrone.com/products/counter-drone-technology.
"Counter-Drone Solutions", ARDRONIS, Found Online On [May 3, 2024] https://www.rohde-schwarz.com/hk/products/aerospace-defense-security/counter-drone-systems_250881.html.
"Protectors of Critical Infrastructure are Enabled by Spotter Radars to Prevent Harm", by Spotter Global, Found Online On [May 3, 2024] https://www.spotterglobal.com/.
"Development of Equipment for Satellite Navigation Systems GLONASS, GPS, GALILEO", by KB Center, Found Online On [May 3, 2024] http://www.kbcentr.com.ua/.
"Design Smart Antenna for GPS/GLONASS Using Adaptive Beamforming", Herasymenko K.V. et al., Lviv Polytechnic National University Institutional Repository, Published Online In [Jan. 2012] https://shorturl.at/osIS5.
"Equipment Optimization For Weather Balloon and Ground-Based Weather Stations Using GNSS", by A. G. Laush, Published at International Conference on Antenna Theory and Techniques (ICATT), Published Online In [2017] https://sci-hub.yncjkj.com/10.1109/icatt.2017.7972662.
"A Novel Dual Band Microstrip Antenna Array for Receiving of Satellite Navigational Signals GPS/GLONASS/GALILEO", by Sergiy Y. Martynyuk et al., Published at International Conference on Antenna Theory and Techniques Published Online In [2015] https://sci-hub.yncjkj.com/10.1109/icatt.2015.7136781.
"Model of Mapping Function for The Calculation of Zenith Tropospheric Delay", by V.I. Lutsenko et al., Published at International Kharkov Symposium on Physics and Engineering of Microwaves, Millimeter and Submillimeter Waves, Published Online In [2013] https://sci-hub.53yu.com/10.1109/msmw.2013.6622052.

\* cited by examiner

| TYPE OF COMMUNICATION 300 | | | RECOMMENDATION 302 | ACTION INDICATOR 304 | |
|---|---|---|---|---|---|
| FIREGROUND COMMUNICATIONS 306 | | NOW | ADJUST DEPLOYMENT 326 BASED ON REAL-TIME STATUS AND HAZARDS. | ADJUST DEPLOYMENT 328 | DISMISS |
| EMERGENCY TRAFFIC 308 | | 3 MIN AGO | INITIATE EMERGENCY PROTOCOLS 330 FOR RISKS LIKE FLASHOVER, COLLAPSE, OR MAYDAY RESPONSES. | INITIATE PROTOCOL 334 | DISMISS |
| LOGISTICS SUPPORT REQUESTS 310 | | 8 MIN AGO | ORDER ADDITIONAL RESOURCES 332 OR RELIEF AS REQUESTED. | AUTHORIZE RESOURCES 336 | DISMISS |
| WEATHER UPDATES 312 | | 12 MIN AGO | UPDATE OPERATIONAL PLANS BASED ON LATEST WEATHER CONDITIONS. | UPDATE PLANS 338 | DISMISS |
| AIR SUPPORT COORDINATION 314 | | 24 MIN AGO | COORDINATE AIR SUPPORT TASKS AND ADJUST AS NECESSARY. | COORDINATE AIR SUPPORT 340 | DISMISS |
| INCIDENT ACTION PLANS UPDATES 316 | | 38 MIN AGO | IMPLEMENT UPDATED TACTICS OR STRATEGIES FROM THE IAP. | UPDATE IAP | DISMISS |
| INTER-AGENCY COMMUNICATIONS 318 | | 41 MIN AGO | FACILITATE COORDINATION AND INFORMATION SHARING WITH OTHER AGENCIES. | FACILITATE COORDINATION 342 | DISMISS |
| PUBLIC INFORMATION ANNOUNCEMENTS 320 | | 45 MIN AGO | DISSEMINATE PUBLIC ANNOUNCEMENTS AS REQUIRED. | BROADCAST INFO 344 | DISMISS |
| STATUS REPORTS AND CHECK-INS 322 | | 52 MIN AGO | REVIEW UNIT STATUS AND ADJUST ASSIGNMENTS AS NEEDED. | REVIEW STATUS 346 | DISMISS |
| MUTUAL AID REQUESTS 324 | | 1 HR AGO | COORDINATE MUTUAL AID EFFORTS AND INTEGRATE ADDITIONAL RESOURCES. | COORDINATE MUTUAL AID 348 | DISMISS |

ACTION VIEW 350

FIG. 3

THANK YOU BOARD 610

SECTOR 3 +70 PTS

+30 PTS TEAM ALPHA

+30 PTS UNIT BRAVO

WORDS OF ENCOURAGEMENT ALERTS 620

TACTICAL UPDATE ACKNOWLEDGMENT ALERT 602:
- ALERT: SECTOR 3 REPORTS SUCCESSFUL BACKBURN. SEND CUSTOM THANK YOU?
- ACTION PROMPT: SEND THANKS TO SECTOR 3 / VIEW UPDATE / DISMISS ALERT
- CUSTOM MESSAGE SUGGESTION: GREAT WORK, SECTOR 3 TEAM! YOUR EFFORTS ON THE BACKBURN HAVE MADE A SIGNIFICANT IMPACT. STAY SAFE AND KEEP UP THE EXCELLENT WORK! SEND

ENCOURAGEMENT AFTER LONG SHIFT ALERT 604:
- ALERT: TEAM ALPHA COMPLETING 24-HOUR SHIFT. SEND WORDS OF ENCOURAGEMENT?
- ACTION PROMPT: ENCOURAGE TEAM ALPHA / VIEW TEAM STATUS / DISMISS ALERT
- CUSTOM MESSAGE SUGGESTION: TEAM ALPHA, YOUR DEDICATION THROUGH THIS GRUELING SHIFT HAS BEEN NOTHING SHORT OF HEROIC. TAKE PRIDE IN YOUR RESILIENCE AND STRENGTH. WE'RE ALL BEHIND YOU! SEND

ACKNOWLEDGMENT FOR CRITICAL INFORMATION ALERT 606:
- ALERT: UNIT BRAVO PROVIDED VITAL WEATHER UPDATE. ACKNOWLEDGE CONTRIBUTION?
- ACTION PROMPT: ACKNOWLEDGE UNIT BRAVO / VIEW UPDATE / DISMISS ALERT
- CUSTOM MESSAGE SUGGESTION: A BIG THANK YOU TO UNIT BRAVO FOR THE CRUCIAL WEATHER INSIGHTS. YOUR VIGILANCE IS SAFEGUARDING LIVES AND GUIDING OUR STRATEGY. OUTSTANDING WORK! SEND

MILESTONE ACHIEVEMENT ALERT 608:
- ALERT: 50% CONTAINMENT ACHIEVED. RECOGNIZE COLLECTIVE EFFORT?
- ACTION PROMPT: RECOGNIZE EFFORT / VIEW CONTAINMENT DETAILS / DISMISS ALERT
- CUSTOM MESSAGE SUGGESTION: TO ALL TEAMS, WE'VE HIT THE 50% CONTAINMENT MILESTONE THROUGH OUR UNITED EFFORT. THIS ACHIEVEMENT REFLECTS YOUR HARD WORK AND DEDICATION. LET'S KEEP THE MOMENTUM GOING! SEND

SUPPORT FOR CHALLENGING OPERATION ALERT 612:
- ALERT: DIFFICULT NIGHT OPERATION AHEAD. SEND PRE-OPERATION ENCOURAGEMENT?
- ACTION PROMPT: SEND ENCOURAGEMENT / VIEW OPERATION PLAN / DISMISS ALERT
- CUSTOM MESSAGE SUGGESTION: AS WE HEAD INTO TONIGHT'S OPERATION, REMEMBER THAT YOUR COURAGE UNDER THESE CHALLENGING CONDITIONS INSPIRES US ALL. WE ARE WITH YOU EVERY STEP OF THE WAY. STAY STRONG AND COORDINATED. SEND

RECOGNITION VIEW 650

FIG. 6

| SCENARIO 702 | RADIO COMMUNICATION 104 | AI-GENERATED RECOMMENDATION 704 |
|---|---|---|
| RESIDENTIAL FIRE IN ATHERTON | STRUCTURE FIRE REPORTED AT A LARGE RESIDENTIAL COMPOUND ON MIDDLEFIELD ROAD, ATHERTON. | CHECK ATHERTON'S RESIDENTIAL ZONING FOR NEAREST WATER SOURCES AND ACCESS POINTS. ADVISE UNITS ON SCENE ABOUT POTENTIAL HIDDEN HAZARDS LIKE BASEMENT GAS LINES. ALERT NEARBY RESIDENTS VIA COMMUNITY ALERT SYSTEMS FOR POTENTIAL EVACUATION. |
| FLOOD THREAT IN EAST PALO ALTO | IMMINENT FLOOD WARNING FOR AREAS ADJACENT TO SAN FRANCISQUITO CREEK, EAST PALO ALTO. | DEPLOY FLOOD RESPONSE TEAMS WITH SANDBAGS TO REINFORCE CREEK BANKS. ACTIVATE EMERGENCY NOTIFICATION SYSTEMS FOR RESIDENTS IN THE FLOOD PATH WITH INSTRUCTIONS. PREPARE EVACUATION CENTERS IN HIGHER GROUND AREAS. |
| HAZARDOUS MATERIAL INCIDENT IN MENLO PARK | CHEMICAL LEAK DETECTED IN THE BOHANNON INDUSTRIAL PARK, MENLO PARK. POSSIBLE TOXIC EXPOSURE. | ISOLATE THE AFFECTED AREA BASED ON MENLO PARK INDUSTRIAL LAYOUT. DISPATCH HAZMAT UNITS EQUIPPED WITH NECESSARY PROTECTIVE GEAR. ISSUE SHELTER-IN-PLACE ORDERS FOR SURROUNDING BUSINESSES AND RESIDENTIAL AREAS UNTIL THE AREA IS DEEMED SAFE. |
| WILDFIRE NEAR WOODSIDE | WILDFIRE SPOTTED IN THE OPEN SPACES NEAR UNINCORPORATED WOODSIDE, MOVING TOWARD POPULATED AREAS. | UTILIZE SATELLITE IMAGERY TO TRACK THE WILDFIRE'S PROGRESSION. COORDINATE WITH CAL FIRE FOR AIR SUPPORT. PREPARE FOR EVACUATION ORDERS IN VULNERABLE UNINCORPORATED AREAS, PRIORITIZING THOSE WITH LIMITED EGRESS ROUTES. |
| VEHICLE COLLISION ON HIGHWAY | SIGNIFICANT TRAFFIC ACCIDENT ON HIGHWAY 101 NEAR MARSH ROAD, IMPACTING EMERGENCY ACCESS AND TRAFFIC FLOW. | COORDINATE WITH CALIFORNIA HIGHWAY PATROL FOR ACCIDENT DETAILS. ASSESS NEED FOR JAWS OF LIFE FOR EXTRICATION. IMPLEMENT TRAFFIC DIVERSION PLANS AND ADVISE PUBLIC TO AVOID THE AREA THROUGH LOCAL RADIO AND SOCIAL MEDIA. |
| SEISMIC ACTIVITY AND STRUCTURAL ASSESSMENT | RECENT SEISMIC EVENT FELT ACROSS THE DISTRICT. INITIAL REPORTS OF STRUCTURAL DAMAGES IN SEVERAL LOCATIONS. | PRIORITIZE STRUCTURAL ASSESSMENTS STARTING WITH CRITICAL INFRASTRUCTURE LIKE BRIDGES AND HOSPITALS. DISPATCH SEARCH AND RESCUE TEAMS TO REPORTED DAMAGE SITES. COORDINATE WITH LOCAL UTILITIES TO CHECK FOR GAS LEAKS OR POWER OUTAGES. |
| POWER OUTAGE IN EAST PALO ALTO | WIDESPREAD POWER OUTAGE REPORTED IN EAST PALO ALTO AFFECTING RESIDENTIAL AREAS AND TRAFFIC LIGHTS. | DEPLOY PORTABLE GENERATORS TO CRITICAL FACILITIES SUCH AS CARE HOMES AND EMERGENCY SHELTERS. COORDINATE WITH THE UTILITY COMPANY ON RESTORATION EFFORTS. SET UP TEMPORARY TRAFFIC CONTROL MEASURES AT MAJOR INTERSECTIONS. |
| GAS LEAK IN MENLO PARK NEIGHBORHOOD | SUSPECTED NATURAL GAS LEAK REPORTED ON SANTA CRUZ AVENUE, MENLO PARK. EVACUATIONS UNDERWAY. | ESTABLISH A SAFE PERIMETER AND COORDINATE WITH THE GAS UTILITY FOR A RAPID RESPONSE. USE LOUDSPEAKERS AND DOOR-TO-DOOR TEAMS TO EVACUATE RESIDENTS WITHIN THE DANGER ZONE. MONITOR AIR QUALITY AND PREPARE FOR POTENTIAL IGNITION SOURCES. |

LOCAL VIEW
750

FIG. 7

| TYPE OF COMMUNICATION 300 | RADIO COMMUNICATION 104 | USEFUL QUERY 902 |
|---|---|---|
| FIREGROUND COMMUNICATIONS 306 — NOW | INTENSE FIRE BEHAVIOR OBSERVED IN THE NORTHEAST QUADRANT. | WHAT'S THE LATEST FIRE BEHAVIOR MODEL PREDICTION FOR THE NORTHEAST QUADRANT? |
| EMERGENCY TRAFFIC 308 — 3 MIN AGO | MAYDAY FROM SQUAD 5, FIREFIGHTER DOWN IN THE SOUTHERN SECTOR. | WHERE IS THE NEAREST MEDICAL UNIT TO SQUAD 5'S LAST REPORTED LOCATION? |
| LOGISTICS SUPPORT REQUESTS 310 — 8 MIN AGO | REQUEST ADDITIONAL TYPE 1 ENGINES FOR THE WEST FLANK. | WHAT'S THE AVAILABILITY OF TYPE 1 ENGINES IN THE VICINITY, AND HOW SOON CAN THEY REACH THE WEST FLANK? |
| WEATHER UPDATES 312 — 12 MIN AGO | SIGNIFICANT WIND SHIFT EXPECTED TO THE EAST WITHIN THE NEXT HOUR. | HOW WILL THE EXPECTED WIND SHIFT IMPACT THE CURRENT FIRE SPREAD DIRECTION? |
| AIR SUPPORT COORDINATION 314 — 24 MIN AGO | WATER DROP NEEDED ON HOTSPOTS NEAR THE CONTAINMENT LINE ON RIDGE ROAD. | WHAT ARE THE CURRENT AIR ASSETS AVAILABLE FOR A WATER DROP ON RIDGE ROAD? |
| INCIDENT ACTION PLANS UPDATES 316 — 38 MIN AGO | UPDATE TO IAP: NIGHT OPERATIONS TO FOCUS ON NORTHERN CONTAINMENT LINE STRENGTHENING. | WHAT RESOURCES ARE CURRENTLY ALLOCATED TO THE NORTHERN CONTAINMENT LINE ACCORDING TO THE LATEST IAP UPDATE? |
| INTER-AGENCY COMMUNICATIONS 318 — 41 MIN AGO | FORESTRY SERVICE REPORTS INCREASED FIRE ACTIVITY NEAR PROTECTED WILDLIFE AREA. | CAN WE GET AN UPDATE ON THE FIRE'S IMPACT ON THE PROTECTED WILDLIFE AREA FROM THE FORESTRY SERVICE? |
| PUBLIC INFORMATION ANNOUNCEMENTS 320 — 45 MIN AGO | EVACUATION ORDER ISSUED FOR ZONES 4 AND 5 DUE TO FIRE ADVANCEMENT. | WHAT'S THE STATUS OF EVACUATION IN ZONES 4 AND 5, AND ARE THERE ANY BOTTLENECKS REPORTED? |
| STATUS REPORTS AND CHECK-INS 322 — 52 MIN AGO | UNIT 3 REPORTING 75% CONTAINMENT ON THE EASTERN FIRE LINE. | WHAT'S THE OVERALL CONTAINMENT PERCENTAGE WITH UNIT 3'S LATEST UPDATE? |
| MUTUAL AID REQUESTS 324 — 1 HR AGO | NEIGHBORING COUNTY OFFERING HELICOPTER SUPPORT FOR SURVEILLANCE. | WHAT ARE THE COORDINATION DETAILS FOR THE INCOMING HELICOPTER SUPPORT FROM THE NEIGHBORING COUNTY? |

QUERY VIEW 950

FIG. 9

NEVER LET CRUCIAL INFORMATION BE MISSED DURING FIRE INCIDENT —1550

◆ GOVGPT FIREFLY

TRANSCRIPT    AI SUMMARY —1506    1504 — ALL CHANNELS ⌄

② MARK (CHANNEL 2)  2:31

UNIT 1, THIS IS CENTRAL. WE HAVE REPORTS OF A STRUCTURE FIRE AT 123 MAIN STREET. RESPOND CODE 3

① JACOB (CHANNEL 1)  3:32

UNIT 1, PLEASE ESTABLISH INCIDENT COMMAND ON THE WEST SIDE OF THE SITE AND COORDINATE WITH HAZMAT TEAMS FOR CONTAINMENT AND MITIGATION EFFORTS. UNIT2, INITIATE EVACUATIONS AND ESTABLISH A PERIMETER TO ENSURE THE SAFETY OF RESIDENTS AND ONLOOKERS. PROVIDE UPDATES ON THE EVACUATION PROGRESS

② MARK (CHANNEL 2)  2:31    ⚠ IMPORTANT

CENTRAL, UNIT 2 EN ROUTE AS WELL, ETA 7 MINUTES. CONFIRMING OCCUPANTS TRAPPED, OVER. ALL RESPONDING UNITS, EXERCISE CAUTION, WEAR APPROPRIATE PERSONAL PROTECTIVE EQUIPMENT, AND KEEP COMMUNICATION CHANNELS CLEAR FOR ESSENTIAL

[DRONE]   [TRANSCRIPT]   [SITE PLAN]

REAL-TIME ALERTS —1404

● 1 MIN AGO

🛢 LOGISTICS SUPPORT REQUEST    ✕   ＞

ORDER ADDITIONAL RESOURCES OR RELIEF AS REQUESTED

[AUTHORIZE RESOURCES]  [REVIEW RESOURCES]

● 2 MINS AGO

⚖ RESOURCE ALLOCATION ALERT    ✕   ＞

RESOURCE IMBALANCE DETECTED, REALLOCATE ASSETS TO NORTHERN PERIMETER

[REALLOCATE NOW]  [REVIEW RESOURCES]

[📞]    [✦ ASK AI]

FIG. 15

RESPONSE PLAN MODIFICATION THROUGH ARTIFICIAL INTELLIGENCE APPLIED TO AMBIENT DATA COMMUNICATED TO AN INCIDENT COMMANDER

CLAIM OF PRIORITY

This Application is a conversion Application of, claims priority to, and incorporates by reference herein the entirety of the disclosures of:

U.S. Provisional Patent Application No. 63/614,022 titled MULTI-FUNCTIONAL WEARABLE AI-ENABLED PENDANT APPARATUS, SYSTEM, AND METHOD OF AMBIENT DATA ANALYSIS AND COMMUNICATION IN LAW ENFORCEMENT, FIRE, MEDICAL RESPONDER, PRIVATE SECURITY, JOURNALISM, COMMERCIAL AND MILITARY OPERATIONAL ENVIRONMENTS filed on Dec. 22, 2023, and U.S. Provisional Patent Application No. 63/616,817 titled EMOTIONALLY INTELLIGENT AERIAL DRONE SYSTEM FOR ENHANCED SITUATIONAL AWARENESS AND RESPONSIVE OPERATIONS filed on Jan. 1, 2024, and U.S. Provisional Patent Application No. 63/626,075 titled SECURE EDGE MESH NETWORK SYSTEM FOR ENHANCED VISUAL INTERPRETATION AND REAL-TIME SITUATIONAL AWARENESS IN COMBAT ZONES filed on Jan. 29, 2024.

FIELD OF TECHNOLOGY

The present disclosure relates generally to the field of firefighter technology. More specifically, the invention pertains to a method, system, and apparatus of response plan modification through artificial intelligence applied to ambient data communicated to an incident commander.

BACKGROUND

A battalion chief is a high-ranking officer in a fire department, typically responsible for managing the operations of a specific battalion within the department. Their role is crucial in both administrative functions and on-the-ground fire and emergency response activities. They oversee the daily operations, ensuring that the team is prepared and equipped to respond to emergencies. During fire or emergency incidents, the battalion chief may serve as the incident commander. They may be responsible for directing firefighting tactics, rescue operations, and coordinating with other emergency services. They can play a significant role in planning and implementing strategies for emergency response, and ensuring that fire deployments are adequately staffed and equipped.

The role of a battalion chief in a fire department is both challenging and demanding. One of the biggest challenges is making quick, accurate, and effective decisions during emergency situations. Emergency scenes are often chaotic and multifaceted, involving numerous variables like fire behavior, structural integrity, civilian presence, and/or environmental conditions. The pressure of knowing that decisions can directly affect the safety and lives of both civilians and team members adds significant stress and responsibility. Resources like personnel, equipment, and/or financial support are often limited. In a large-scale incident or when multiple emergencies occur simultaneously, these resources can be stretched thin. Determining the most effective deployment of resources requires a deep understanding of the incident needs versus available assets. Misallocation can lead to inadequate responses and increased risks. There's a risk of overextending the department's capabilities, which can compromise response effectiveness and crew safety, especially if the incident escalates or prolongs. Staying calm and composed in high-stress environments is challenging in these circumstances. The battalion chief's demeanor and decisions directly affect the morale and confidence of the team. Showing uncertainty or panic can undermine the team's effectiveness.

Information overload is a significant challenge for battalion chiefs, especially during high-pressure and rapidly evolving emergency situations. During emergencies, battalion chiefs are inundated with a vast amount of information from various sources, including radio communications, reports from the field, data from sensors and surveillance systems, and inputs from other emergency services. Processing and assimilating all this information quickly and accurately can be overwhelming, leading to difficulty in prioritizing and focusing on the most critical data. Emergencies, particularly fires and natural disasters, can evolve rapidly. Keeping up with the pace of change and continuously updating strategies based on new information adds to the cognitive load. There's a risk of crucial information being missed or outdated due to the rapid succession of events.

With lives and property at stake, battalion chiefs may not be able to make quick enough decisions based on the information they receive. Information overload can lead to decision fatigue, slowing down response times or leading to less optimal decisions. The pressure to act quickly can also lead to snap decisions without fully considering all available information. Information overload can lead to miscommunication, unclear instructions, or vital information being lost in the sea of incoming data. Managing and disseminating information efficiently to various teams while maintaining clarity can be a formidable task. Continuously dealing with excessive information, especially in life-threatening situations, can lead to high levels of stress and mental strain. This can impact the battalion chief's overall health and well-being. Prolonged exposure to such conditions can lead to burnout, impacting performance and decision-making ability over time.

SUMMARY

Disclosed are a method, system, and apparatus of response plan modification through artificial intelligence applied to ambient data communicated to an incident commander.

In one aspect, a method includes analyzing a description of a fire in progress, automatically generating an incident action plan through an Incident Action Artificial-Intelligence Model ("IAAIM") based on the description of the fire in progress, and modifying the incident action plan based on a trusted radio communication to an incident commander.

The trusted radio communication may be from a tactical firefighter, a fire captain, a dispatch center, and/or a regional fire center. The method may include analyzing a video feed from an unmanned aerial vehicle encompassing an area of the fire in progress. The method may include applying a computer vision algorithm to the video feed from the unmanned aerial vehicle to identify a risk associated with human safety in the area of the ongoing fire. Further, the method may include modifying the incident action plan based on the identification of the risk associated with human safety in the area of the fire in progress.

The description may be an input to the IAAIM and provided from a dispatch center, an eyewitness, and/or an observational camera in the area of the fire in progress. The method may further include analyzing a heat signature captured through a thermal imaging camera in the area of the fire in progress. In addition, the method may include identifying the risk associated with the heat signature captured by thermal imaging camera in the area of the fire in progress. Furthermore, the method may include modifying the incident action plan based on the identification of the risk associated with the heat signature captured through the thermal imaging camera in the area of the fire in progress.

Additionally, the method may further include generating a next action recommendation associated with the incident action plan, and displaying the incident action plan along with the next action recommendation on a touchscreen display within a fire commander vehicle.

The method may include automatically performing the next action recommended by the IAAIM when an action-indicator associated with the next action recommendation is selected. The method may include fine-tuning a large language model based on a site plan data, a policy data, a procedure data, a historical fire incident response data, and/or an emergency operation plan data associated with a jurisdictional entity. The method may include forming the IAAIM when the fine-tuning of the large language model exceeds an accuracy threshold. The method may be responsive to a verbal query to the IAAIM by generating a response based on aggregate situational data communicated to the incident commander. The method further includes generating the IAAIM through an edge based ad-hoc network formed between devices communicatively coupled during the fire in progress.

In another aspect, an interactive voice response device includes an interpretation module, a voice input microphone, and an Incident Action Artificial-Intelligence Model ("IAAIM"). The interpretation module communicates ambient sensory data to an incident commander during an emergency event in progress. The voice input microphone receives a verbal query from the incident commander during the emergency event in progress and the Incident Action Artificial-Intelligence Model ("IAAIM") automatically generates a response to the ambient sensory data communicated to the incident commander during the emergency event in progress.

The ambient sensory data may be trusted data such as a drone feed during the emergency event in progress, a radio communication from a first responder during the emergency event, and/or a message from a dispatch center. The interactive voice response device may analyze a video feed from an unmanned aerial vehicle visually perceiving the emergency event in progress. The interactive voice response device may apply a computer vision algorithm to the video feed from the unmanned aerial vehicle to identify a risk associated with human safety during the emergency event in progress, and may modify the incident action plan based on the identification of the risk associated with human safety during the emergency event in progress.

A description of the emergency event in progress may be an input to the interactive voice response device and is provided from a dispatch center, an eyewitness, and/or an observational camera in an area of the emergency event in progress.

The interactive voice response device may analyze a heat signature captured through a thermal imaging camera in the area of the emergency event in progress. The interactive voice response device may identify the risk associated with the heat signature captured through the thermal imaging camera in the area of the emergency event in progress, and may further modify the incident action plan based on the identification of the risk associated with the heat signature captured through the thermal imaging camera in the area of the emergency event in progress.

In yet another aspect, a method includes modifying an incident action plan based on a trusted radio communication to an incident commander using an Incident Action Artificial-Intelligence Model ("IAAIM"). The trusted radio communication is from a tactical firefighter, a fire captain, a dispatch center, and/or a regional fire center. The method includes analyzing sensory data from a vehicle encompassing an area of a fire in progress. In addition, the method includes applying a sensory analysis algorithm to the sensory data to identify a risk associated with human safety in the area of the fire in progress and modifying the incident action plan based on the identification of the risk associated with human safety in the area of the fire in progress.

The trusted radio communication may be an input to the IAAIM device and/or is provided from a dispatch center, an eyewitness, and/or an observational camera in the area of the fire in progress. The method may further include analyzing a heat signature captured through a thermal imaging camera in the area of the fire in progress. Furthermore, the method may include generating a next action recommendation associated with the incident action plan and displaying the incident action plan along with the next action recommendation on a touchscreen display within a fire commander vehicle. In addition, the method may further include automatically performing the next action recommended by the IAAIM device when an action-indicator associated with the next action recommendation is selected.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 3 is an action view illustrating a user interface of the display in which different communication types are associated with different recommended actions. An indicator includes a button through which an action can be taken, according to one embodiment.

FIG. 6 is a recognition view illustrating a user interface of the display in which a thank you leader board is shown on a left side of the display, with opportunities to give recognition are shown on the right side of the display, according to one embodiment.

FIG. 7 is a local view illustrating a user interface of the display in which different scenarios are associated with different radio communications along with a generated recommendation, according to one embodiment.

FIG. 9 is a query view illustrating useful queries that might be possible to the generative AI pendant for different types of communications, according to one embodiment.

FIG. 15 is a user interaction view showing a transcript view along with highlighted alerts, according to one embodiment.

Figure 1:
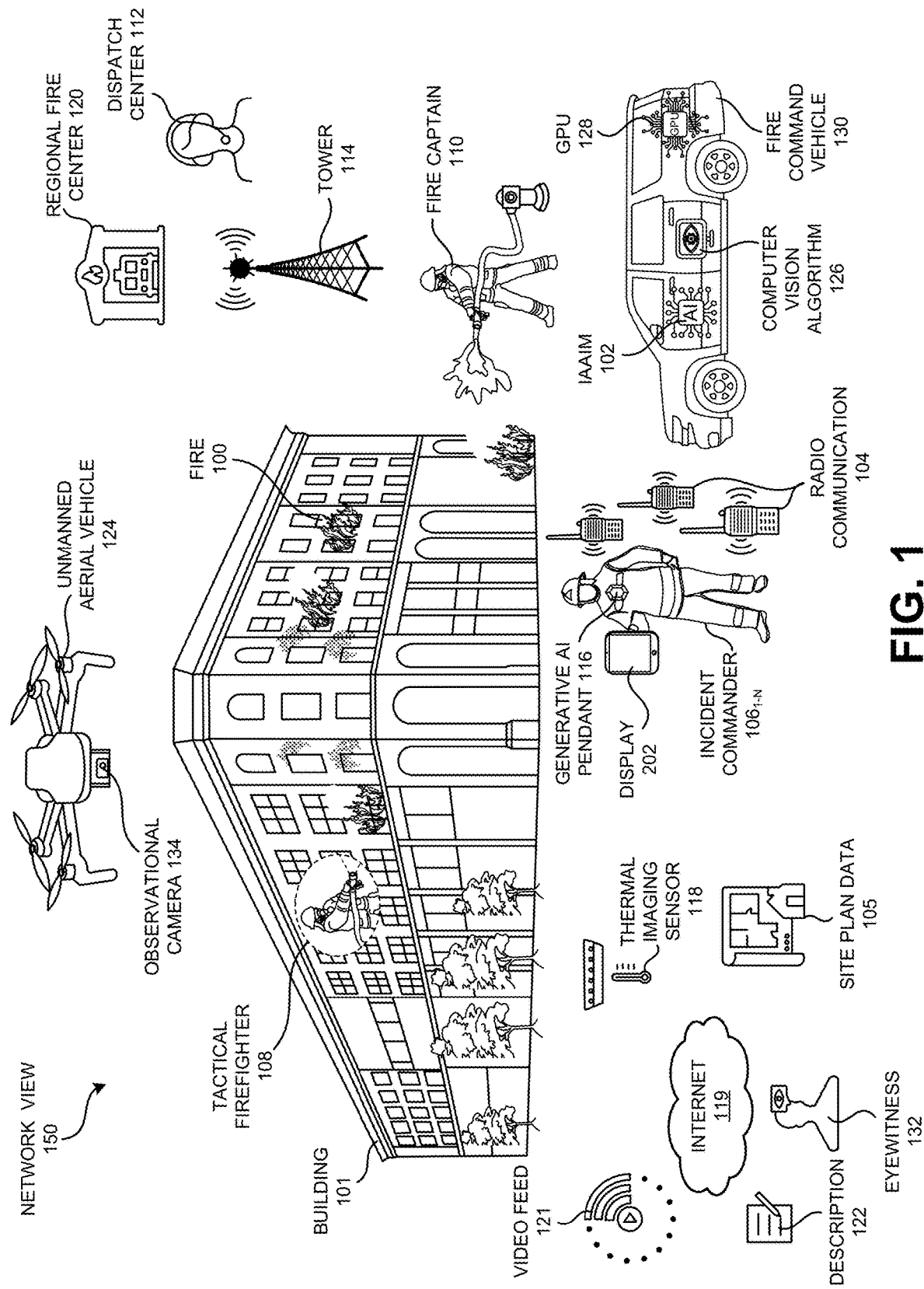
FIG. 1 is a system view to automatically suggest modifications to an incident action plan on a display, wherein the modifications are responsive to ambient sensory information captured by a wearable generative AI pendant on a body of an incident commander with captured information processed through an Incident Action Artificial-Intelligence Model ("IAAIM"), according to one embodiment.

Other features of the present embodiments will be apparent from the accompanying drawings and from the detailed description that follows.

DETAILED DESCRIPTION

Disclosed is a method, system, and apparatus of response plan modification through artificial intelligence applied to ambient data communicated to an incident commander 106.

The described embodiments represent a groundbreaking approach in firefighting technology. GovGPT Firefly™ is a wearable artificial intelligence (AI) device (e.g., using a generative AI pendant 116 of the IAAIM 102) designed for battalion chiefs and incident commanders $106_{1-N}$ in firefighting scenarios, according to one embodiment. It silently listens to radio communications received during an active fire 100, and provides real-time recommendations 302 to modify an incident action plan 200 based on changing circumstances, according to one embodiment. These recommendations 302 are provided on a touchscreen display 202 and the incident commander 106 is able to adopt and implement suggestions with just a single click, according to one embodiment.

The GovGPT Firefly™ pendant (e.g., using a generative AI pendant 116 of the IAAIM 102) also facilitates hands-free operation through interactive voice response 802, providing real-time data querying for information in emergency situations, according to one embodiment. The device is built to be durable and resistant to extreme conditions, including heat, smoke, and water. It is compact for ease of wear during extended operations, according to one embodiment.

The apparatus, devices, methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and the detailed description that follows.

Integration of Building Site Plans

Building site plans (e.g. site plan data 105) can be uploaded to the GovGPT Firefly™ system ahead of time or accessed in real-time from municipal databases when an incident is reported. The system's AI analyzes the site plan to identify key elements such as fire hydrant locations, building entrances and exits, structural materials, and areas of potential risk (e.g., gas lines, chemical storage, etc.), according to one embodiment. Based on this analysis, GovGPT Firefly™ can automatically generate an initial incident response plan (e.g., incident action plan 200). This plan can outline optimal entry points for tactical firefighters (e.g., the tactical firefighter 108), areas to prioritize for evacuation, locations for staging equipment, and the best routes for hoses and/or ladders. The AI evaluates the incident's scale, potential spread, and specific needs (e.g., need for hazardous materials units, aerial ladder trucks, etc.) against the available resources, according to one embodiment. It then recommends an initial allocation of resources, suggesting how many units to deploy and where to position them for maximum effectiveness, according to one embodiment As the incident evolves, GovGPT Firefly™ can update its recommendations 302 to the incident commander 106 in real-time, reallocating resources as needed based on the changing situation and additional input from on-scene fire captain 110 and/or tactical firefighters (e.g., the tactical firefighter 108). The system can continuously monitor the situation, integrating new data from sensors, drones (e.g, the unmanned aerial vehicle 124), and/or personnel (e.g., fire captain 110) on the ground. It can adjust the incident response plan in real time, advising on shifts in resource allocation or tactics as the incident develops. GovGPT Firefly™ can serve as a central hub for information dissemination, ensuring all teams have up-to-date plans and maps.

It can automatically communicate adjustments or new orders to all affected units, improving coordination and response time. By providing a detailed, strategic overview of the incident from the outset, GovGPT Firefly™ helps to ensure responder safety, reducing the risk of entering hazardous areas unprepared, according to one embodiment. It enables a more efficient, targeted response, potentially reducing the damage and speeding up the resolution of the incident, according to one embodiment. Integrating building site plans with GovGPT Firefly™ for automated initial response and resource allocation planning offers a significant advancement in emergency response capabilities, according to one embodiment. This approach not only enhances operational efficiency and safety but also ensures a more coordinated and strategic incident management process, tailored to the specific challenges of each unique situation, according to one embodiment.

FIG. 1 is a network view 150 to automatically suggest modifications to an incident action plan 200 on a display 202, according to one embodiment. The modifications are responsive to ambient sensory information (e.g., radio communication 104) captured by a wearable generative AI pendant 116 (GovGPT Firefly™) on a body of an incident commander 106, according to one embodiment. The captured information is processed through an Incident Action Artificial-Intelligence Model ("IAAIM") 102, according to one embodiment.

During a fire 100, the incident commander 106 may form an initial incident action plan 200 from a description 122 of the incident provided by a dispatch center 112. The dispatch center 112 may have received a report of the fire 100 from an eyewitness 132, and then contacted a fire department (e.g., a regional fire center 120) to respond. The fire department may have designated a battalion commander (e.g., a fire captain 110) to create the initial incident response plan, and then to serve as the incident commander 106 during the fire 100. The incident commander 106 may rely on various types of radio broadcasts (e.g., radio communication 104) on different operating channels to manage a situation effectively. These radio communications 104 may play a crucial role in ensuring communication among all participating units and personnel, enabling a coordinated response. When the incident commander 106 hears these communications, so too does the generative AI pendant 116, according to one embodiment. The information captured by the generative AI pendant 116 is then processed through the IAAIM 102 to modify the incident action plan 200 in real time, according to one embodiment. The IAAIM 102 may employ a sophisticated computer vision algorithm 126 to convert video images (e.g., a video feed 121) captured into descriptive text, according to one embodiment. The IAAIM 102 may be formed through a graphics processing unit (GPU) 128, according to one embodiment. The modifications are displayed on the display 202 (e.g., a GovGPT Firefly™ Display), according to one embodiment.

In one or more embodiments, the radio communications 104 may have several advantages over phone communications, especially in the context of emergency response and incident management, such as during a fire 100. These advantages can make radio communications 104 (e.g., through tower 114) the preferred method for coordinating with an incident commander 106 and other emergency personnel (e.g., fire captain 110). Here are the key reasons why:

Simultaneous Broadcasts: Radio may allow for one-to-many communication, enabling an incident commander 106 to broadcast a message (e.g., using recommendation 302) to all units simultaneously. This may be crucial for efficiently disseminating orders, updates, and/or information to multiple responders (e.g., fire captain 110, dispatch center 112, tactical firefighter 108, etc.) at once, something that phone communications cannot easily replicate without a conference call setup, and which may not be feasible or quick to arrange in an emergency, according to one embodiment.

Reliability in Adverse Conditions: Radio systems can be more reliable than phone networks during emergencies. They can operate independently of cellular networks (e.g., using Internet 119) and power grids, which may be compromised during major incidents. Radios can use repeaters to extend their range and are designed to function in harsh conditions, according to one embodiment.

Instant Communication: With radios, communication is almost instantaneous (e.g., through tower 114), according to one embodiment. There's no need to dial a number and wait for an answer. This immediacy can be critical in emergencies where every second counts, according to one embodiment.

Durability and Practicality: Radios used by emergency services may be designed to be rugged and durable, able to withstand harsh environments, and may have long battery lives, according to one embodiment. They may also be designed for easy use with gloves, in smoke-filled environments, or when the user's visibility might be impaired.

Dedicated Networks: Emergency services may use dedicated radio frequencies that are less likely to be congested than public cellular networks (e.g., Internet 119). This can ensure that communications remain clear and uninterrupted during widespread emergencies when cellular networks might be overwhelmed with traffic, according to one embodiment.

Prioritization of Communications: Radio systems may have the capability to prioritize communications, ensuring that critical messages from the incident commander 106 and/or about firefighter safety are given precedence over other transmissions, according to one embodiment.

Hands-free Operation: Many radio systems may allow for hands-free operation, which can be essential for firefighters and other emergency responders (e.g., fire captain 110, tactical firefighter 108, etc.) who need to keep their hands free for equipment, driving, or managing emergency situations, according to one embodiment.

Security and Privacy: Radio communications 104 can be encrypted and secured to prevent unauthorized listening, which can be important for maintaining operational security and the privacy of sensitive information, according to one embodiment.

Interoperability: Modern radio systems may be designed with interoperability in mind, allowing different agencies and responders to communicate across different frequencies and systems when necessary. While phone systems can offer similar features through apps or services, the simplicity and reliability of radio make it more suitable for emergency response, according to one embodiment.

These characteristics make radio broadcasts uniquely suited for the fast-paced, complex, and often hazardous environment in which incident commanders and emergency responders operate, according to one embodiment.

For example, the incident commander 104 may receive as radio broadcasts:

Fireground Communications 306: This may include direct communication from the teams actively engaged in firefighting operations (e.g., such as a thermal imaging feed from a thermal imaging sensor 118 carried by the tactical firefighter 108, the video feed 121 from an observational camera 134 of unmanned aerial vehicle 124, and the fire captain 110, etc.). These reports may provide real-time information about the fire's status, progress in containment, and/or any immediate hazards or changes in fire behavior. In one embodiment, data from the video feed 121 from the observational camera 134 of the unmanned aerial vehicle 124, the description 122 generated by the dispatch center 112 based on the account from eyewitness 132, and data from the thermal imaging sensor 118 may be communicated to the IAAIM 102 through the Internet 119 instead of through radio communications 104. The generative AI pendant 116 may assist the incident commander 106 in suggesting actions to take in response to these fireground communications 306 through the display 202, according to one embodiment. For example, responsive actions may be recommendations 302 to add or remove tactical firefighters 108, move a staging area for fire containment operations based on changing wind conditions, or to modify a contingency plan based on expansion or contraction of the fire 100, according to one embodiment.

Emergency Traffic 308: These broadcasts may be urgent and contain critical information about immediate risks to firefighter safety, such as flashover warnings, structural collapse, or a mayday call from a firefighter in distress. The generative AI pendant 116 may assist the incident commander 106 in suggesting actions to take in response to emergency traffic through the display 202, according to one embodiment. For example, the IAAIM 102 may generate a recommendation 302 to call in medical and/or evacuation crews in the display 202 (e.g., using logistics support requests 308 of the action view 350), according to one embodiment.

Logistics Support Requests 310: Communications regarding the need for additional resources 332, such as more firefighting personnel, equipment, water supply, and/or medical units may also be communicated. This includes requests for rescue teams or specific tools and materials necessary for the incident. The generative AI pendant 116 may assist the incident commander 106 in suggesting actions to take in response to logistical support requests 310 through the display 202, according to one embodiment. For example, the IAAIM 102 may generate a recommendation 302 to call in more resources and/or personnel, according to one embodiment.

Weather Updates 312: Updates from weather services and/or onsite meteorological units providing information on weather conditions that can affect firefighting efforts, such as wind changes, temperature, humidity, and the potential for weather-related events like thunderstorms. The generative AI pendant 116 may assist the incident commander 106 in suggesting actions to take in response to weather updates through the display 202, according to one embodiment. For example, the IAAIM 102 may generate a recommendation 302 to request additional equipment, according to one embodiment.

Air Support Coordination 314: If air support units are involved, such as helicopters or airplanes for water drops or reconnaissance, communications will include coordination of these assets, including drop locations, flight paths, and times of operation. The generative AI pendant 116 may assist the incident commander 106 in suggesting actions to take in response to air support coordination 314 through the display 202 (e.g., using the "coordinate air support" 340 button of the action view 350), according to one embodiment. For example, the IAAIM 102 may generate a recommendation 302 to notify tactical firefighters 108, according to one embodiment.

Inter-agency Communications 318: Information may be shared between different agencies involved in the incident, such as forestry services, local police, EMS, and other governmental or volunteer organizations (e.g., using the "facilitate coordination" 342 button of the action view 350). This can ensure a unified approach to the incident management. The generative AI pendant 116 may assist the generating inter-agency communications 318 by suggesting communications to be made to related agencies through the display 202, according to one embodiment. For example, the IAAIM 102 may generate a recommendation 302 to notify local police of evidence of arson, according to one embodiment.

Public Information Announcements 320: Information intended for dissemination to the public, such as evacuation orders, road closures, shelter locations, and safety instructions may be received by the incident commander 106. While not always directly broadcasted to the incident commander 106, they need to be aware of these messages to manage the incident effectively, and the display 202 may exhibit this information from sources captured through other related radio and/or internet modalities. The incident commander 106 may disseminate the public announcement using the "broadcast info" 344 button of the action view 350, as required, according to one embodiment.

Status Reports and Check-ins 322: Routine and/or scheduled reports from various units on the scene, providing updates on their status, activities, and any assistance they require, may be received by the incident commander 106 through radio communication 104. This may help maintain situational awareness and ensure the safety and accountability of all personnel involved. The generative AI pendant 116 may assist in response to status reports and check-ins 322 by suggesting customized acknowledgements to be sent as automated messages through display 202, according to one embodiment. For example, the IAAIM 102 may generate a customized timely thank you note or words of encouragement to a tactical firefighter 108 to acknowledge that their status update was heard and did not fall on deaf ears, according to one embodiment.

Mutual Aid Requests 324 and Coordination: Communications involving the request for, or offer of, assistance from neighboring jurisdictions and/or agencies may also be received by the incident commander 106. This may include coordinating the arrival, deployment, and integration of these additional resources 332 into the incident command structure. The generative AI pendant 116 may assist in mutual aid requests and coordination by suggesting actions to be communicated to accept and/or decline these requests to be sent as automated messages through display 202 (e.g., using the "coordinate mutual aid" 348 button of the action view 350), according to one embodiment. For example, the IAAIM 102 may generate a recommendation 302 to accept and/or decline a request, according to one embodiment.

Incident Action Plans (IAP) Updates 316 may be automatically generated through the IAAIM 102: Recommendations 302 related to the overall strategy and objectives, including any updates to the Incident Action Plan 200 (e.g., using the "update plans" 338 button) based on what can be heard and interpreted through the generative AI pendant 116, according to one embodiment. This can involve shifts in tactics, new operational periods, and/or changes in command structure. These radio broadcasts (e.g., radio communication 104) are vital for the incident commander to maintain a comprehensive understanding of the situation, make informed decisions, and ensure the safety and effectiveness of the response efforts, according to one embodiment.

In response to a haptic confirmation on the display 202 (e.g., a tap on a touchscreen display) or verbal acceptance from the incident commander 106 communicated to the IAAIM 102 through the generative AI pendant 116, responsive actions to address the various radio communications 104 described herein may be taken automatically through dispatch center 112 and automatic execution of operations and instructions through artificial intelligence, according to one embodiment.

It should be noted that while the display 202 may be located in an interior view 250 of the fire command vehicle 130, may also be on a tablet and/or mobile phone carried by incident commander 106, according to one embodiment.

Optionally, in an exemplary embodiment, the generative AI pendant 116 can be "queryable" in that the incident commander 106 can speak directly (e.g., verbal query 800) into the generative AI pendant 116 and ask it questions about the incident. The generative AI pendant 116 can verbally respond according to this embodiment by passing the query through IAAIM 102.

In addition, in another exemplary embodiment, no sensory information can be permanently stored by the IAAIM 102 post incident, to minimize data storage requirements of a fire department, according to one embodiment (e.g., only stored in random access memory but not in non-volatile storage), according to one embodiment.

Also, while it is shown in FIG. 1 that the IAAIM 102 operates in the fire command vehicle 130 in an edge network format, it should be appreciated that the IAAIM 102 may operate through a wide area network and/or directly on a person of the incident commander 106 (e.g., a very low computational power requiring embodiment), according to one embodiment.

It should also be noted that the fire 100 may encompass a building 101 such as the one shown in FIG. 1, or it may optically be across numerous buildings, or even in a rural area or forested area, according to various embodiments.

Figure 2:
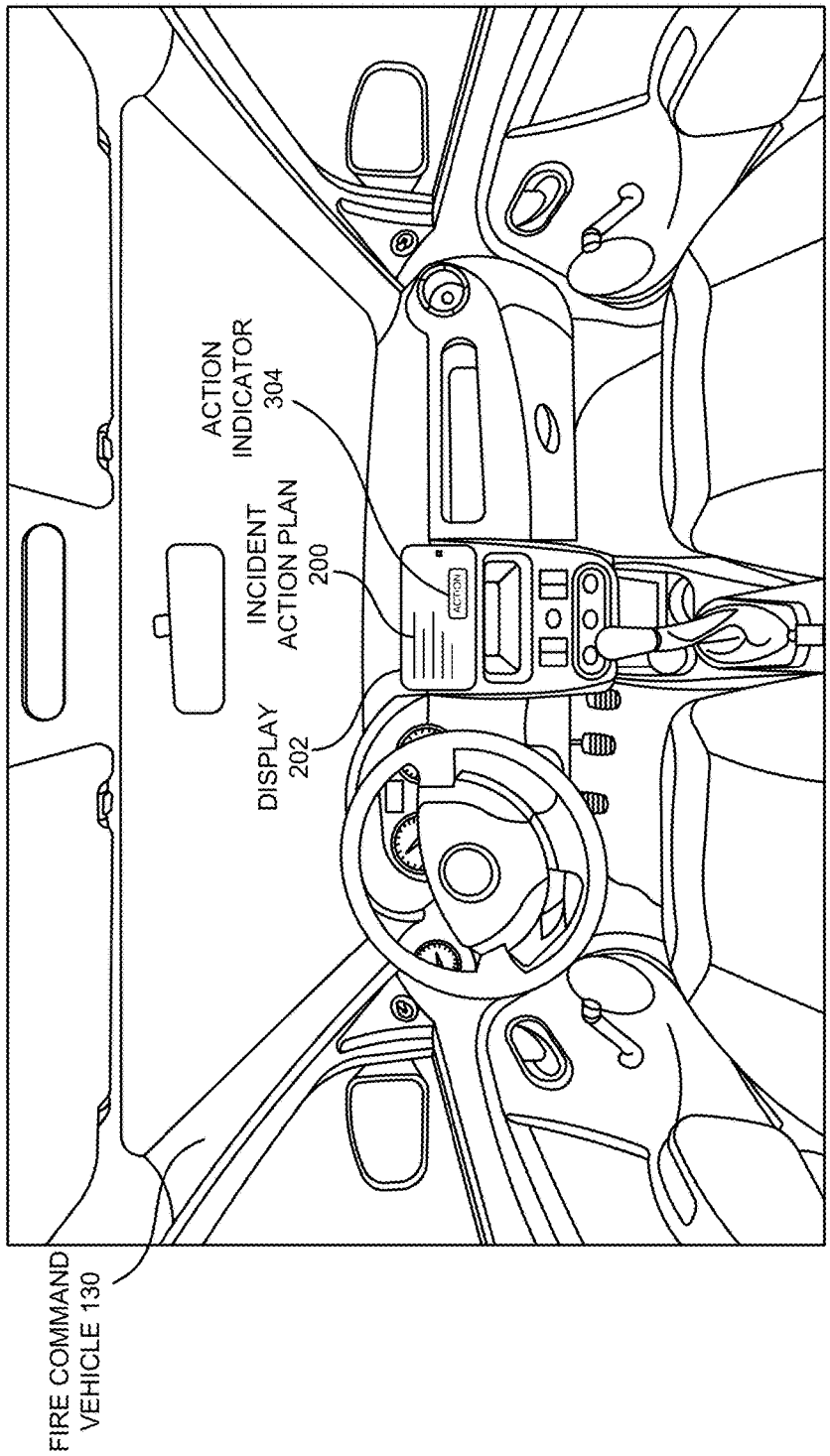
FIG. 2 is an interior view of a fire command vehicle illustrating a display on which the incident action plan generated by the IAAIM, according to one embodiment.

FIG. 2 is an interior view 250 of a fire command vehicle 130 of FIG. 1 illustrating a display 202 exhibiting the incident action plan 200 generated by the IAAIM 102, according to one embodiment. The display 202 may be a screening device which allows a user (e.g., a firefighter, incident commander 106) to interact with a computer by touching areas on the screen. The incident action plan 200 generated by the Incident Action Artificial-Intelligence Model ("IAAIM" 102) may be exhibited on the display 202 of the fire command vehicle 130 of FIG. 1. For example, the display 202 may be integrated into the fire command vehicle 130, and/or may be a tablet device and/or mobile phone application of the incident commander 106, according to one embodiment.

FIG. 3 is an action view 350 showing a user interface of the display 202 in which different communication types 300 are associated with a different recommended actions (e.g., using recommendation(s) 302), and an action indicator 304 includes a button through which an action can be taken, according to one embodiment. In FIG. 3, an AI (Artificial Intelligence) of the Incident Action Artificial-Intelligence Model ("IAAIM" 102) provides action recommendation(s) 302 to an incident commander 106 based on various types of communications 300 received during an emergency situation, such as a fire 100. Each row represents a different type of communication 300 that might be encountered, the AI's recommended action in response to that communication, and the labels of action indicator 304 buttons provided to the incident commander 106 for immediate decision-making, according to one embodiment. Here's a breakdown of the components:

Type of Communication 300: This column categorizes the source or nature of the information received, such as direct fireground communications 306, emergency traffic 308 indicating immediate protocol risks, logistics support requests 310, and so on, according to one embodiment. This classification helps in understanding the context of the situation or request, according to one embodiment.

AI-Recommended Action: For each type of communication, the AI analyzes the information and suggests a specific course of action, according to one embodiment. These actions are tailored to address the immediate needs or changes in the situation as communicated, according to one embodiment. For instance, adjusting deployment 326 in response to fireground communications 306 or initiating emergency protocols 330 by selecting the "initiate protocol" 334 button for flashover risks, according to one embodiment.

Action Button Label: Corresponding to each recommended action, there are action button labels provided, according to one embodiment These labels represent the actions the incident commander 106 can take with a simple tap on a touchscreen display 202, according to one embodiment. The options include proceeding with the AI's recommendation 302 and/or dismissing it to take a different course of action, according to one embodiment. For example, the commander can choose to "Adjust Deployment" 328 button based on the AI's suggestion or dismiss the recommendation 302 if deemed unnecessary.

The UX view of FIG. 3 is designed to streamline the decision-making process during emergencies by providing clear, actionable recommendations 302 that can be easily approved and/or modified by the incident commander 106, according to one embodiment. This system enhances the efficiency and responsiveness of the command operations by leveraging AI to interpret complex situations and propose immediate actions, according to one embodiment.

Figure 4:
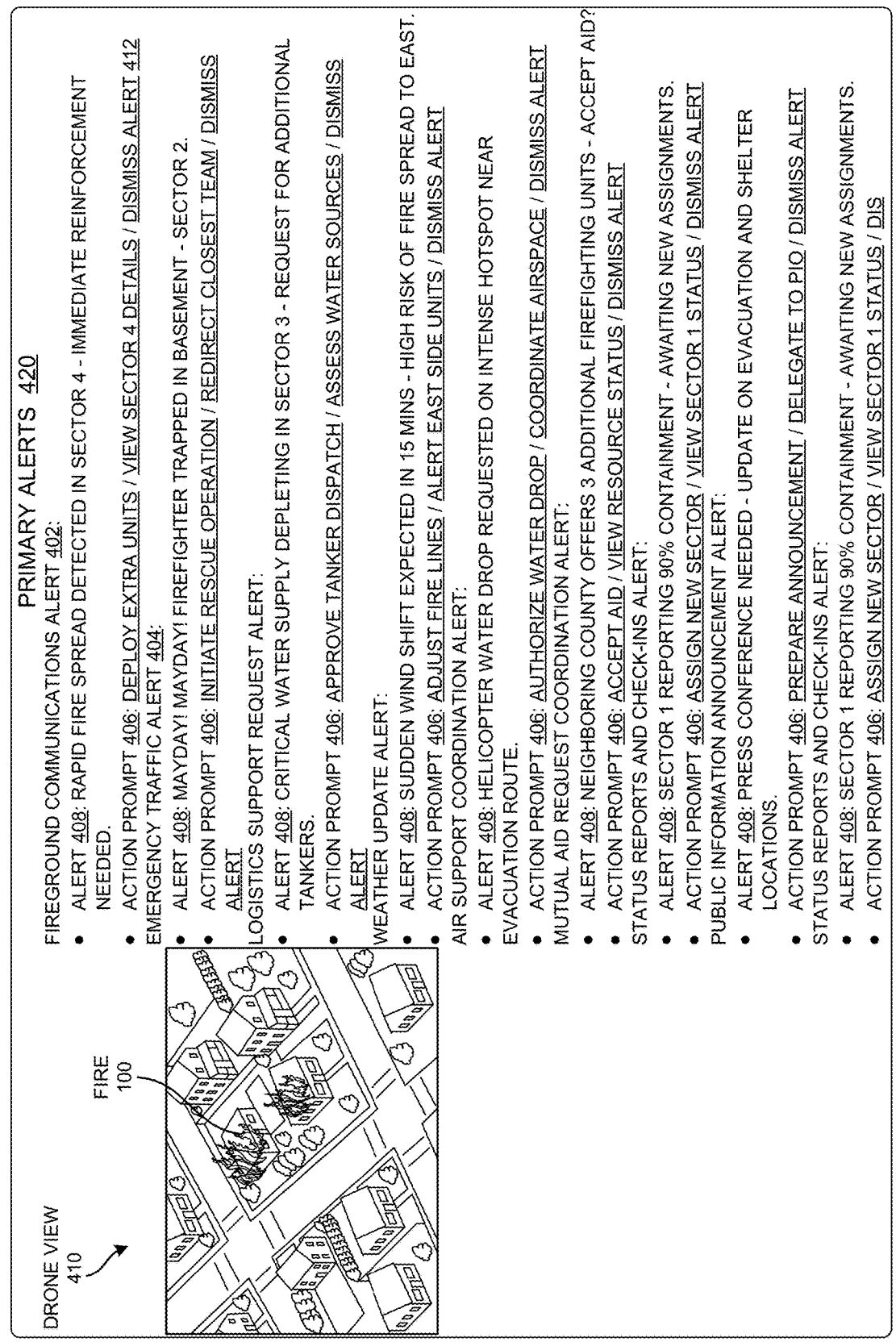
FIG. 4 is a split view illustrating a user interface of the display in which a live video feed from the unmanned aerial vehicle is shown on the left side of the display, with alerts and recommended actions on the right side of the display, according to one embodiment.

FIG. 4 is a split view 450 illustrating a user interface of the display 202 in which a live video feed 121 from the unmanned aerial vehicle 410 is shown on the left side of the display 202, with primary alerts 420 and recommended actions on the right side of the display 202, according to one embodiment. The drone view 410 showing information from the unmanned aerial vehicle (UAV) 124 observing a fire 100 in progress offers significant advantages to an incident commander 106 in managing the emergency response efforts. The importance of this aerial perspective encompasses several key aspects of incident management for enhanced situational awareness to generate recommendations 302 through the IAAIM 102:

Real-Time Monitoring: UAV 124 can transmit live video feeds 121, providing the IAAIM 102 with an up-to-the-minute view of the fire's extent, behavior, and progression. This real-time monitoring can help the IAAIM 102 understand fire dynamics and recommend informed decisions to the incident commander 106, according to one embodiment.

Comprehensive Overview: A drone view 410 can offer a bird's-eye perspective that ground units cannot achieve, allowing the IAAIM 102 to grasp the overall scale and scope of the incident. It helps the IAAIM 102 in recommending actions related to fire fronts, hotspots, and potential spread paths to the incident commander 106, according to one embodiment.

Firefighter Safety: UAV 124 can be used to identify safe routes for firefighters to enter and exit the affected area, locate stranded personnel, and monitor changing conditions that can pose new risks. This can help the IAAIM 102 in making recommendations to minimize exposure to hazardous conditions, according to one embodiment.

Hazard Identification: Drones can detect hazards such as structural instabilities, explosive materials, and environmental risks like gas leaks and/or electrical dangers, enabling the IAAIM 102 to recommend that the incident commander 106 warn ground units and prevent accidents, according to one embodiment.

Efficient Resource Allocation: By providing a clear view of the fire and affected areas, drones may help the IAAIM 102 in recommending that a fire department deploy resources (e.g., personnel, equipment, water sources, etc.) more strategically (e.g., using "authorize resources" 336 button). It ensures that efforts are concentrated where they are needed most, optimizing the use of available resources, according to one embodiment.

Logistics Coordination: The aerial imagery can assist in identifying accessible roads, water sources, and staging areas, helping the IAAIM 102 to provide recommendations to facilitate logistics coordination and ensuring that supplies and reinforcements reach the right location promptly, according to one embodiment.

Incident Analysis and Planning: UAV 124 footage can help in analyzing the fire's behavior, including the rate of spread, response to firefighting efforts, and the influence of weather conditions. This analysis can be vital for the IAAIM 102 making recommendations 302 for planning containment strategies and predicting future movements, according to one embodiment.

Evacuation and Public Safety: Drone footage from the UAV 124 can aid the IAAIM 102 in providing recommendations 302 to the incident commander 106 to assess which areas are most at risk, enabling timely evacuation orders and public safety announcements. The IAAIM 102 can also directly generate communication with the public by providing accurate, visual information about the fire's impact, according to one embodiment.

In summary, integrating drone technology into the IAAIM 102 offers transformative potential. It enhances situational awareness, improves safety, facilitates efficient resource use, supports strategic planning, and aids in public communication. For incident commanders 106, UAV 124 may be an invaluable tool that contributes to more effective and informed decision-making during emergency situations, according to one embodiment.

On the right side of FIG. 4 are some creative examples of alerts (e.g., primary alerts 420) and action prompts that might appear on an incident commander's display 202, designed to engage immediate decision-making and action for various scenarios during a fire incident, according to one embodiment.

Alert 408 Section: This part of the display 202 shows the alert type and a brief description 122 of the situation. Each alert can be categorized to help the incident commander 106 quickly understand the nature of the alert, such as "Fireground Communications Alert" 402 or "Emergency Traffic Alert" 404, according to one embodiment.

Action Prompts 406: Adjacent to or directly below each alert, there are actionable options presented as buttons or links, according to one embodiment. These prompts offer the incident commander immediate decision-making capabilities, such as "Deploy Extra Units," "Initiate Rescue Operation," or "Approve Tanker Dispatch." The options are straightforward, enabling a rapid response with just a tap or click, according to one embodiment.

Dismiss Option: Alongside the actionable prompts, a "Dismiss Alert" 412 option can be always present, allowing the commander to quickly clear alerts that have been addressed or deemed non-critical, keeping the interface uncluttered and focused on priority tasks, according to one embodiment.

Additional Information: Some alerts offer the option to view more details, such as "View Sector 4 Details" or "View Park Map," providing in-depth information for more informed decision-making, according to one embodiment. This interface can be designed to not only facilitate quick actions but also to support deeper analysis when necessary, according to one embodiment.

In summary, integrating drone technology into IAAIM 102 offers transformative potential. It enhances IAAIM 102 situational awareness, improves safety, facilitates efficient recommendations to the incident commander 106 for resource use, supports strategic planning, and aids in public communication. For incident commanders, UAVs 124 are invaluable tools that contribute to more effective and informed decision-making during emergencies, according to one embodiment.

Figure 5:
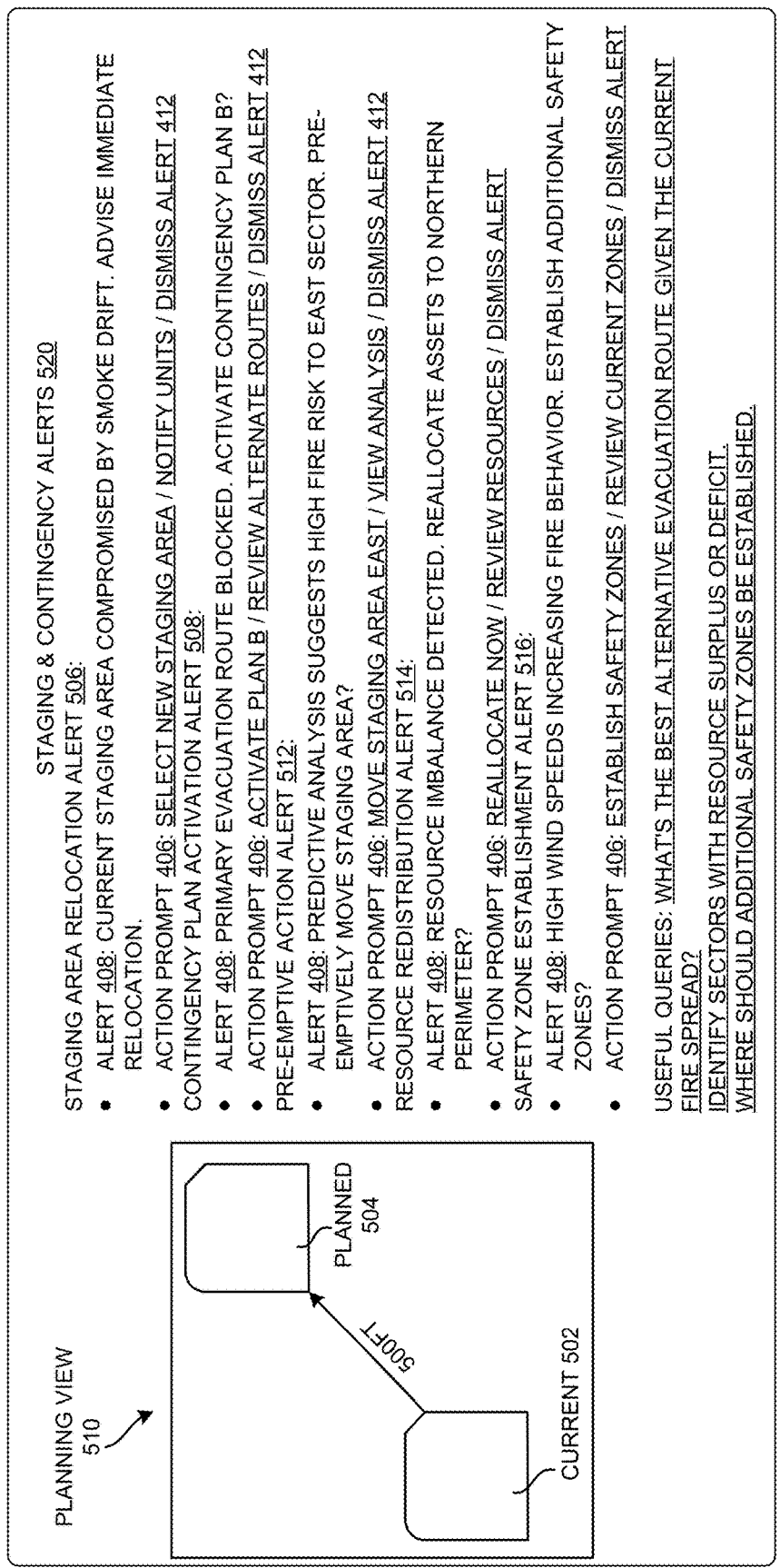
FIG. 5 is a movement view illustrating a user interface of the display in which movements associated with a staging area are shown on a left side of the display, with alerts and recommended actions related to staging changes on the right side of the display, according to one embodiment.

FIG. 5 is a movement view 550 illustrating a user interface of the display 202 in which movements associated with a staging area are shown on a left side of the display 202, with alerts and recommended actions related to staging changes on the right side of the display 202, according to one embodiment. For example, the user interface may display a planning view 510 showing the current 502 location of the rescue and evacuation personnel (e.g., incident commander 106, fire captain 110, etc.) with a recommendation 302 of a planned 504 location for a swift movement of the rescue personnel on receiving an alert of a fire spreading to the current 502 location.

Alert 408 Section: This part of the staging and contingency alerts 520 in the display 202 shows the alert type and a brief description of the situation. Each alert can be categorized to help the incident commander 106 quickly understand the nature of the alert, such as "Staging Area Relocation Alert" 506, "Contingency Plan Activation Alert" 508, "Pre-emptive Action Alert" 512, "Resource Redistribution Alert" 514, or a "Safety Zone Establishment Alert" 516, according to one embodiment.

Action Prompts 406: Adjacent to or directly below each alert, there are actionable options presented as buttons or links, according to one embodiment. These prompts may offer the incident commander 106 immediate decision-making capabilities, such as "Deploy Extra Units," "Initiate Rescue Operation," or "Approve Tanker Dispatch." The options are straightforward, enabling a rapid response with just a tap or click, according to one embodiment.

Dismiss Option: Alongside the actionable prompts 406, a "Dismiss Alert" 412 option may allow the commander to quickly clear alerts that have been addressed or deemed non-critical, keeping the interface uncluttered and focused on priority tasks, according to one embodiment.

FIG. 6 is a recognition view 650 illustrating a user interface of the display in which a thank you leader board is shown on a left side of the display, with opportunities to give recognition are shown on the right side of the display, according to one embodiment. FIG. 6 illustrates an innovative feature integrated into the incident command system, specifically focusing on morale and recognition within firefighting teams. This feature can be divided into two main components: the "Thank You Board" 610 and the "Words of Encouragement Alerts" 620, each designed to enhance team spirit and acknowledge the hard work of tactical firefighters 108. Here's a detailed explanation of each component.

Thank You Board 610:

Purpose: Serves as a digital recognition platform to highlight and commend the achievements and efforts of tactical firefighters 108 who have demonstrated exceptional skill, bravery, or dedication during an incident, according to one embodiment.

Functionality: Displays names or units of firefighters alongside descriptions of their commendable actions. It might also include the date, specific incident details, and the impact of their contributions, according to one embodiment.

Interaction: The incident commander 106 can update the board in real-time, adding acknowledgments as achievements occur. This feature likely supports touch interaction or voice commands for ease of use, according to one embodiment.

Words of Encouragement Alerts 620

Customized Thank Yous and Words of Encouragement Alerts: This section generates specific alerts prompting the incident commander 106 to send customized thank you messages or words of encouragement based on recent actions, achievements, or the completion of demanding tasks by the teams, according to one embodiment.

Tactical Update Acknowledgment Alert 602: Suggests sending a custom thank you to a team or unit for a successful operation, such as a backburn, providing a preset message that can be personalized and sent directly from the interface, according to one embodiment.

Encouragement After Long Shift Alert 604: Offers a prompt to send a message of encouragement to teams who have completed particularly long or difficult shifts, acknowledging their hard work and dedication, according to one embodiment.

Acknowledgement for Critical Information Alert 606: Alerts the incident commander 106 to recognize individuals or units that have provided vital information, such as weather updates, that contribute significantly to the operation's success, according to one embodiment.

Milestone Achievement Alert 608: Suggests acknowledging collective efforts when significant milestones, like containment percentages, are achieved, fostering a sense of unity and shared success, according to one embodiment.

Support for Challenging Operation Alert 612: Provides prompts for sending pre-operation encouragement, especially before undertaking challenging tasks, emphasizing support and confidence in the teams' abilities, according to one embodiment.

This recognition view 650 interface is user-friendly, with clear, readable text and intuitive navigation, according to one embodiment. Alerts and prompts are designed to catch the incident commander's 106 attention without overwhelming them with information. Through this system, the incident commander 106 can quickly and easily send out messages of acknowledgement and encouragement, ensuring that firefighters feel valued and supported. This not only boosts morale but also reinforces the culture of recognition and appreciation within the team. By maintaining high morale, the system indirectly contributes to operational efficiency and safety. A motivated team can be more cohesive, communicates better, and performs more effectively in high-pressure situations. Regular acknowledgment and encouragement help build a positive work environment, crucial for sustaining motivation and resilience during prolonged and difficult incidents. FIG. 6 represents a thoughtful integration of human-centric features into emergency response technology, acknowledging that beyond strategy and logistics, the emotional well-being and recognition of first responders (e.g., a fire captain 110, a tactical firefighter 108) play a critical role in the overall success of incident management, according to one embodiment.

FIG. 7 is a local view 750 illustrating a user interface of the display 202 in which different scenarios are associated with different radio communications 104 along with a generated recommendation 302, according to one embodiment. FIG. 7 illustrates a local view 750 of the user interface (UI) for the incident commander 106, focusing on the interaction between scenario awareness, incoming radio communications 104, and AI-generated recommendations 704 for action. This UI can be designed to optimize the incident commander's decision-making process by integrating real-time data with artificial intelligence insights. Scenario 702 displays the current scenario or incident type the commander can be dealing with, such as a wildfire, residential fire, hazardous material spill, etc. This section sets the context for the radio communication 104 and subsequent AI-generated recommendations 704. It helps to quickly orient the incident commander 106 to the nature of the incident, providing a high-level overview that can influence decision-making priorities.

Radio Communication 104 shows a transcription or summary of recent radio communication related to the scenario. This can include updates from field units, emergency traffic, logistics requests, and more. Radio Communication 104 as shown on FIG. 7 offers real-time insights into the unfolding situation, highlighting immediate concerns, progress reports, or calls for assistance. It ensures the incident commander 106 can be aware of the latest developments on the ground. AI-generated recommendations 704 generated by the IAAIM 102, which analyzes the current scenario and radio communications 104 to suggest actionable responses. AI-generated recommendations 704 provides specific recommendations or actions the incident commander 106 should consider in response to the latest updates. This can involve adjusting tactics, deploying additional resources, initiating evacuations, etc. Recommendation 704 leverages AI to process complex data and generate insights, potentially identifying patterns or risks that might not be immediately obvious to human operators. It supports the incident commander 106 by suggesting data-driven decisions (e.g., using the generative data-driven decisions 1112) that enhance response effectiveness, according to one embodiment.

This user interface design, as depicted in FIG. 7, aims to enhance situational awareness, streamline communication, and facilitate quick, informed decision-making during emergency incidents. By combining the context of the current scenario, direct input from the field, and AI-powered analysis, the system provides a comprehensive tool for incident commanders to manage emergencies more effectively. The integration of AI-generated recommendations 704 allows for a dynamic response to changing conditions, ensuring that strategies and resource allocations (e.g., using the AI foundation models of resource allocation knowledge 1104 of the generative AI reshaping the future 1100 integrated with the IAAIM 102) are always aligned with the most current information. This approach not only improves operational efficiency but also contributes to the safety and success of emergency response efforts, according to one embodiment.

Figure 8:
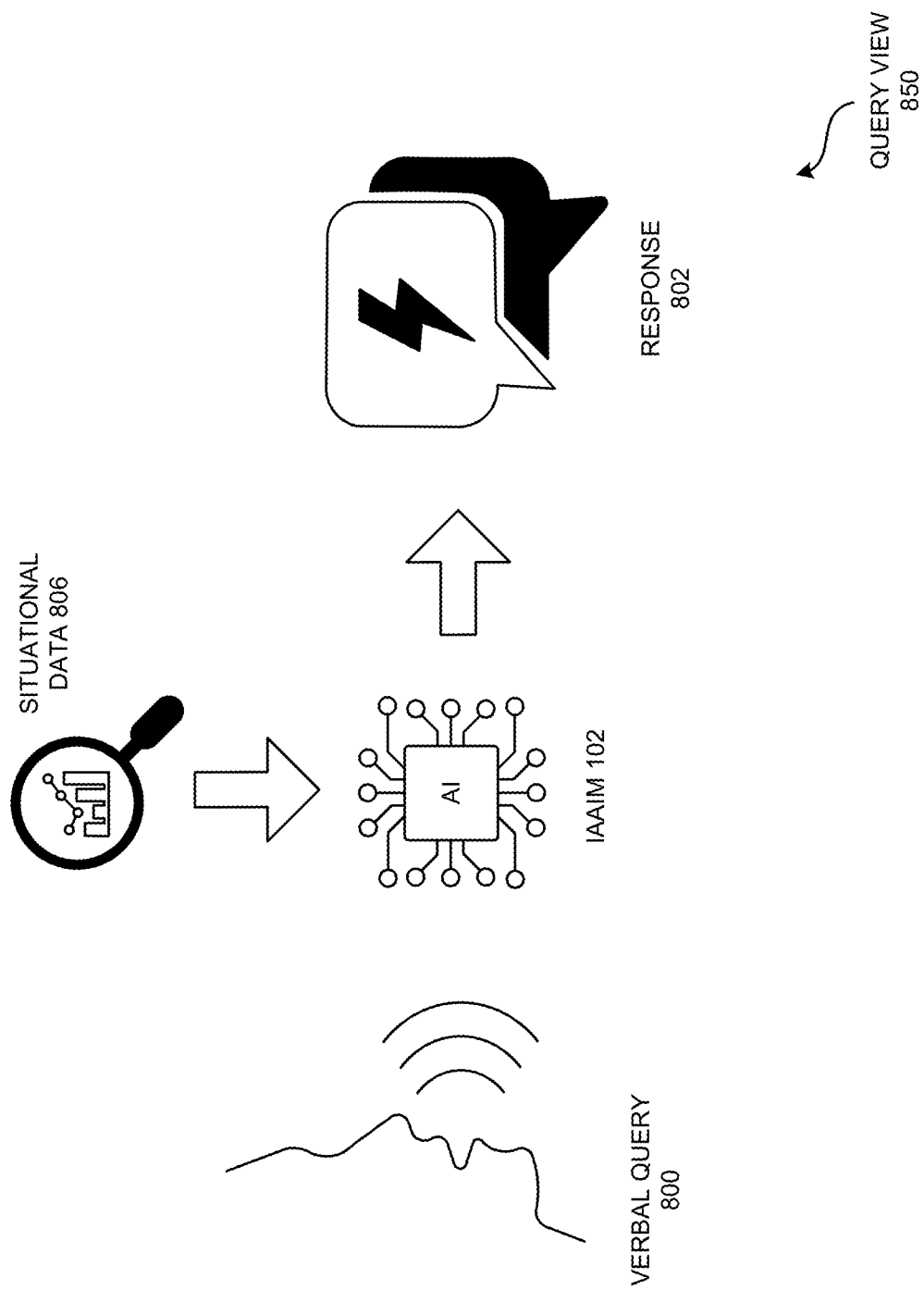
FIG. 8 is a query view illustrating the generation of a response based on a verbal query to the generative AI pendant), according to one embodiment.

FIG. 8 is a query view 850 illustrating the generation of a response 802 based on a verbal query 800 to the generative AI pendant 116, according to one embodiment. FIG. 8 illustrates the graphical feature of the generative AI pendant 116, specifically focusing on how the device handles and responds to verbal queries from the incident commander 106. This "query view" 850 illustrates the process from the initiation of a verbal query 800 to the delivery of a generated response 802, showcasing the AI's ability to interpret, analyze, and provide actionable information in real-time. The verbal query 800 serves as the interface for interacting with the generative AI pendant 116 via voice commands. This query view 850 captures the incident commander's 106 verbal query 800 and displays the corresponding AI-generated response 802. The query view 850 can operate on the display 202, or without a display through a speaker on the a generative AI pendant 116. On the display 202, the query view 850 can be designed for clarity and ease of use, ensuring that verbal queries can be easily made and that responses are displayed in a readable and actionable format.

The incident commander 106 activates the voice recognition feature of the generative AI pendant 116, possibly using a specific wake word and/or pressing a button, and then states their query aloud. This query can range from requesting updates on specific incidents, asking for resource status, seeking advice on tactical decisions, or inquiring about weather conditions affecting the incident. The AI system captures the verbal query 800, processes the spoken words using natural language processing (NLP) technology, and interprets the commander's intent to formulate a relevant query for the AI model to analyze, according to one embodiment.

Once the query can be understood, the AI model analyzes the available situational data 806, considers the current context of the incident, and generates a response 802. This involves tapping into various data sources and utilizing predictive models (e.g., using prediction model 1070 of the AI-powered incident action plan optimization and visualization system 1000), historical data, and real-time information to provide the most accurate and useful answer. The generated response can be then displayed in the query view 850 for the incident commander 106 to review (e.g., using the "review status" 346 button of the action view 350). The response 802 can be structured to be direct and actionable, offering clear guidance, information, or recommendations 302 based on the query. The interface may allow the incident commander 106 to interact further with the response 802, such as asking follow-up questions, requesting more detailed information, or taking direct action based on the recommendations 302 provided, according to one embodiment.

Use Case Examples

If the incident commander queries, "What's the status of the fire in sector 4?", the AI pendant 116 can respond with a detailed update on the fire's spread, containment efforts, and any immediate hazards in that area, according to one embodiment.

For a query like, "Do we need additional resources at the current hotspot?", the AI can analyze logistical data and current response efforts to recommend whether or not more personnel or equipment should be deployed, according to one embodiment.

This functionality of the query view 850 significantly enhances the decision-making capabilities of the incident commander 106 by providing instant access to a wealth of information and expert analysis. It allows for a dynamic and informed response to evolving situations, ensuring that command decisions are supported by the latest data and AI insights. The ability to interact verbally with the AI system streamlines communication, making it quicker and more intuitive for incident commanders 106 to obtain the information they need, especially in the heat of an emergency when time can be of the essence, according to one embodiment.

FIG. 9 is a query view 950 illustrating useful queries that might be possible to the generative AI pendant 116 for different types of communications, according to one embodiment. Particularly, FIG. 9 depicts a comprehensive user interface (UI) within the system of the wearable AI pendant 116, specifically designed to facilitate interaction between the incident commander 106 and the AI system regarding various types of communications during a fire incident. This UI can be aimed at streamlining the process of obtaining actionable intelligence and making informed decisions. Types of Communication 300 categorizes and lists the different types of communications that the incident commander 106 might receive during fire incidents 1102, such as fireground communications 306, emergency traffic 308, logistics support requests 310, and more. By categorizing communications, the system enables the incident commander 106 to quickly navigate and focus on specific areas of interest or concern, enhancing the efficiency of information management.

Radio Communication 104 displays the actual messages or summaries of communications received via radio. This can include live updates from firefighters on the ground, emergency calls, and/or logistical requests. The real-time display of radio communications 104 provides immediate insights into the evolving situation, allowing the incident commander 106 to stay updated with the most current information, according to one embodiment.

Useful Queries 902 shows query generation in action—in other words, based on the types of communication and the specific radio messages received, the UI suggests useful queries that the incident commander 106 might want to ask the AI system. These queries are tailored to extract further insights or actionable information related to the received communications. The incident commander 106 can select or voice these queries directly to the AI system, which then processes the requests and provides answers and/or recommendations 302. The system likely uses natural language processing (NLP) to understand and respond to the queries effectively, according to one embodiment.

Example Workflow:

Fireground Communications 306 Received: "Intense fire behavior observed in the northeast quadrant.

Useful Query 902 Suggested: "What's the latest fire behavior model prediction for the northeast quadrant?"

Emergency Traffic 308 Received: "Mayday from Squad 5, firefighter down in the southern sector."

Useful Query 902 Suggested: "Where is the nearest medical unit to Squad 5's last reported location?"

The UI can be designed to be highly intuitive, with clear labels and easy navigation to ensure that during the stress of incident command, the commander can quickly find and use the features needed. Given the dynamic nature of fire incidents 1102, the UI can be built to update in real-time, ensuring that the displayed information and suggested queries always reflect the current situation. The system may allow for customization of the query suggestions based on the preferences or prior queries of the incident commander 106, enhancing the relevance of the information provided, according to one embodiment.

FIG. 9 represents a sophisticated integration of communication analysis and AI-driven query suggestion, significantly aiding incident commanders 106 in rapidly digesting incoming information and formulating queries that lead to actionable insights. This setup ensures that decision-making can be informed, timely, and based on a comprehensive understanding of the incident dynamics, ultimately contributing to more effective incident management and response efforts (e.g., using the generative innovation in response generation 1108 of the generative AI reshaping the future 1100), according to one embodiment.

Figure 10:
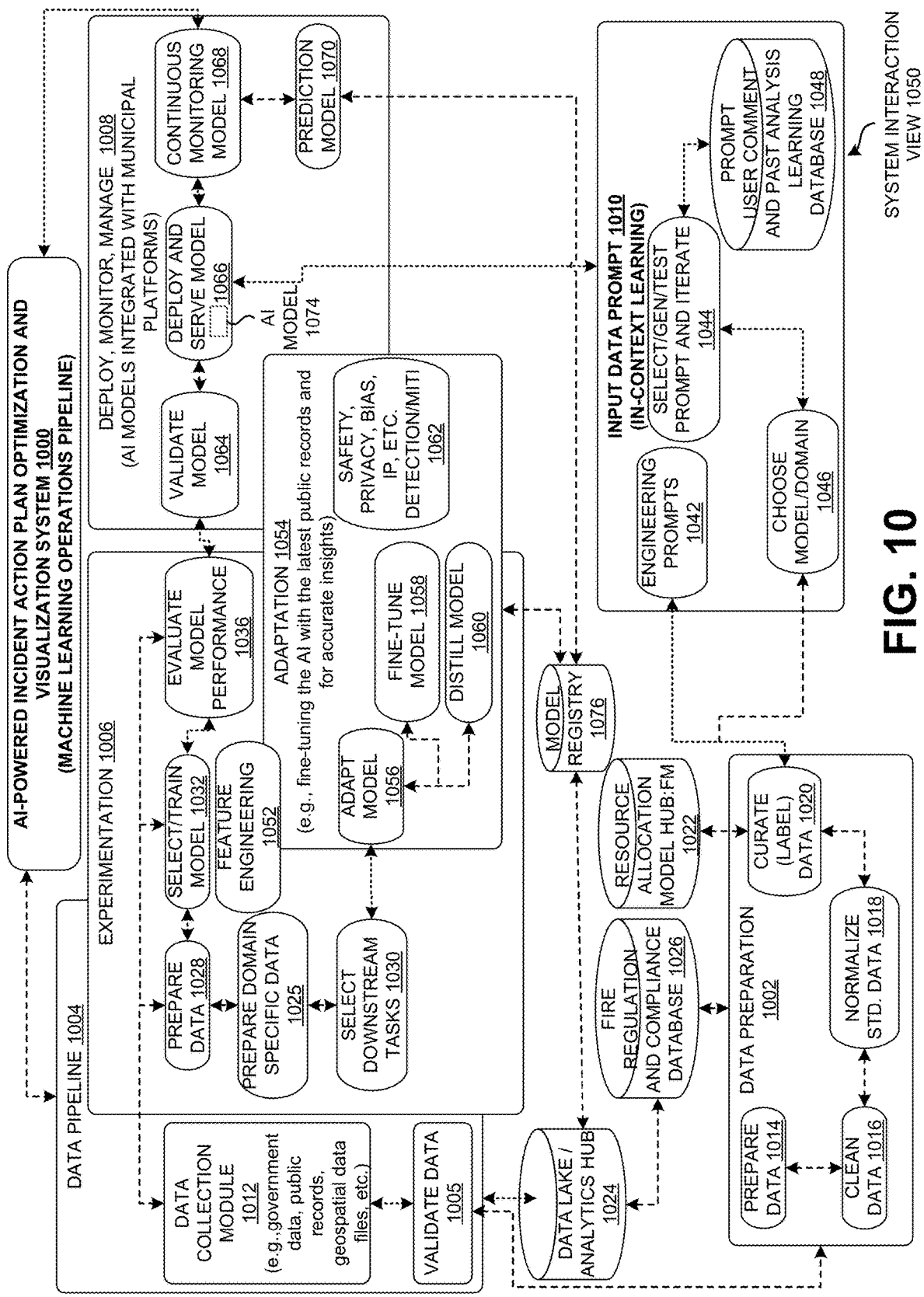
FIG. 10 is a system interaction view of an AI-powered incident action plan optimization and visualization system of the IAAIM illustrates a series of steps that transform an aggregate situational data into actionable insights for modifying the incident action plan, according to one embodiment.

FIG. 10 is a system interaction view 1050 of an AI-powered incident action plan optimization and visualization system 1000 using the IAAIM 102 illustrates a series of steps that transform an aggregate situational data into actionable insights for modifying the incident action plan 200, according to one embodiment. FIG. 10 is a visual representation of the complex process of developing and implementing generative AI model 1074 in the context of GovGPT AI. The life cycle can ensure that the system not only suggests optimal incident action but also provides users with economic feasibility insights and the ability to manage firefighting resources. Here's a summary of each element:

Data Pipeline 1004: Involves collecting and validating data, which then flows into a data lake and/or analytics hub 1024 and feature store for subsequent tasks. Data Pipeline 1004 can involve collecting and validating emergency situation data, zoning laws, and local ordinances relevant to firefighting management, according to one embodiment.

The data pipeline 1004 may be a series of steps that transform raw government data into actionable insights for managing fire incidents in compliance with complex state and municipal regulations using artificial intelligence techniques. The raw government data may encompass public records, geospatial data, assessor information, zoning details, state legal codes, and municipal regulations, etc. that may be utilized to create generative AI models for automating the firefighting followed by suggesting the optimal resource management plan, according to one embodiment.

The generative AI models 1074 for automating the incident action plan 200 of the disclosed system may include the process of collecting, processing, and transforming raw government data into a format that can be used to train and deploy machine learning models. An AI model 1074 related to resource allocation planning and development may include various stages such as collecting the fire incident data (e.g., using data collection module 1012), verifying the data (e.g., using validate data 1005), preprocessing the data for removing the errors in the data (e.g., using prepare data 1028), extracting valuable information from the data for the AI model (e.g., using prepare domain specific data 1025), labeling the data, using the preprocessed and labeled data to train the AI model 1074 (e.g., using select/train model 1032), assessing the performance of the trained model using validation datasets (e.g., using evaluate model performance 1036 of experimentation 1006), and integrating the trained model into a system and/or an application that can make predictions on new incident action plans (e.g., using deploy and serve model 1066 and prediction model 1070), according to one embodiment.

The AI-powered incident action optimization and visualization system 1000 may use data collection module 1012 to collect data from external sources such as public records (e.g., zoning regulation, etc.), GIS data (e.g., topographical data), and/or emergency situations data (e.g., accidental events, fire, demographics, etc.), according to one embodiment.

The AI-powered incident action optimization and visualization system 1000 may be ingested with data collected from external and internal sources (e.g., using data lake and/or analytics hub 1024) including the geographical information, land use records, zoning regulations, environmental data, and any other relevant information related to the fire incidents. The system may further acquire satellite imagery, maps, and/or other geospatial data that can provide a detailed view of the area. The system may automatically identify a shape file, and consult the relevant data, including any specific regulatory requirements applicable to the location of the fire event. The system may gather a diverse and representative dataset of intricate landscape from fire regulation and compliance database 1026 including the local zoning codes, zoning maps, fire regulations, state and municipal regulations, accessibility requirements, and safety considerations, etc. that reflects the characteristics of the task the AI powered generative model can be designed for (e.g., using prediction model 1070 from deploy, monitor, manage 1008), according to one embodiment.

The system may ensure that the dataset covers a wide range of scenarios, variations, and potential inputs that the model may encounter including any specific regulatory requirements applicable to fire safety compliance, etc. The system may validate data 1005 to check for missing values and inconsistencies in the data collected from the internal and external sources to ensure that the data quality meets the AI model requirements (e.g., using data preparation 1002), according to one embodiment.

Experimentation 1006: This phase includes preparing data, engineering features, selecting and training models, adapting the model, and evaluating the model's performance. Experimentation 1006 can encompass the AI analyzing different emergency situation scenarios against the collected data to suggest the best ways to allocate the resources, according to one embodiment.

The experimentation 1006 phase of the data pipeline 1004 of the AI-powered incident action optimization and visualization system 1000 may include preparing data 1028 for feature engineering 1052, extracting and/or preparing domain specific data 1025, and selecting downstream task 1030. The feature engineering 1052 may be the manipulation-addition, deletion, combination, mutation—of the collected data set to improve machine learning model training, leading to better performance and greater accuracy. The feature engineering 1052 may help extract relevant features from the collected data using the data collection module 1012 (e.g., fire incidents 1102, proximity to amenities, physical size of area, frontage, etc.) from situational data 806. It may further expand the dataset through data augmentation by artificially increasing the training set to create modified copies of a dataset from existing data to improve model performance. The preparing domain specific data 1025 may include domain-specific knowledge and/or constraints (e.g., zoning requirements for mitigating fire incidents, environmental regulations, etc.) for a particular geographical area derived from the fire regulation and compliance database 1026. The feature engineering 1052 may be the design features that capture the relevant information for the chosen downstream task 1030 and may select features that are informative and robust to noise. The select downstream task 1030 may define the specific task a model will perform. For example, the select downstream task 1030 may define the task of generating the incident action plan 200 for a specific AI model 1074 in the data pipeline 1004. In another example embodiment, the select downstream task 1030 may define the task of identifying optimal incident action, etc. for a particular AI model 1074 in the data pipeline 1004. The feature engineering 1052 may be the process of extracting features from raw data received through the data collection module 1012 to support training a downstream statistical model. The process may select and transform variables when creating a predictive model 1070 using machine learning for solving a problem received by the AI-powered incident action optimization and visualization system 1000. The select/train model 1032 in the experimentation 1006 phase may choose an appropriate AI generative language model for a particular task by considering factors like task complexity, data size, and/or computational resources, etc. In the next step of experimentation 1006 phase, the model may be trained on a portion of data to evaluate the model's performance 1036 on a separate test set. The test results may be analyzed to identify areas of improvements to improve the model's performance, according to one embodiment.

In the adaptation 1054 phase, the machine learning models may adapt and improve their performance as they are exposed to more data by fine tuning (e.g., using the fine-tune model 1058) the adapted model 1056 for a specific situational event domain and include additional domain specific knowledge. The adapted model 1056 may modify the model architecture to better handle a specific task. The fine-tune model 1058 may train the model on a curated dataset of high-quality data by optimizing the hyperparameters to improve model performance. The distilled model 1060 may simplify the model architecture to reduce computational cost by maintaining and improving model performance. The system may implement safety, privacy, bias and IP safeguards 1062 to prevent bias and discrimination while predicting an incident action plan. The system may ensure model outputs are fair and transparent while protecting the sensitive data as well, according to one embodiment.

The data preparation 1002 may be the process of preparing raw geographical and incident action data extracted from the data lake and/or analytics hub 1024 based on the prompt received from a user (e.g., tactical firefighter 108, fire captain 110, eyewitness 132, etc.) so that it can be suitable for further processing and analysis by the AI-powered incident action optimization and visualization system 1000. The data preparation 1002 may include collecting, cleaning, and labeling raw data into a form suitable for machine learning (ML) algorithms and then exploring and visualizing the data. The data preparation 1002 phase may include prepare data 1014, clean data 1016, normalize standardized data 1018, and curate data 1020. The prepare data 1014 may involve preprocessing the input data (e.g., received using the data collection module 1012) by focusing on the data that can be needed to design and generate a specific data that can be utilized to guide data preparation 1002. The prepared data 1014 may further include conducting geospatial analysis to assess the physical attributes of each area of fire incident occurrence, zoning regulations, and neighborhood delineations, etc. In addition, the prepared data 1014 may include converting text to numerical embeddings and/or resizing images for further processing, according to one embodiment.

The clean data 1016 may include cleaning and filtering the data to remove errors, outliers, or irrelevant information from the collected data. The clean data 1016 process may remove any irrelevant and/or noisy data that may hinder the AI-powered incident action optimization and visualization system 1000, according to one embodiment.

The normalize standardized data 1018 may be the process of reorganizing data within a database (e.g., using the data lake and/or analytics hub 1024) of the AI-powered incident action optimization and visualization system 1000 so that the AI model 1074 can utilize it for generating and/or addressing further queries and analysis. The normalize standardized data 1018 may the process of developing clean data from the collected data (e.g., using the collect data module 1012) received by the database (e.g., using the data lake and/or analytics hub 1024) of the AI-powered incident action optimization and visualization system 1000. This may include eliminating redundant and unstructured data and making the data appear similar across all records and fields in the database (e.g., data lake and/or analytics hub 1024). The normalized standardized data 1018 may include formatting the collected data to make it compatible with the AI model of the AI-powered incident action optimization and visualization system 1000, according to one embodiment.

The curated data 1020 may be the process of creating, organizing and maintaining the data sets created by the normalized standardized data 1018 process so they can be accessed and used by people looking for information. It may involve collecting, structuring, indexing and cataloging data for users of the AI-powered incident action optimization and visualization system 1000. The curated data 1020 may clean and organize data through filtering, transformation, integration and labeling of data for supervised learning of the AI model 1074. Each resource in the AI-powered incident action optimization and visualization system 1000 may be labeled based on whether they are suitable for allocation. The normalized standardized data 1018 may be labeled based on the incident action model hub 1022 and input data prompt 1010 of the Incident Action Artificial-Intelligence Model ("IAAIM" 102) database (e.g., using fire regulation and compliance database 1026), according to one embodiment.

The data lake and/or analytics hub 1024 may be a repository to store and manage all the data related to the AI-powered incident action optimization and visualization system 1000. The data lake and/or analytics hub 1024 may receive and integrate data from various sources in the network to enable data analysis and exploration for incident action optimization and visualization, according to one embodiment.

Maturity Level 1: Prompt, In-Context Learning, and Chaining: At this stage, a model can be selected and prompted to perform a task. The responses are assessed and the model can be re-prompted if necessary. In-context learning (ICL) allows the model to learn from a few examples without changing its weights. Prompt and In-Context Learning can involve prompting the AI with specific resource information and learning from past successful fire resources management to improve suggestions, according to one embodiment.

Input data prompt 1010 may be a process of engineering input prompts for AI-powered incident action optimization and visualization system 1000. Input data prompt 1010 may be the process of structuring text that can be interpreted and understood by a generative AI model. The engineering prompts 1042 may create clear and concise prompts that guide the model towards generating desired outputs. The engineering prompts 1042 may include relevant context and constraints in the prompts. The engineering prompts 1042 may help choose a model domain that may specify the domain of knowledge the model should utilize during generation and ensures that the model can be trained on data relevant to the target domain, according to one embodiment.

The engineering prompts 1042 may further include an example database that provides examples of desired output to guide the model. The engineering prompts 1042 may include specifically crafted prompts that effectively convey the desired task and/or questions that encourage a coherent, accurate, and relevant response from the AI model 1074, according to one embodiment.

A prompt may be natural language text describing the task that an AI model for an incident action and visualization system should perform. Prompt engineering may serve as the initial input to the curated data 1020. It may encapsulate the requirements, objectives, and constraints related to incident action within the fire resource allocation management. Input data prompt 1010 may be formulated based on various factors such as land fire characteristics, zoning regulations, and other relevant parameters of the fire incident. It may initiate the optimization and visualization process, guiding the AI system on the specific goals and considerations for incident actions. Before starting with data preparation, it's essential to define the problem the user wants the AI model 1074 to solve. During this stage, the user (e.g., incident commander 106) may identify the specific tasks or instructions the model of the AI powered incident action optimization and visualization system 1000 should be capable of handling. This helps set the stage for designing appropriate prompts and planning for potential tuning strategies later on, according to one embodiment.

Select/generate/test prompt and iterate 1044 may be the process that involves the iterative process of selecting, generating, and testing prompts. AI-powered incident action optimization and visualization system 1000 may refine the prompt engineering through successive iterations, adjusting parameters and criteria to enhance the optimization results. This iterative loop may be essential for fine-tuning the AI algorithms, ensuring that the system adapts and improves its performance based on feedback and testing, according to one embodiment.

Choosing model/domain 1046 may be the process of selecting an appropriate AI model and/or domain for the incident action optimization task. Different models may be employed based on the complexity of the fire situation, regulatory framework, and/or specific project requirements. The choice of model/domain influences the system's ability to analyze and generate optimized incident action solutions tailored to the given context, according to one embodiment.

The prompt user (e.g., incident commander 106) comment and past analysis learning database 1048 may be a repository of user queries and/or inputs that are used for training and/or testing the AI model 1074 to elicit a specific response and/or output for the incident action optimization. The prompt user comment and past analysis learning database 1048 may be iteratively modified based on the user interaction and analysis of past learning models, according to one embodiment.

Chain it: This involves a sequence of tasks starting from data extraction, running predictive models, and then using the results to prompt a generative AI model 1074 to produce an output. Chain it can mean applying predictive analytics to fire management data, according to one embodiment.

Tune it: Refers to fine-tuning the model to improve its responses. This includes parameter-efficient techniques and domain-specific tuning. Tune it can involve fine-tuning the AI with fire incident occurrences and specific resource management constraints for accurate estimations, according to one embodiment.

Deploy, Monitor, Manage 1008: After a model can be validated, it can be deployed, and then its performance can be continuously monitored. Deployment can see the AI being integrated into the Atherton.com platform, where it can be monitored and managed as users interact with it for incident action suggestions. In this phase, a model can be validated before deployment. The validate model 1064 may be a set of processes and activities designed to ensure that an ML or an AI model performs a designated task, including its design objectives and utility for the end user. The validate model 1064 may perform final testing to ensure model readiness for deployment and address any remaining issues identified during testing. The validate model 1064 may evaluate the trained model's performance on unseen data. For example, the unseen data may include data from a new neighborhood that can be currently under development, data from a demographic group that can be not well-represented in the training data, data from a hypothetical scenario, such as a proposed fire zoning change, environmental factors, reflecting diverse demographics, and geographical locations. This may be done by analyzing the trained model's performance on data from diverse geographical locations and ensuring it does not perpetuate historical biases in resource allocation provisions. Validate model 1064 may be evaluated for potential bias in fire resource allocation and response decisions, promoting equitable development and avoiding discriminatory patterns, the fair and transparent valuations across different demographics and locations, ensuring it may be generalized well and produce accurate predictions in real-world scenarios. Validate model 1064 may help in identifying potential biases in the model's training data and/or its decision-making process, promoting fairness and ethical AI development. By identifying areas where the train model may be improved, validate model 1064 may help to optimize its performance and efficiency, leading to better resource utilization and scalability. Once the final fine-tune model 1058 can be validated, it may be put to the test with data to assess its real-world effectiveness. Subsequently, it can be deployed for practical use within the AI-powered incident action optimization and visualization system 1000, according to one embodiment.

The deploy and serve model 1066 may include deploying the trained model after validating through the validate model 1064 to the endpoint, testing the endpoint, and monitoring its performance. Monitoring real-time data may identify changes in fire incident occurrences, zoning regulations, and environmental conditions, and updating the AI model's fine-tuning accordingly. The model's performance may be continuously monitored using the continuous monitoring model 1068, and additional fine-tuning may be performed as needed to adapt to evolving regulations and shifting market conditions by using the fine-tune model 1058. Continuous monitoring model 1068 may provide perpetual monitoring for optimum performance of the model. The prediction model 1070 may be a program that detects specific patterns using a collection of data sets. The prediction model 1070 may make predictions, recommendations and decisions using various AI and machine learning (ML) techniques of the AI-powered incident action optimization and visualization system 1000. Predictive modeling may be a mathematical process used to predict future events or outcomes by analyzing patterns in a given set of input data. A model registry 1076 may be a centralized repository for storing, managing, and tracking the different versions of the machine learning models of the AI-powered incident action optimization and visualization system 1000. The model registry 1076 may act as a single source of truth for all model artifacts, including model code and weights, metadata like training parameters, performance metrics, and author information versions and timestamps documentation and note. The prediction model 1070 may involve much more than just creating the model itself. encompassing validation, deployment, continuous monitoring, and maintaining the model registry 1076, according to one embodiment.

Maturity Level 3: RAG it & Ground it: Retrieval Augmented Generation (RAG) can be used to provide context for the model by retrieving relevant information from a knowledge base. Grounding ensures the model's outputs are factually accurate. RAG and Grounding can be utilized to provide contextually relevant information from fire regulation and compliance database 1026 to ensure recommendations are grounded in factual, up-to-date fire incident data, according to one embodiment.

FLARE it: A proactive variation of RAG that anticipates future content and retrieves relevant information accordingly. FLARE it can predict future changes in fire zoning laws or environmental conditions that can affect firefighting resource allocation potential, according to one embodiment.

CoT it or ToT it. GOT it?: These are frameworks for guiding the reasoning process of language models, either through a Chain of Thought, Tree of Thought, or Graph of Thought, allowing for non-linear and interconnected reasoning. CoT, ToT, GOT frameworks can guide the AI's reasoning process as it considers complex fire scenarios, ensuring it can explore multiple outcomes and provide well-reasoned firefighting resource allocation suggestions, according to one embodiment.

Figure 11:
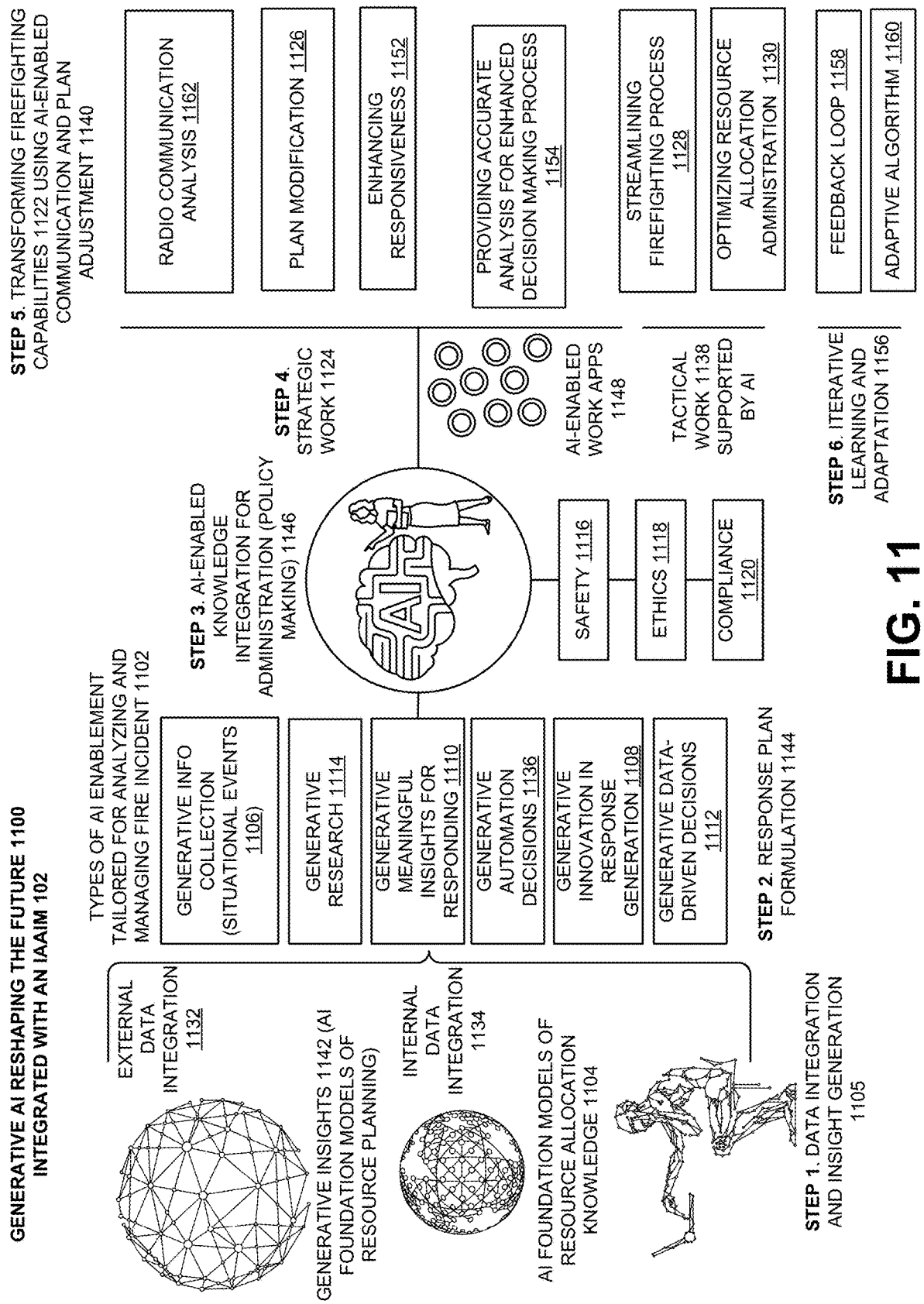
FIG. 11 illustrates the concept of "Generative AI Reshaping the Future," to transform various aspects of generative AI of the edge based ad-hoc network for automatically generating an incident action plan through the IAAIM, according to one embodiment.

FIG. 11 illustrates the concept of "Generative AI Reshaping the Future 1100," to transform various aspects of generative AI of the edge based ad-hoc network for automatically generating an incident action plan 200 through the IAAIM 102, according to one embodiment. FIG. 11 showcases how artificial intelligence, particularly generative AI, can transform various aspects of incident action planning for firefighting, according to one embodiment.

A generative AI model for automatically generating and modifying an incident action plan 200 in response to a fire incidents 1102—Incident Action Artificial-Intelligence Model (IAAIM 102)—can follow a multi-step process as described below:

Step 1. Data Integration and Insight Generation 1105:

External Data Integration 1132: IAAIM 102 can collect data from external sources such as weather reports, traffic conditions, and satellite imagery to understand the broader context of the fire incident. This may further include generative info collection of situational events 1106 and types of AI enablement that are tailored for analyzing and managing fire incidents 1102.

Internal Data Integration 1134: It can also integrate internal data such as the current location of resources, personnel availability, and equipment status within the emergency services.

Generative Insights 1142: Using generative AI algorithms, IAAIM 102 can analyze both sets of data to generate insights into the current fire situation, potential spread, and the effectiveness of various response strategies.

Step 2. Response Plan Formulation 1144:

Generative Research 1114: IAAIM 102 can research historical data and similar past incidents to inform the initial incident action plan.

Generative Innovation in Response Generation 1108: It can simulate innovative response scenarios to predict outcomes using advanced AI techniques like GANs (Generative Adversarial Networks).

Generative Automation Decisions 1136: AI can automate the decision-making process for initial incident action based on the above insights and simulations.

Generative Meaningful Insights for Responding 1110: It may refer to valuable and actionable information created using generative AI technologies to enhance understanding, decision-making, and strategic planning during fire emergencies.

Step 3. AI-Enabled knowledge integration for administration (policy making) 1146—Safety, Ethics, and Compliance:

Safety 1116: Prioritize the safety of civilians and responders in the incident action plan.

Ethics 1118: Ensure the plan adheres to ethical guidelines, such as equitable resource distribution.

Compliance 1120: Follow legal and regulatory requirements applicable to emergency response.

Step 4. Strategic and Tactical Work:

Strategic Work 1124: Include strategic considerations such as potential escalation, the need for additional resources 332, and long-term impacts of the fire incident.

Tactical Work 1138: Develop a tactical plan detailing specific assignments for each unit and responder, and real-time adjustments as the situation evolves. This step may enable streamlining the firefighting process 1128 and may involve optimizing the incident action administration 1130, according to one embodiment.

Step 5. Transforming firefighting capabilities 1122 using AI-Enabled Communication and Plan Adjustment 1140:

Radio Communication Analysis 1162: Implement NLP (Natural Language Processing) to analyze trusted radio communications from incident commanders and responders.

Plan Modification 1126: Use insights from real-time data and communications to modify the incident action dynamically. This may include enhancing responsiveness 1152 and providing accurate analysis for enhanced decision making process 1154, according to one embodiment.

AI-Enabled Work Apps 1148: Develop applications that assist incident commanders $106_{1-N}$ in visualizing and managing incident actions effectively, according to one embodiment.

Step 6. Iterative Learning and Adaptation 1056:

Feedback Loops 1158: Create feedback mechanisms to learn from the effectiveness of incident actions and update the AI model for continuous improvement, according to one embodiment.

Adaptive Algorithms 1160: Use machine learning to adapt the allocation strategies based on outcomes and effectiveness in real-time, according to one embodiment.

FIG. 11 demonstrates the transformative impact of AI on governance, particularly through the analysis of ambient signals, according to one embodiment. Strategically, the AI identifies emerging issues and trends in ambient signals, informing policy-makers about the pressing concerns of their constituents. This insight can be crucial in addressing societal challenges related fire resource allocation planning and management. It also enhances the decision-making process by providing accurate analyses or analysis of ambient data, according to one embodiment. This integration of AI in public administration represents a significant advancement in enhancing democratic engagement, making the public consultation process more accessible and impactful, according to one embodiment.

Figure 12:
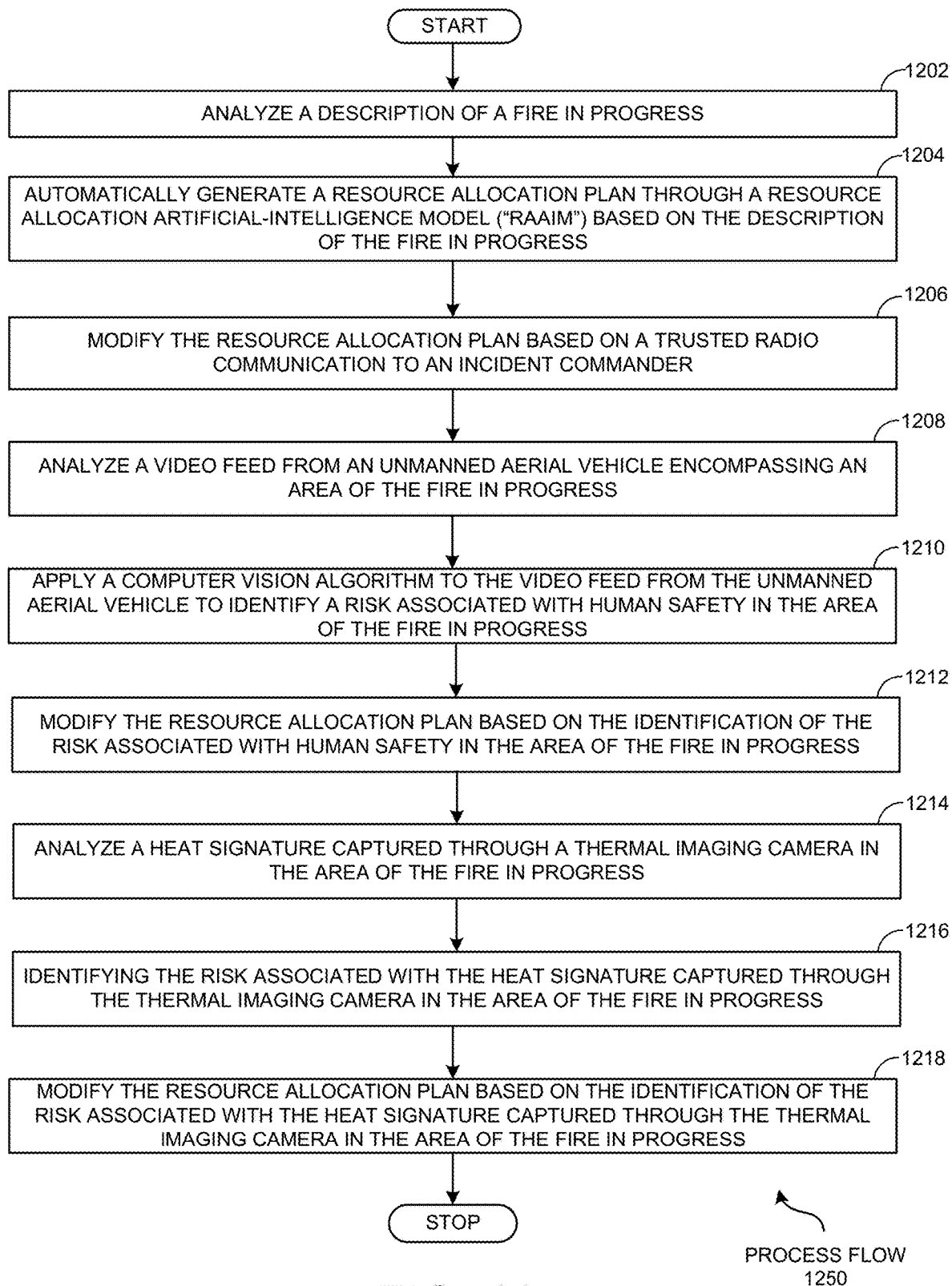
FIG. 12 is a process flow diagram detailing the operations involved in generating an incident action plan using the IAAIM, according to one embodiment.

FIG. 12 is a process flow 1250 diagram detailing the operations involved in generating an incident action plan 200 using the IAAIM 102, according to one embodiment. In operation 1202, a description 122 of a fire 100 in progress can be analyzed. In operation 1204, an incident action plan 200 can be automatically generated through an Incident Action Artificial-Intelligence Model ("IAAIM") 102 based on the description 122 of the fire 100 in progress. In operation 1206, the incident action plan 200 can be modified based on a trusted radio communication 104 to an incident commander 106. The trusted radio communication 104 may be from a tactical firefighter 108, a fire captain 110, a dispatch center 112, and/or a regional fire center 120.

Then, in operation 1208, a video feed 121 from an unmanned aerial vehicle 124 encompassing an area of the fire 100 in progress can be analyzed. Next, in operation 1210, a computer vision algorithm 126 to the video feed 121 from the unmanned aerial vehicle 124 can be applied to identify a risk associated with human safety in the area of the fire 100 in progress. This can be followed by modifying the incident action plan 200 based on the identification of the risk associated with human safety in the area of the fire 100 in progress in operation 1212. The description 122 may be an input to the IAAIM 102 and can be provided from a dispatch center 112, an eyewitness 132, and/or an observational camera 134 in the area of the fire 100 in progress.

In operation 1214, a heat signature captured through a thermal imaging camera in the area of the ongoing fire can be analyzed. The risk associated with the heat signature captured by thermal imaging camera in the area of the fire 100 in progress can be then identified in operation 1216. The incident action plan 200 can be modified based on the identification of the risk associated with the heat signature captured through the thermal imaging camera in the area of the fire 100 in progress in operation 1218.

Figure 13:
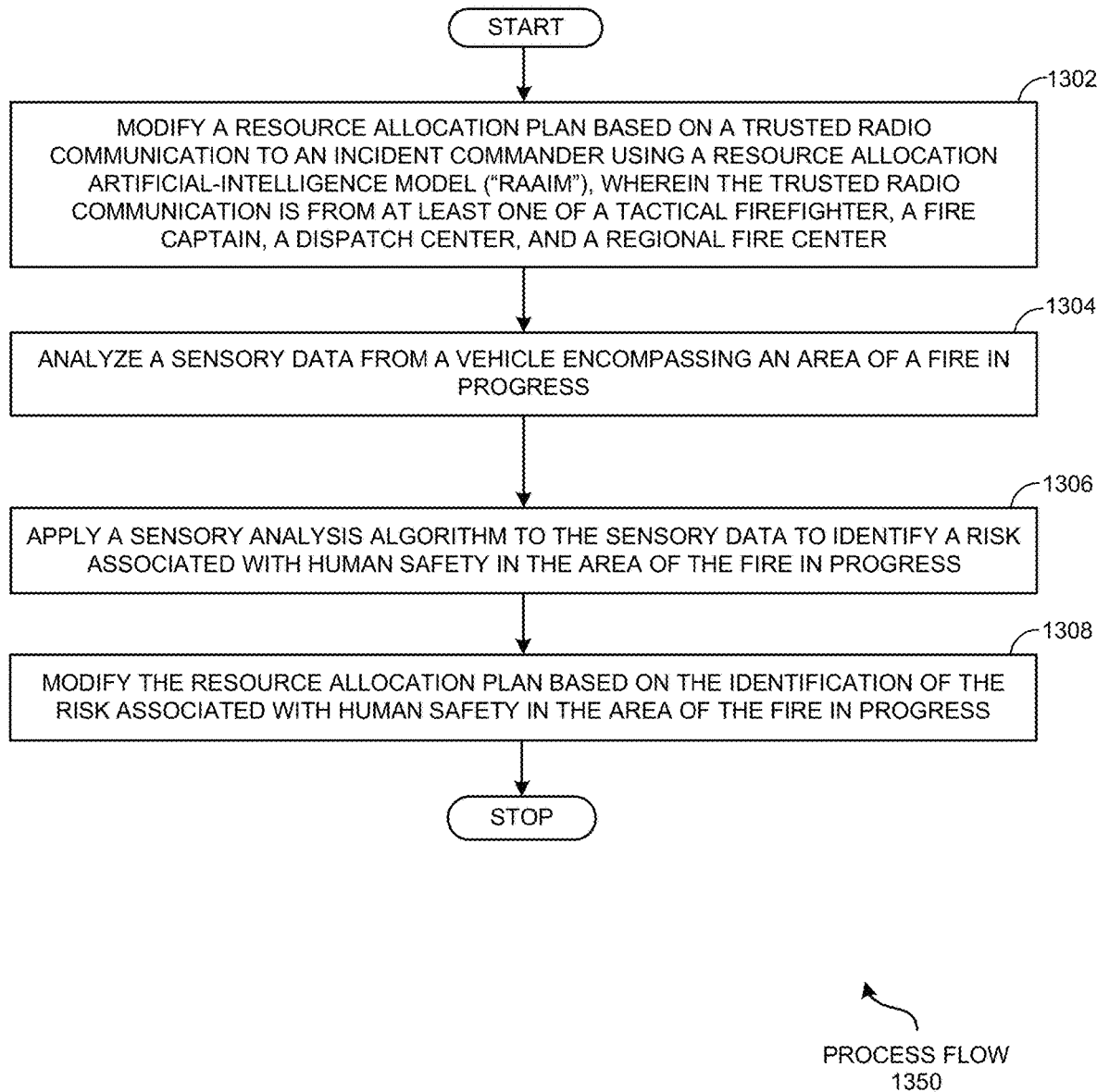
FIG. 13 is another process flow diagram detailing the operations involved in generating an incident action plan using the IAAIM, according to one embodiment.

FIG. 13 is another process flow 1350 diagram detailing the operations involved in generating an incident action plan 200 using the IAAIM 102, according to one embodiment. In operation 1302, an incident action plan 200 can be modified based on a trusted radio communication 104 to an incident commander 106 using an Incident Action Artificial-Intelligence Model ("IAAIM") 102. The trusted radio communication 104 may be from a tactical firefighter 108, a fire captain 110, a dispatch center 112, and a regional fire center 120. A sensory data from a vehicle encompassing an area of a fire 100 in progress can be analyzed in operation 1304. Then, a sensory analysis algorithm to the sensory data to identify a risk associated with human safety in the area of the fire 100 in progress can be applied in operation 1306. Finally, in operation 1308, the incident action plan can be modified based on the identification of the risk associated with human safety in the area of the fire 100 in progress.

Figure 14:
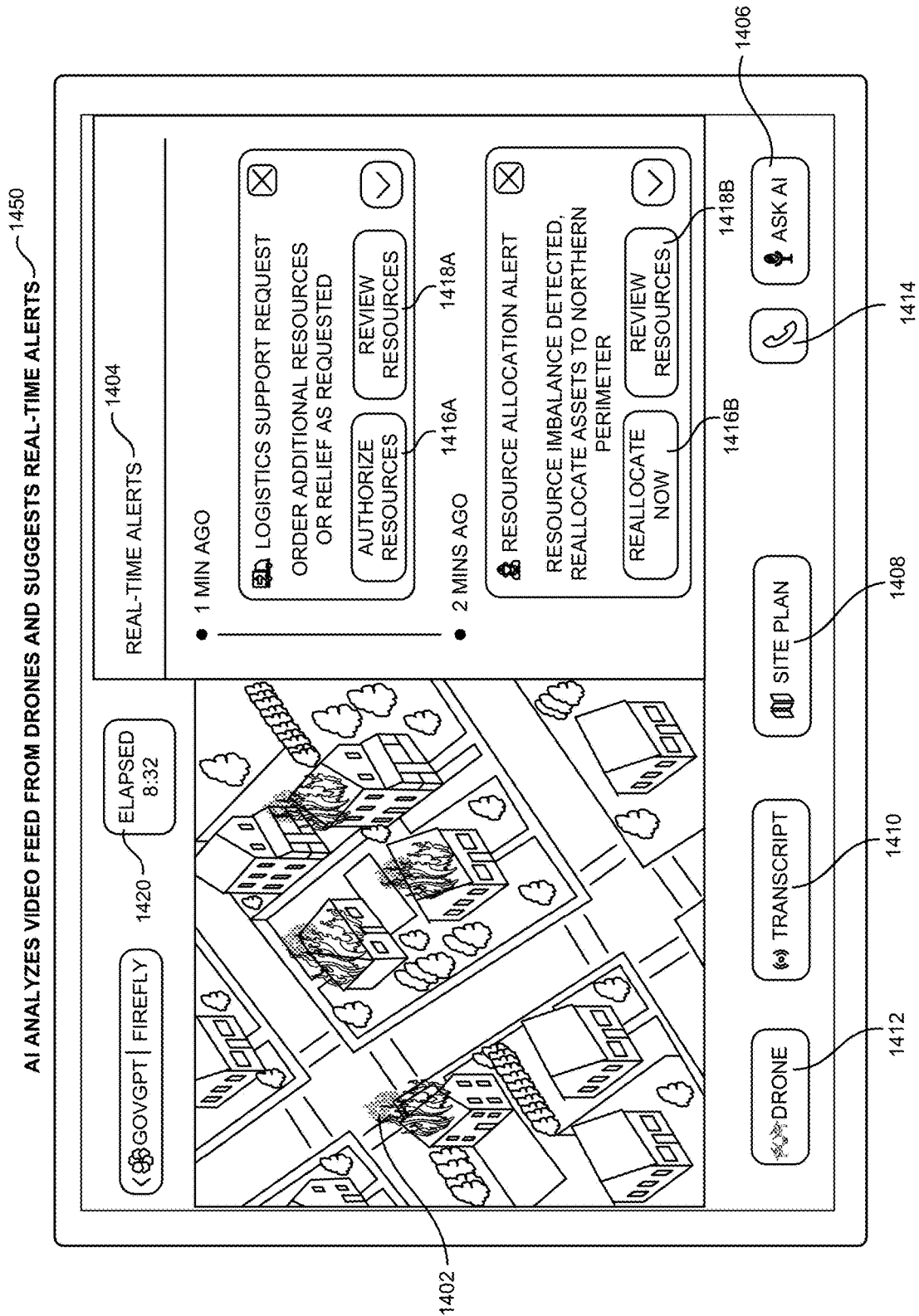
FIG. 14 is a user interaction view showing drone footage alongside real time alerts, according to one embodiment.

FIG. 14 is a user interaction view showing drone footage 1412 alongside real time alerts, according to one embodiment. In FIG. 14, a drone view 1402 is illustrated on the left side of the page, showing an active building on fire through aerial footage, according to one embodiment. Real time alerts 1404 are shown on the left side, which provide time based (e.g., 1 min ago) automated AI generated alerts that are communicated to the incident commander 106 through the wearable AI pendant 116, according to one embodiment. Automatically are displayed action buttons such as "Authorize Resources" 1416A or "Reallocate Now" 1416B based on the situational needs, according to one embodiment. These buttons may be tied to specific instructions that can be executed by the AI, according to one embodiment. The buttons "Review Resources" 1418A and 1418B might allow the incident commander 106 to review available resources, according to one embodiment. The Ask AI 1406 may be a button in which an interactive voice response question can be posed to the display 202 directly to query the AI, according to one embodiment.

Figure 16:
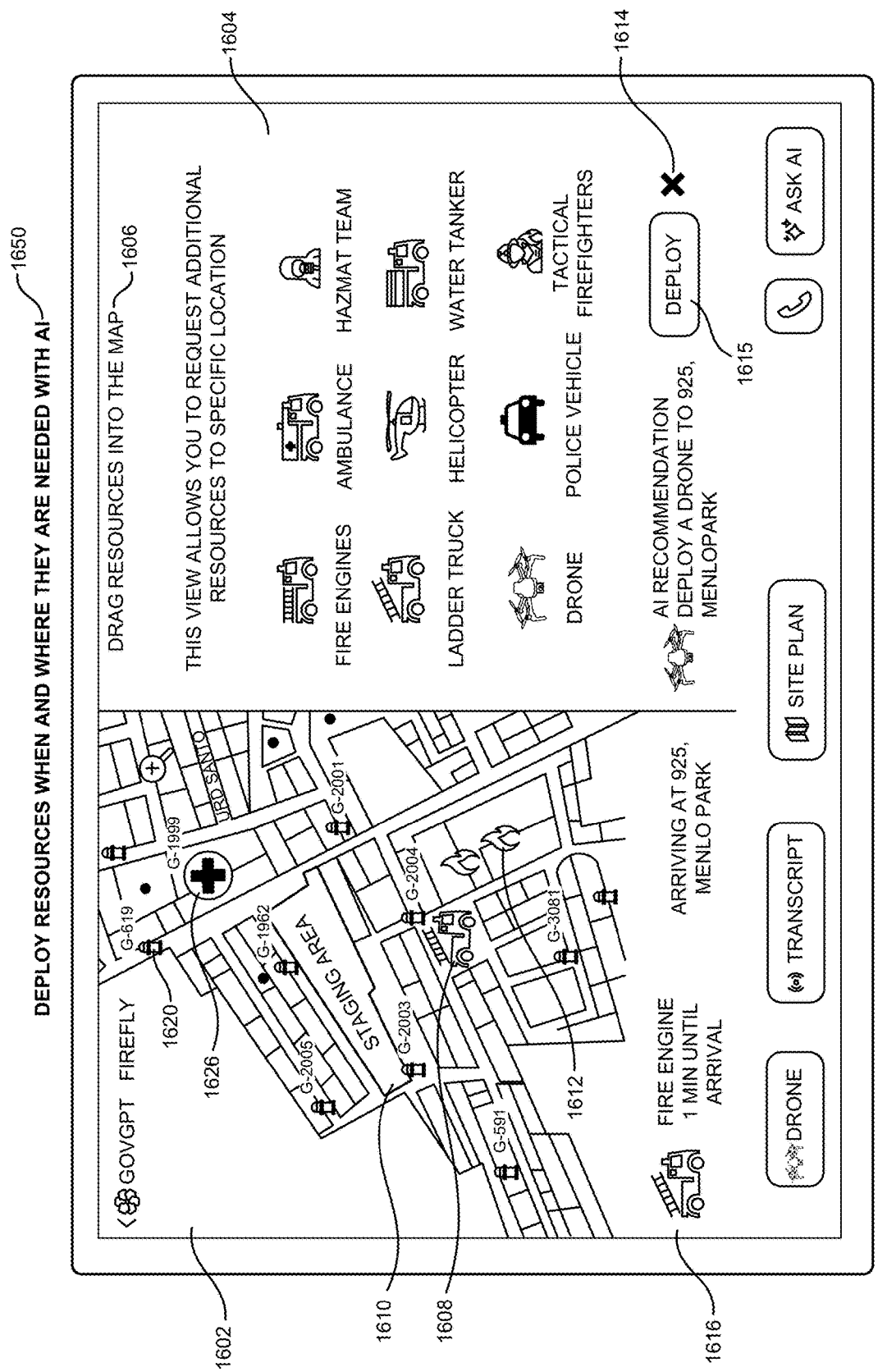
FIG. 16 is a user interaction view showing a drag and drop view along with alerts, according to one embodiment.

There are three tabs shown in the view of FIG. 14, according to one embodiment. The first tab, "Site Plan" 1408 allows the user to view a site plan as shown in FIG. 16, according to one embodiment. The button "Transcript 1410" shows the transcript, as shown in FIG. 15, according to one embodiment. The drone view 1412 shows the view in FIG. 14, in which AI analyzes video feed from drones and suggests real-time alerts 1450, according to one embodiment. The phone button 1414 allows the user to quickly click to call preset or manual dialed phone numbers, according to one embodiment. The elapsed time 1420 shows how much time has elapsed into an active incident in real time, according to one embodiment.

FIG. 14 is presented as a comprehensive user interaction interface, designed to enhance situational awareness and decision-making during emergency incidents by integrating drone footage with real-time, AI-generated alerts, according to one embodiment. The interface is divided into two primary sections. On the left side, viewers are presented with a dynamic drone view (1402), offering aerial footage of an active emergency scenario, specifically showcasing a building engulfed in flames, according to one embodiment. This live feed provides incident commanders with a bird's-eye perspective of the situation, allowing for a broader understanding of the incident's scope and the effectiveness of the response efforts, according to one embodiment.

Adjacent to the drone view, on the right side of the interface, is the real-time alerts section (1404). This area is dedicated to delivering automated, AI-generated alerts that are time-stamped (e.g., "1 min ago") to provide immediate insights into the evolving situation. These alerts are communicated directly to the incident commander (106) via a wearable AI pendant (116), ensuring that critical information is readily accessible and actionable. The AI's role extends to analyzing the drone footage in real-time, identifying significant developments, and generating relevant alerts (1450) to aid in swift decision-making, according to one embodiment.

Central to the interface are action buttons, such as "Authorize Resources" (1416A) and "Reallocate Now" (1416B), which are automatically displayed based on the assessed needs of the ongoing incident, according to one embodiment. These buttons are directly linked to predefined commands that the AI can execute, streamlining the response process, according to one embodiment. Additionally, a "Review Resources" button offers the incident commander the capability to assess the resources currently available for deployment, ensuring an efficient allocation of assets, according to one embodiment.

Another innovative feature is the "Ask AI" button (1406), enabling direct interaction with the system through voice queries, according to one embodiment. This function allows the incident commander to request specific information or guidance from the AI, which is then displayed on the interface (202), facilitating a more interactive and responsive user experience, according to one embodiment.

The interface also includes three informative tabs: "Site Plan" (1408), "Transcript" (1410), and the drone view (1412) itself, according to one embodiment. The "Site Plan" tab provides access to detailed layouts of the incident site, offering strategic insights that are crucial for planning and operations, according to one embodiment. The "Transcript" tab displays a detailed record of communications and alerts, ensuring that all information is documented and accessible for review, according to one embodiment. The drone view tab reaffirms the interface's focus on providing a real-time visual assessment of the situation, according to one embodiment.

Additionally, a phone button (1414) is integrated into the interface, enabling users to quickly initiate calls to pre-set or manually dialed numbers, enhancing communication efficiency during critical moments, according to one embodiment. The elapsed time indicator (1420) is another key feature, offering real-time updates on the duration of the incident, assisting in the management of resources and the evaluation of response efforts over time, according to one embodiment.

Overall, FIG. 14 depicts an advanced, user-centric interface designed to optimize emergency response operations through the seamless integration of live aerial visuals, AI-driven analytics, and interactive functionalities, according to one embodiment. This embodiment aims to empower incident commanders with immediate access to critical information, enabling informed decision-making and effective incident management, according to one embodiment.

FIG. 15 is a user interaction view showing a transcript view 1410 along with highlighted alerts, according to one embodiment. FIG. 15 shows a view that allows a goal of never letting crucial information be missed during a fire incident 1550, according to one embodiment. A transcript is shown on the left side (similar to Otter.ai) but with important alerts highlighted, according to one embodiment. The user can also indicate which radio channels to show transcripts for in selector 1504, or see an AI summary of the transcript using button 1506, according to one embodiment.

FIG. 15 introduces a sophisticated user interaction view that emphasizes the importance of comprehensive communication and information management during emergency scenarios, specifically focusing on fire incidents (1550), according to one embodiment. This view is meticulously designed to ensure that crucial information is consistently highlighted and accessible, preventing any oversight in the heat of the moment.

At the core of FIG. 15 is the transcript view (1410), strategically placed on the left side of the interface, according to one embodiment. This component bears resemblance to the functionality offered by advanced transcription services like Otter.ai, but it is further enhanced for emergency management purposes, according to one embodiment. The transcript captures live audio feeds from various sources and converts them into text in real-time, offering a detailed, written record of all communications, according to one embodiment. What sets this transcript apart is its intelligent feature of highlighting important alerts within the text, according to one embodiment. This design choice ensures that critical updates, warnings, and instructions stand out, enabling quick identification and action by the user, according to one embodiment.

To cater to the complex nature of emergency response operations, the interface includes a channel selector (1504), according to one embodiment. This selector allows users to tailor the transcript view to their specific needs by choosing which radio channels or communication feeds to display, according to one embodiment. This flexibility ensures that the user can focus on the most relevant information streams, significantly improving situational awareness and the efficiency of information processing, according to one embodiment.

An additional layer of intelligence is introduced with an AI summary button (1506), according to one embodiment. This feature provides users with the option to condense the extensive transcript into a concise summary, generated through AI analysis, according to one embodiment. The summary aims to distill the essence of the communications, highlighting pivotal information and insights that could influence decision-making processes, according to one embodiment. This tool is invaluable for users who need to grasp the situation quickly or review key points from lengthy discussions without sifting through the entire transcript, according to one embodiment.

FIG. 15 is designed with a clear goal: to make sure that during the chaos of a fire incident, no vital information goes unnoticed, according to one embodiment. It achieves this by combining real-time transcription with intelligent highlighting of alerts, customizable channel selection for tailored information flow, and AI-powered summarization for quick comprehension, according to one embodiment. This embodiment stands as a testament to the potential of integrating advanced technology with emergency management practices, offering a user-centric solution that enhances communication, streamlines information processing, and ultimately supports more effective incident response strategies, according to one embodiment.

FIG. 16 is a user interaction view showing a drag and drop view 1650 along with alerts, according to one embodiment. A map view 1602 is shown on the left, showing an active fire 1612, a fire engine 1608, and a hospital nearby 1616, according to one embodiment. Numerous fire hydrants 1620 and ingress/egress routes can be shown on the map, according to one embodiment. A staging area 1610 is also shown on the map, and which can automatically be relocated based on an AI recommendation, according to one embodiment. This view allows the incident commander 106 an Uber/Lyft like interface to drag and drop into the map 1606 resources 1604 like fire engines, ambulances, Hazmat teams, ladder trucks, water tankers, drones, police vehicles, and additional tactical firefighters from the right side of the user interface onto the map, and automatically schedule vehicles and resources to a specific location, according to one embodiment. A time of arrival is automatically shown with indicator 1616, according to one embodiment. Also, AI recommendations of resources are displayed in 1614 along with an action button to "Deploy" resources 1615, according to one embodiment.

FIG. 16 presents an advanced user interaction view that combines the immediacy and flexibility of drag-and-drop functionality with critical situational awareness tools, tailored for managing emergency incidents such as fires, according to one embodiment. This interface is designed to offer an intuitive, highly interactive experience, akin to popular ride-sharing services like Uber or Lyft, but with functionalities specifically adapted for emergency response coordination, according to one embodiment.

Central to this view is the map display (1602) on the left side of the interface, which serves as the operational canvas for the incident commander (106), according to one embodiment. The map vividly illustrates key elements of the current scenario, including the location of an active fire (1612), the positions of fire engines (1608), and the proximity of critical infrastructure such as hospitals (1626), according to one embodiment. Additionally, it provides a comprehensive overlay of essential resources and logistical information, such as the locations of numerous fire hydrants (1620) and designated ingress/egress routes, enhancing the commander's ability to strategize responses effectively, according to one embodiment.

A notable feature of the map is the inclusion of a staging area (1610), which is dynamically adjustable based on AI-generated recommendations, according to one embodiment. This functionality allows for the optimal positioning of response units and resources, ensuring they are strategically placed for rapid deployment and efficiency, according to one embodiment.

The right side of the user interface hosts a palette of resources (1604) that can be deployed in response to the incident, according to one embodiment. This selection includes, but is not limited to, fire engines, ambulances, Hazmat teams, ladder trucks, water tankers, drones, police vehicles, and additional tactical firefighters, according to one embodiment. The incident commander can effortlessly assign these resources to specific locations on the map through a drag-and-drop action (1606), simulating the deployment of units in real time, according to one embodiment. This method not only simplifies the allocation process but also allows for a visual and interactive planning experience, according to one embodiment.

Once resources are allocated, the system automatically calculates and displays the estimated time of arrival (1616)

for each unit, providing the commander with critical timing insights to coordinate the response efforts more effectively, according to one embodiment. This feature ensures that the incident commander can make informed decisions regarding the timing and placement of resources to address the evolving situation, according to one embodiment.

Moreover, AI-generated recommendations for resource deployment (1614) are displayed within the interface, accompanied by a "Deploy" action button (1615), according to one embodiment. These recommendations are based on a sophisticated analysis of the current scenario, available assets, and logistical considerations, offering suggestions to optimize the response effort, according to one embodiment. By integrating these AI capabilities, the interface not only facilitates manual resource management but also enhances decision-making with data-driven insights, according to one embodiment.

In essence, FIG. 16 encapsulates a forward-thinking approach to emergency incident management, merging intuitive design with intelligent functionalities, according to one embodiment. It empowers incident commanders with a comprehensive toolset for real-time resource allocation, strategic planning, and situational analysis, all aimed at improving the efficacy and efficiency of emergency responses, according to one embodiment.

Implementing an IAAIM 102 to process information efficiently without overloading a generative AI pendant 116 like the one used by an incident commander 106 requires careful consideration of network topologies. The aim can be to ensure that the device remains lightweight, has a long battery life, and can be capable of rapid communication. Here are different network topologies that can be employed, according to one embodiment:

Edge Computing: Processes data of the IAAIM 102 at the edge of the network, close to where it's generated, rather than in a centralized data-processing warehouse. The generative AI pendant 116 can preprocess voice commands locally for immediate responsiveness and then send specific queries to a more powerful edge device (like a mobile command center or a vehicle-mounted computer) for complex processing. The advantage includes reduced latency, conserved bandwidth, and opportunity the pendant can operate with minimal processing power, extending battery life.

Cloud Computing: Utilizes cloud services for data processing and storage. The generative AI pendant 116 sends data to the cloud, where heavy-duty computing resources process the information and send back responses. This approach leverages the virtually unlimited resources of the cloud for complex analysis and AI processing. Advantages: Offloads processing from the generative AI pendant 116, allows for more complex AI models than the device can run locally, and keeps the device small and energy-efficient.

Fog Computing. A decentralized computing infrastructure in which data, compute, storage, and applications are located somewhere between the data source and the cloud. This can mean leveraging nearby devices or local servers for processing before moving data to the cloud if necessary. Offers lower latency than cloud computing by processing data closer to the source, reduces bandwidth needs, and supports real-time decision making without overloading the wearable device.

Hybrid Model. Combines edge, fog, and cloud computing, where the system intelligently decides where to process each piece of data or command based on criteria like processing power needed, bandwidth availability, and battery life conservation. Balances between latency, power consumption, and processing capabilities. It ensures that the pendant can function efficiently in a variety of scenarios, from low-connectivity environments to situations requiring heavy data analysis.

Mesh Network. A network topology where each node relays data for the network. Devices can communicate directly with each other and with local nodes (like fire trucks or command centers) that handle more significant processing tasks or act as bridges to other networks (like the internet or a dedicated emergency services network). Enhances reliability and redundancy. If one node fails, data can take another path, ensuring the system remains operational even in challenging conditions.

The optimal choice depends on various factors, including the specific requirements of the incident command operations, the environment in which the device will be used, and the availability of local vs. cloud computing resources. A hybrid model often provides the best flexibility, leveraging the strengths of each approach to meet the demands of different scenarios efficiently.

To ensure the GovGPT Firefly™ can be effective across various firefighting scenarios, operational and product adjustments are necessary to cater to the unique challenges and requirements of each environment:

1. Wildfires

Operational Changes: Integrate satellite and aerial imagery for real-time tracking of fire spread and hotspots. Utilize predictive modeling for fire behavior based on weather, terrain and vegetation. Coordinate air and ground resources for containment (eg, the UAV 124), including air tankers and firefighting crews.

Product Changes: Enhance battery life for extended operations in remote areas. Improve device durability to withstand extreme heat and smoke. Increase range and reliability of wireless communication in areas with limited connectivity.

2. Suburban Neighborhoods

Operational Changes: Implement systems for rapid evacuation notification and route planning to minimize traffic congestion. Coordinate with local utility companies for the control of gas and electrical services to prevent secondary incidents. Utilize thermal imaging and drone reconnaissance to identify hidden fire pockets within structures.

Product Changes: Integrate with local emergency management software systems for seamless information sharing. Adapt the user interface for quick access to structural and homeowner information, including hazardous materials and access points. Ensure compatibility with urban communication infrastructures for uninterrupted connectivity.

3. Rural Areas. Operational Changes: Deploy mobile command centers to overcome limited infrastructure for command and control operations. Utilize local knowledge and terrain mapping for effective strategy planning and resource deployment. Prioritize water sourcing and logistics due to potential scarcity of resources.

Product Changes: Enhance GPS and mapping functionalities to navigate rural terrains with accuracy. Optimize data transmission technologies to maintain connectivity in areas with poor cellular service. Adapt battery solutions for easy swapping or recharging in environments where power sources are scarce.

4. Densely Populated Areas

Operational Changes: Integrate with city infrastructure systems (e.g., traffic control, public transport) to manage evacuation and emergency vehicle movement efficiently. Utilize building information modeling (BIM) and GIS data for high-rise and complex structures to plan firefighting and evacuation strategies. Coordinate closely with medical facilities and emergency medical services for rapid response to casualties.

Product Changes: Ensure data processing capabilities are robust enough to handle complex simulations and models for high-density areas. Incorporate noise cancellation and enhancement technologies to ensure voice commands are accurately recognized in noisy urban environments. Increase device scalability to integrate with various smart city technologies and emergency response systems.

For each scenario, GovGPT Firefly™ needs to be adaptable, both in how it operates and in its physical design, to meet the demands of the situation effectively. Tailoring the device and its deployment strategies to fit the specific needs of the firefighting environment will enhance its utility and effectiveness, ensuring that it remains a vital tool for incident commanders across any scenario.

To ensure the GovGPT Firefly™ can be effective across various firefighting scenarios, operational and product adjustments are necessary to cater to the unique challenges and requirements of each environment:

GovGPT Firefly™, with its advanced AI capabilities, can offer dynamic and creative recommendations to modify real-time incident management plans. These recommendations are based on the integration of known site plans (e.g., site plan data 105) and the continuous stream of radio communications received by the incident commander 106. Here are some creative examples of how Firefly™ can enhance incident response strategies:

1. High-Rise Building Fire

Situation: A fire has been reported on multiple floors of a high-rise building 101 with a complex layout.

Radio Communication 104: "We have flames visible on the north side, floors 10 through 12, with possible spread to adjacent floors."

Firefly™ Recommendation 302: "Based on the building's site plan, recommend deploying aerial ladder units to the north side for exterior attack. Activate the building's integrated fire control systems on floors 9 through 13 to contain spread. Direct search and rescue teams use stairwell B for evacuation, as stairwell A is compromised."

2. Industrial Complex with Hazardous Materials

Situation: A fire and potential chemical spill at an industrial complex.

Radio Communication 104: "Suspected chemical spill in sector 4, with visible smoke. Need hazmat assessment."

Firefly™ Recommendation 302: "Site plan indicates sector 4 houses volatile chemicals. Initiate immediate evacuation of downwind areas based on current wind direction. Deploy drone reconnaissance to assess the spread without risking personnel. Recommend hazmat units stage at the east entry, upwind from the incident, for containment and neutralization."

3. Suburban Wildland Interface Fire

Situation: A wildfire is approaching a suburban area, threatening homes and a local school.

Radio Communication 104: "The fire line is moving faster than anticipated towards Crestview neighborhood and Maple Elementary School."

Firefly™ Recommendation 302: "Utilize the neighborhood's site plan to identify firebreak opportunities, such as parks or wide roads. Recommend preemptive water drops on the school's perimeter and initiate door-to-door evacuation in Crestview. Convert the community center to a temporary shelter for evacuees."

4. Historic District with Narrow Streets

Situation: A fire in a historic district with narrow access streets, posing challenges for large apparatus access.

Radio Communication 104: "Difficulty accessing the fire ground due to narrow streets. Need alternative approaches."

Firefly™ Recommendation 302: "The district's site plan shows a pedestrian plaza near the incident that can serve as a temporary staging area. Recommend deploying portable pumps and using smaller, maneuverable vehicles for firefighting efforts. Alert utility companies to shut off gas lines to prevent further hazards."

5. Large-Scale Event with Crowd Control Issues

Situation: A fire incident at a large-scale outdoor event with thousands of attendees.

Radio Communication 104: "Evacuation routes are congested. We're seeing bottlenecks at the main exits."

Firefly™ Recommendation 302: "The event site plan includes multiple emergency exits not currently in use. Broadcast announcements over the public address system to direct crowds to alternate exits at the north and south ends. Coordinate with event security to facilitate orderly evacuation and prevent stampedes."

These examples showcase the potential of GovGPT Firefly™ to provide insightful, situationally aware recommendations that can significantly impact the outcome of incident responses. Using detailed site plans (e.g., site plan data 105) and real-time communications, Firefly™ helps incident commanders make informed, strategic decisions prioritizing safety and efficiency.

The use of building site plans in creating initial incident response plans (e.g., incident action plan 200) is crucial for effective emergency management, particularly in urban or complex structural environments. These plans provide detailed information about a building's layout, access points, structural components, utilities, and potential hazards, enabling responders to plan their approach strategically. Incorporating building site plans into the GovGPT Firefly™ system can significantly enhance its utility by automating the creation of tailored resource allocation and incident response strategies.

Tailored Use Cases in Menlo Park Fire District in California

Tailoring the GovGPT Firefly™ system for use within the jurisdiction of the Menlo Park Fire Protection District, including Atherton, Menlo Park, East Palo Alto, and surrounding unincorporated areas of San Mateo County, demands a focused approach that considers the specific characteristics and needs of these communities. Here are adapted recommendations for emergency scenarios within these areas:

1. Residential Fire in Atherton

Radio Communication 104: "Report of a significant residential fire on Alameda de las Pulgas, Atherton, with potential spread to neighboring homes."

Firefly™ Recommendation 302: "Cross-reference the address with Atherton's residential site plans to identify nearby fire hydrants and access routes for emergency vehicles. Advise deploying additional units to create firebreaks between homes. Alert neighboring residences to prepare for possible evacuation. Coordinate with Atherton Police for traffic control."

2. Flood Risk in East Palo Alto

Radio Communication 104: "San Francisquito Creek levels rising rapidly, threatening overflow into East Palo Alto neighborhoods."

Firefly™ Recommendation 302: "Access East Palo Alto's flood risk maps and San Francisquito Creek's monitoring data to predict impacted areas. Initiate community alerts for potential evacuation zones, especially in previously floodprone neighborhoods. Recommend staging sandbags and flood barriers at strategic points along the creek identified as high-risk for overflow."
3. Chemical Spill Near Menlo Park Industrial Area Radio Communication 104: "Hazardous material spill reported at the industrial complex near Marsh Road, Menlo Park. Possible air and water contamination."

Firefly™ Recommendation 302: "Use Menlo Park's industrial area plans to identify the spill site and potential containment methods. Direct hazmat teams to the incident location, advising on wind direction for protective gear use. Coordinate with environmental health agencies to monitor air and water quality. Inform downwind and downstream communities about potential health precautions."
4. Wildfire Threat to Unincorporated San Mateo County Areas Radio Communication 104: "Vegetation fire ignited near unincorporated area close to Woodside, with strong winds increasingly spreading towards residential zones."

Firefly™ Recommendation 302: "Leverage topographical maps and wind forecasts to model the fire's potential path. Recommend immediate evacuation for homes in the predicted path and alert aerial firefighting units for preemptive water or retardant drops. Utilize local radio and social media to communicate evacuation routes and safe zones."
5. Major Accident on Highway 101 Impacting Access to Emergency Services Radio Communication 104: "Multi-vehicle collision on Highway 101 near the Willow Road exit, Menlo Park. Significant traffic impact with emergency vehicle access restricted."

Firefly™ Recommendation 302: "Refer to Menlo Park's traffic management plans to identify alternative routes for emergency vehicles. Advise dispatch to reroute ambulances and fire apparatus using side streets and inform local hospitals of potential delays. Use public alerts to advise commuters to avoid the area and consider using Caltrain or alternate routes to reduce congestion."
6. Earthquake Damage Assessment in the Fire District Radio Communication 104: "Earthquake felt throughout the Menlo Park Fire District, with reports of structural damage in Menlo Park, Atherton, and East Palo Alto."

Firefly™ Recommendation 302: "Activate earthquake response protocols, prioritizing areas with known vulnerabilities based on previous inspections and seismic assessments. Dispatch units for rapid damage assessment in residential and commercial areas, focusing on bridges, overpasses, and public buildings. Coordinate with utility companies to inspect for gas leaks and electrical hazards."

By focusing on the specific landscapes, infrastructure, and community characteristics of the Menlo Park Fire Protection District's coverage area, GovGPT Firefly™ can provide precise and actionable recommendations that enhance the effectiveness of incident response and management efforts within these diverse communities.

By following these steps, IAAIM can provide a dynamic, ethical, and compliant AI-driven approach to managing fire incidents 1102, ensuring optimal incident action while adapting to the evolving situation as communicated by incident commanders through radio transmissions.

An ad-hoc decentralized, secure edge mesh network formed from situationally interconnected devices on persons (e.g., firefighters equipped with radios and/or wearable generative artificial intelligence based body-worn devices), nearby fire vehicles, and/or drones communicatively and each other in response to an incident can be used, according to one embodiment. The ad-hoc network can be formed across these edge devices associated with a dispatch center 112 and/or deployment to an incident by central command, such as the regional fire center 120. This enables a highly integrated and responsive localized edge node peer-to-peer network system, enhancing situational awareness and operational effectiveness in the field, while improving network security and resiliency.

In addition, it will be appreciated that the various operations, processes and methods disclosed herein may be embodied in a non-transitory machine-readable medium and/or a machine-accessible medium compatible with a data processing system. Accordingly, the specification and drawings are to be regarded in an illustrative rather than a restrictive sense.

Compatibility and Enhancement of Traditional Software Tablet Command (https://www.tabletcommand.com/)

GovGPT Firefly's advanced artificial intelligence capabilities integrates with Tablet Command's incident management platform to enhance and improve emergency response operations, according to one embodiment. GovGPT Firefly™ can analyze vast amounts of data from various sources, including incident reports, weather updates, and resource statuses, to provide real-time insights and recommendations. This can help incident commanders 106 make more informed decisions quickly. Incorporating AI to predict the spread of fires or other emergencies based on current conditions can allow for preemptive action, reducing impact and improving response effectiveness. By leveraging AI, the system can optimize the allocation of resources in real-time, automatically suggesting reassignments based on the evolving needs of each incident. This can ensure that resources are used efficiently, reducing response times and improving outcomes. By integrating AI with Automatic Vehicle Location (AVL) and personnel tracking features, the system can provide more accurate location tracking and safety monitoring of responders, improving incident scene safety.

Leveraging AI to create dynamic training scenarios based on historical data and predictive modeling can offer responders realistic and challenging training opportunities, improving preparedness. The integration can facilitate more comprehensive after-action reviews, using AI to analyze performance, identify lessons learned, and recommend improvements for future responses. It can be used to generate and disseminate real-time public information updates, evacuation orders, and safety tips across multiple platforms, ensuring the community is well-informed during emergencies. By enhancing Tablet Command with GovGPT Firefly's AI capabilities, emergency response teams can benefit from a more adaptive, efficient, and effective incident management system. This integration not only improves operational outcomes but also enhances the safety of both the public and first responders through more informed decision-making and resource management, according to one embodiment.

The AI can automatically disseminate critical information to all relevant parties, ensuring that everyone involved in the emergency response has the latest updates. This can include automated alerts to neighboring jurisdictions, public safety announcements, or updates to first responders. Integration of AI-driven insights into Tablet Command's collaboration tools can facilitate more effective teamwork and interagency coordination, providing a unified response to emergencies. GovGPT Firefly™ can continuously analyze incident data and environmental conditions to identify potential hazards, alerting commanders and responders to risks such as structural collapses, toxic exposures, or weather-related dangers.

First Due (https://www.firstdue.com/)

Integrating Firefly, the described advanced generative AI system, with First Due can significantly enhance the capabilities of emergency services, leveraging AI's analytical power to augment First Due's incident management and community risk assessment tools. Firefly™ can analyze vast datasets, including historical incident data, building characteristics, and environmental factors, to predict areas of high risk more accurately. This can allow for more targeted pre-incident planning and community engagement efforts. Firefly™ can continuously update building pre-plans by analyzing new data sources, such as satellite imagery or public building records, ensuring that responders have the most current information at their fingertips.

With Firefly's AI capabilities, incident commanders can receive AI-generated recommendations during incidents, helping to make strategic decisions based on real-time data analysis and predictive modeling. Firefly™ can instantly analyze the location, availability, and capability of response units in relation to an incident, optimizing dispatch to ensure the fastest and most effective response. By integrating Firefly, First Due can provide responders with predictive insights on fire spread, potential hazards, and structural stability assessments in real-time, enhancing operational safety and effectiveness. Firefly's AI can automate the analysis of response actions, identifying key factors that influenced the outcome. This can help in pinpointing areas for improvement and training opportunities. By applying machine learning algorithms, Firefly™ can help in deriving more nuanced insights from the incident data, enabling departments to measure performance against a wider range of metrics and benchmarks.

Firefly™ can analyze data from resident safety profiles alongside local risk factors to generate personalized safety recommendations for community members, enhancing public education efforts. Utilizing predictive analytics, Firefly™ can help in issuing timely alerts to residents about potential risks specific to their area or property, such as wildfire threats or flood warnings, improving community preparedness. Firefly™ can facilitate more efficient inter-agency collaboration by automatically identifying and coordinating available resources across jurisdictions in response to large-scale incidents. Firefly's AI can enhance the functionality of integrated third-party systems, ensuring that all operational tools used by emergency services benefit from advanced data analysis and AI-driven insights. Integrating Firefly™ with First Due can represent a significant leap forward in the use of AI in emergency services, offering a more proactive, intelligent, and community-focused approach to incident management. This integration promises to enhance the operational effectiveness of emergency responders, improve community safety, and ensure a more informed and adaptive response to emergencies.

Many embodiments have been described. Nevertheless, it will be understood that various modifications may be made without departing from the spirit and scope of the claimed invention. For example, the GovGPT™ Body-worn pendant may be the GovGPT™ pendant in any form (e.g., including helmet form). Also, embodiments described for one use case, such as for law enforcement, may apply to any of the other use cases described herein in any form. In addition, the logic flows depicted in the Figures do not require the particular order shown, or sequential order, to achieve desirable results. In addition, other steps may be provided, or steps may be eliminated, from the described flows. Other components may be added or removed from the described systems. Accordingly, other embodiments are within the scope of the following claims.

It may be appreciated that the various systems, methods, and apparatus disclosed herein may be embodied in a machine-readable medium and/or a machine-accessible medium compatible with a data processing system (e.g., a computer system), and/or may be performed in any order.

The structures and modules in the Figures may be shown as distinct and communicating with only a few specific structures and not others. The structures may be merged with each other, may perform overlapping functions, and may communicate with other structures not shown to be connected in the Figures. Accordingly, the specification and/or drawings may be regarded in an illustrative rather than a restrictive sense.

In one embodiment, specialized processors are used for vision processing and sensors. For example, advanced AI vision processors designed by Ubicept (https://www.ubicept.com/). Ubicept's technology, which enhances computer vision by counting individual photons, can significantly enhance the Firefly's capabilities, according to one embodiment. By integrating Ubicept's advanced imaging technology, the Firefly™ can offer unparalleled visual clarity in all lighting conditions, including extreme low light or high-contrast environments, according to one embodiment. This can enable more accurate threat detection and environmental analysis, according to one embodiment. The ability to capture sharp images in high-speed motion can improve the system's responsiveness in dynamic scenarios, according to one embodiment. Additionally, the technology's potential to see around corners can provide a strategic advantage in complex, urban combat zones or in reconnaissance missions, according to one embodiment. This integration can make the Firefly™ an even more powerful tool for military and law enforcement personnel, offering enhanced situational awareness and operational effectiveness, according to one embodiment.

In another embodiment, Ambarella's Oculii radar technology (https://www.oculii.com/), combined with 4D imaging radar, can significantly enhance the Firefly™. It can offer advanced angular resolution, LIDAR-like point cloud density, and long-range radar sensing, according to one embodiment. By dynamically adapting radar waves and reducing data size, it enables high-performance imaging radar systems, according to one embodiment. This technology can improve TactiGuard's detection capabilities in various environmental conditions, particularly in rain, snow, and fog, where visual systems might fail, according to one embodiment. The integration can lead to a more comprehensive sensing suite, combining camera, radar, and AI processing for a complete autonomous mobility solution, according to one embodiment.

For example, for training the Firefly™, the NVIDIA A100 Tensor Core GPU (https://www.nvidia.com/en-us/data-center/a100/) can be an optimal choice, according to one embodiment at the time of this patent application. It should be understood that future generations of AI specific chips might be preferred in years ahead. At the current time of this writing, the A100 offers significant acceleration for deep learning and machine learning tasks, making it ideal for processing the complex algorithms and vast data sets involved in training the Firefly™, according to one embodiment. The A100's advanced architecture provides enhanced computational power, enabling faster training times and more efficient handling of large neural networks, which are crucial for the sophisticated AI capabilities required in the Firefly™, according to one embodiment.

Using NVIDIA®'s A100 Tensor Core GPU to train the Firefly™ involves leveraging its powerful computational abilities for handling deep learning tasks, according to one embodiment. The A100's architecture (and future generations of similar or better computational chips) can be well-suited for processing large and complex neural networks, which are fundamental in the AI algorithms of TactiGuard™. Its high throughput and efficient handling of AI workloads can significantly reduce training times, enabling rapid iteration and refinement of models, according to one embodiment. This can be particularly useful in developing the sophisticated pattern recognition, threat detection, and decision-making capabilities of the TactiGuard™ system, according to one embodiment. Through its advanced AI acceleration capabilities, the A100 can effectively manage the voluminous and diverse datasets that Firefly™ can require for comprehensive training at this time, according to one embodiment.

To train the Firefly™ using NVIDIA's A100 Tensor Core GPU, GovGPT™ intends to follow these steps, according to one embodiment:

Data Collection: Gather extensive datasets that include various scenarios TactiGuard™ might encounter, like different environmental conditions, human behaviors, and potential threats, according to one embodiment.

Data Preprocessing: Clean and organize the data, ensuring it's in a format suitable for training AI models, according to one embodiment. This might include labeling images, segmenting video sequences, or categorizing different types of sensory inputs, according to one embodiment.

Model Selection: Choose appropriate machine learning models for tasks such as image recognition, threat detection, or decision-making, according to one embodiment.

Model Training: Use the A100 GPU to train the models on the collected data, according to one embodiment. This involves feeding the data into the models and using algorithms to adjust the model parameters for accurate predictions or classifications, according to one embodiment.

Evaluation and Testing: Regularly evaluate the models against a set of test data to check their accuracy and reliability, according to one embodiment. Make adjustments to the model as needed based on performance, according to one embodiment.

Optimization: Fine-tune the models for optimal performance, according to one embodiment. This includes adjusting hyperparameters and potentially retraining the models with additional or refined data, according to one embodiment.

Integration: Once the models are adequately trained and optimized, integrate them into the TactiGuard™ system's software framework, according to one embodiment.

Real-World Testing: Deploy the system in controlled real-world scenarios to test its effectiveness and make any necessary adjustments based on its performance, according to one embodiment.

Continuous Learning: Implement a mechanism for continuous learning, allowing the system to adapt and improve over time based on new data and experiences, according to one embodiment. Throughout these steps, the power of the A100 GPU can be utilized to handle the heavy computational load, especially during the training and optimization phases, ensuring efficient and effective model development, according to one embodiment.

Apart from NVIDIA's A100 GPU framework, emerging chipsets offer enhanced computational capabilities. For example, integrating SambaNova® technology (https://sambanova.ai/) into the Firefly™ can offer significant benefits. Integrating SambaNova's SN40L and SambaNova® chips into the various embodiments can substantially enhance its AI capabilities, according to one embodiment. With the SN40L's ability to handle a 5 trillion parameter model, significantly more than the GPT-4's 1.76 trillion parameters, the various embodiments can process and analyze more complex data at an unprecedented scale, according to one embodiment. This can enable more advanced pattern recognition, faster decision-making, and highly efficient real-time analysis in various operational environments, according to one embodiment. Additionally, the claim that SambaNova's technology can train large models six times faster than an Nvidia A100 suggests that the TactiGuard's AI models can be developed and updated much more rapidly, keeping the system at the forefront of AI advancements in security and defense, according to one embodiment.

In summary, this invention represents a significant advancement in military technology, offering enhanced situational awareness, real-time data processing, and secure communication, all essential for modern combat scenarios. By combining edge computing with a robust mesh network and advanced visual interpretation technologies, it equips warfighters with a powerful tool to navigate and understand their operational environment more effectively, making informed decisions rapidly in the field.

Although the present embodiments have been described with reference to specific example embodiments, it will be evident that various modifications and changes may be made to each of the embodiments in the Figures without departing from the broader spirit and scope of the various embodiments. For example, while the embodiment of a touchscreen display on a tablet carried by incident commander 106, or inside a fire command vehicle 130 are described, but can alternatively be a heads up AR display similar to the Apple® Vision Pro.

Features in one embodiment and use case may be applicable to other use cases as described, and one with skill in the art will appreciate this and those interchanges are incorporated as embodiments of each use case-fire, military, police, civilian, journalism, EMT etc.

In addition, the various devices and modules described herein may be enabled and operated using hardware circuitry (e.g., GPUs, CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., graphics processing units (GPUs), application-specific integrated (ASIC) circuitry and/or Digital Signal Processor (DSP) circuitry).

The invention claimed is:

1. A method comprising:
analyzing a description of a fire in progress;
automatically generating an incident action plan through an Incident Action Artificial-Intelligence Model ("IAAIM") based on the description of the fire in progress; and
modifying the incident action plan based on a trusted radio communication to an incident commander.

2. The method of claim 1 wherein the trusted radio communication is from at least one of a tactical firefighter, a fire captain, a dispatch center, and a regional fire center.

3. The method of claim 1 further comprising:
analyzing a video feed from an unmanned aerial vehicle encompassing an area of the fire in progress;

applying a computer vision algorithm to the video feed from the unmanned aerial vehicle to identify a risk associated with human safety in the area of the fire in progress; and modifying the incident action plan based on the identification of the risk associated with human safety in the area of the fire in progress.

4. The method of claim 1 wherein the description is an input to the IAAIM and is provided from at least one of a dispatch center, an eyewitness, and an observational camera in the area of the fire in progress.

5. The method of claim 1 further comprising:

analyzing a heat signature captured through a thermal imaging camera in the area of the fire in progress;

identifying the risk associated with the heat signature captured through the thermal imaging camera in the area of the fire in progress; and modifying the incident action plan based on the identification of the risk associated with the heat signature captured through the thermal imaging camera in the area of the fire in progress.

6. The method of claim 1 further comprising:

generating a next action recommendation associated with the incident action plan; and displaying the incident action plan along with the next action recommendation on a touchscreen display within a fire command vehicle.

7. The method of claim 6 further comprising:

automatically performing the next action recommended by the IAAIM when an action-indicator associated with the next action recommendation is selected.

8. The method of claim 1 further comprising:

fine-tuning a large language model based on at least one of a site plan data, a policy data, a procedure data, a historical fire incident response data, and an emergency operation plan data associated with a jurisdictional entity; and forming the IAAIM when the fine-tuning the large language model exceeds an accuracy threshold.

9. The method of claim 1 further comprising:

responsive to a verbal query to the IAAIM by generating a response based on an aggregate situational data communicated to the incident commander.

10. The method of claim 1 further comprising:

generating the IAAIM through an edge based ad-hoc network formed between devices communicatively coupled during the fire in progress.

11. An interactive voice response device, comprising:

an interpretation module to communicate an ambient sensory data to an incident commander during an emergency event in progress;

a voice input microphone to receive a verbal query from the incident commander during the emergency event in progress; and an Incident Action Artificial-Intelligence Model ("IAAIM") to automatically generate a response to the ambient sensory data communicated to the incident commander during the emergency event in progress.

12. The interactive voice response device of claim 11 wherein the ambient sensory data is a trusted data comprising at least one of a drone feed during the emergency event in progress, a radio communication from a first responder during the emergency event; and a message from a dispatch center.

13. The interactive voice response device of claim 11 to:

analyze a video feed from an unmanned aerial vehicle visually perceiving the emergency event in progress;

apply a computer vision algorithm to the video feed from the unmanned aerial vehicle to identify a risk associated with human safety during the emergency event in progress; and modify the incident action plan based on the identification of the risk associated with human safety during the emergency event in progress.

14. The interactive voice response device of claim 11 wherein a description of the emergency event in progress is an input to the interactive voice response device and is provided from at least one of a dispatch center, an eyewitness, and an observational camera in an area of the emergency event in progress.

15. The interactive voice response device of claim 11 to:

analyze a heat signature captured through a thermal imaging camera in the area of the emergency event in progress;

identify the risk associated with the heat signature captured through the thermal imaging camera in the area of the emergency event in progress; and modify the incident action plan based on the identification of the risk associated with the heat signature captured through the thermal imaging camera in the area of the emergency event in progress.

16. A method comprising:

modifying an incident action plan based on a trusted radio communication to an incident commander using an Incident Action Artificial-Intelligence Model ("IAAIM"), wherein the trusted radio communication is from at least one of a tactical firefighter, a fire captain, a dispatch center, and a regional fire center;

analyzing a sensory data from a vehicle encompassing an area of a fire in progress;

applying a sensory analysis algorithm to the sensory data to identify a risk associated with human safety in the area of the fire in progress; and modifying the incident action plan based on the identification of the risk associated with human safety in the area of the fire in progress.

17. The method of claim 16 wherein the trusted radio communication is an input to the IAAIM device and is provided from at least one of a dispatch center, an eyewitness, and an observational camera in the area of the fire in progress.

18. The method of claim 17 further comprising:

analyzing a heat signature captured through a thermal imaging camera in the area of the fire in progress;

identifying the risk associated with the heat signature captured through the thermal imaging camera in the area of the fire in progress; and modifying the incident action plan based on the identification of the risk associated with the heat signature captured through the thermal imaging camera in the area of the fire in progress.

19. The method of claim 18 further comprising:

generating a next action recommendation associated with the incident action plan; and displaying the incident action plan along with the next action recommendation on a touchscreen display within a fire command vehicle.

20. The method of claim 19 further comprising:

automatically performing the next action recommended by the IAAIM device when an action-indicator associated with the next action recommendation is selected.

* * * * *